(12) United States Patent
Petite

(10) Patent No.: US 9,111,240 B2
(45) Date of Patent: *Aug. 18, 2015

(54) SYSTEM AND METHOD FOR TRANSMITTING POLLUTION INFORMATION OVER AN INTEGRATED WIRELESS NETWORK

(75) Inventor: Thomas D. Petite, Atlanta, GA (US)

(73) Assignee: SIPCO, LLC., Atlanta, GA (US)

( * ) Notice: Subject to any disclaimer, the term of this patent is extended or adjusted under 35 U.S.C. 154(b) by 495 days.

This patent is subject to a terminal disclaimer.

(21) Appl. No.: 13/461,194

(22) Filed: May 1, 2012

(65) Prior Publication Data

US 2012/0214532 A1  Aug. 23, 2012

Related U.S. Application Data

(63) Continuation of application No. 12/816,266, filed on Jun. 15, 2010, now Pat. No. 8,171,136, which is a continuation of application No. 12/206,106, filed on Sep. 8, 2008, now Pat. No. 7,739,378, which is a continuation of application No. 10/021,100, filed on Oct. 30, 2001, now Pat. No. 7,424,527.

(51) Int. Cl.
*H04B 7/00* (2006.01)
*G06Q 10/06* (2012.01)

(52) U.S. Cl.
CPC .................................... *G06Q 10/06* (2013.01)

(58) Field of Classification Search
CPC .................................................... H04W 84/18
USPC ............... 340/583.2, 853.3, 853.8, 853.2; 370/230; 709/224; 455/517
See application file for complete search history.

(56) References Cited

U.S. PATENT DOCUMENTS

| | | | |
|---|---|---|---|
| 3,665,475 A | 5/1972 | Gram | |
| 3,705,385 A | 12/1972 | Batz | |
| 3,723,876 A | 3/1973 | Seaborn, Jr. | |
| 3,742,142 A | 6/1973 | Martin | |

(Continued)

FOREIGN PATENT DOCUMENTS

| CA | 945277 | 4/1974 |
|---|---|---|
| CA | 2324563 | 9/1999 |

(Continued)

OTHER PUBLICATIONS

MacGregor et al., "Multiple Control Stations in Packet Radio Networks", Bolt, Beranek and Newman, Inc., Cambridge, MA, IEEE 1982, pp. 10.3-1-10.3-5, 1982.

(Continued)

*Primary Examiner* — Duyen Doan

(74) *Attorney, Agent, or Firm* — Troutman Sanders LLP; James E. Schutz; Dustin B. Weeks

(57) ABSTRACT

A pollution information message system provides a system and method for generating and transmitting pollution information messages. In one embodiment, the pollution information message system employs a transceiver network with a plurality transceivers coupled to monitoring devices. Control room operators receive a pollution information message from an identifiable transceiver. The transceiver, identified by an identification code, indicates a location and the nature of the detected pollution. Other aspects, embodiments, and features are also claimed and described.

13 Claims, 5 Drawing Sheets

(56) References Cited

U.S. PATENT DOCUMENTS

| | | | |
|---|---|---|---|
| 3,768,014 A | 10/1973 | Smith | |
| 3,769,965 A | 11/1973 | Raddi et al. | |
| 3,848,231 A | 11/1974 | Wootton | |
| 3,864,674 A * | 2/1975 | Worsham et al. | 340/530 |
| 3,885,552 A | 5/1975 | Kennedy | |
| 3,892,948 A | 7/1975 | Constable | |
| 3,906,460 A | 9/1975 | Halpern | |
| 3,914,692 A | 10/1975 | Seaborn, Jr. | |
| 3,922,492 A | 11/1975 | Lumsden | |
| 3,925,763 A | 12/1975 | Wadhwani et al. | |
| 4,025,315 A | 5/1977 | Mazelli | |
| 4,056,684 A | 11/1977 | Lindstrom | |
| 4,058,672 A | 11/1977 | Crager et al. | |
| 4,083,003 A | 4/1978 | Haemmig | |
| 4,120,452 A | 10/1978 | Kimura et al. | |
| 4,124,839 A | 11/1978 | Cohen | |
| 4,135,181 A | 1/1979 | Bogacki et al. | |
| 4,204,195 A | 5/1980 | Bogacki | |
| 4,213,119 A | 7/1980 | Ward et al. | |
| 4,277,837 A | 7/1981 | Stuckert | |
| 4,278,975 A | 7/1981 | Kimura et al. | |
| 4,284,852 A | 8/1981 | Szybicki et al. | |
| 4,322,842 A | 3/1982 | Martinez | |
| 4,345,116 A | 8/1982 | Ash et al. | |
| 4,354,181 A | 10/1982 | Spletzer | |
| 4,395,780 A | 7/1983 | Gohm et al. | |
| 4,396,910 A | 8/1983 | Enemark et al. | |
| 4,396,915 A | 8/1983 | Farnsworth et al. | |
| 4,399,531 A | 8/1983 | Grande et al. | |
| 4,406,016 A | 9/1983 | Abrams et al. | |
| 4,417,450 A | 11/1983 | Morgan, Jr. et al. | |
| 4,436,957 A | 3/1984 | Mazza et al. | |
| 4,446,454 A | 5/1984 | Pyle | |
| 4,446,458 A | 5/1984 | Cook | |
| 4,454,414 A | 6/1984 | Benton | |
| 4,468,656 A | 8/1984 | Clifford et al. | |
| 4,488,152 A | 12/1984 | Arnason et al. | |
| 4,495,496 A | 1/1985 | Miller, III | |
| 4,551,719 A | 11/1985 | Carlin et al. | |
| 4,611,198 A | 9/1986 | Levinson et al. | |
| 4,621,263 A | 11/1986 | Takenaka et al. | |
| 4,630,035 A | 12/1986 | Stahl et al. | |
| 4,631,357 A | 12/1986 | Grunig | |
| 4,665,519 A | 5/1987 | Kirchner et al. | |
| 4,669,113 A | 5/1987 | Ash et al. | |
| 4,670,739 A | 6/1987 | Kelly, Jr. | |
| 4,692,761 A | 9/1987 | Robinton | |
| 4,704,724 A | 11/1987 | Krishnan et al. | |
| 4,707,852 A | 11/1987 | Jahr et al. | |
| 4,731,810 A | 3/1988 | Watkins | |
| 4,742,296 A | 5/1988 | Petr et al. | |
| 4,757,185 A | 7/1988 | Onishi | |
| 4,788,721 A | 11/1988 | Krishnan et al. | |
| 4,792,946 A | 12/1988 | Mayo | |
| 4,799,059 A | 1/1989 | Grindahl et al. | |
| 4,800,543 A | 1/1989 | Lyndon-James et al. | |
| 4,814,763 A | 3/1989 | Nelson et al. | |
| 4,825,457 A | 4/1989 | Lebowitz | |
| 4,829,561 A | 5/1989 | Matheny | |
| 4,849,815 A | 7/1989 | Streck | |
| 4,851,654 A | 7/1989 | Nitta | |
| 4,856,046 A | 8/1989 | Streck et al. | |
| 4,857,912 A | 8/1989 | Everett, Jr. et al. | |
| 4,864,559 A | 9/1989 | Perlman | |
| 4,875,231 A | 10/1989 | Hara et al. | |
| 4,884,123 A | 11/1989 | Dixit et al. | |
| 4,884,132 A | 11/1989 | Morris et al. | |
| 4,897,644 A | 1/1990 | Hirano | |
| 4,906,828 A | 3/1990 | Halpern | |
| 4,908,769 A | 3/1990 | Vaughan et al. | |
| 4,912,656 A | 3/1990 | Cain et al. | |
| 4,918,432 A | 4/1990 | Pauley | |
| 4,918,690 A | 4/1990 | Markkula, Jr. et al. | |
| 4,918,995 A | 4/1990 | Pearman et al. | |
| 4,924,462 A | 5/1990 | Sojka | |
| 4,928,299 A | 5/1990 | Tansky et al. | |
| 4,939,726 A | 7/1990 | Flammer et al. | |
| 4,940,976 A | 7/1990 | Gastouniotis et al. | |
| 4,949,077 A | 8/1990 | Mbuthia | |
| 4,952,928 A | 8/1990 | Carroll et al. | |
| 4,962,496 A | 10/1990 | Vercellotti et al. | |
| 4,967,366 A | 10/1990 | Kaehler | |
| 4,968,970 A | 11/1990 | LaPorte | |
| 4,968,978 A | 11/1990 | Stolarczyk | |
| 4,972,504 A | 11/1990 | Daniel, Jr. et al. | |
| 4,973,957 A | 11/1990 | Shimizu et al. | |
| 4,973,970 A * | 11/1990 | Reeser | 342/357.44 |
| 4,977,612 A | 12/1990 | Wilson | |
| 4,980,907 A | 12/1990 | Raith et al. | |
| 4,987,536 A | 1/1991 | Humblet | |
| 4,989,230 A | 1/1991 | Gillig et al. | |
| 4,991,008 A | 2/1991 | Nama | |
| 4,993,059 A | 2/1991 | Smith et al. | |
| 4,998,095 A | 3/1991 | Shields | |
| 4,999,607 A | 3/1991 | Evans | |
| 5,007,052 A | 4/1991 | Flammer | |
| 5,032,833 A | 7/1991 | Laporte | |
| 5,038,372 A | 8/1991 | Elms et al. | |
| 5,055,851 A | 10/1991 | Sheffer | |
| 5,057,814 A | 10/1991 | Onan et al. | |
| 5,061,997 A | 10/1991 | Rea et al. | |
| 5,079,768 A | 1/1992 | Flammer | |
| 5,086,391 A | 2/1992 | Chambers | |
| 5,088,032 A | 2/1992 | Bosack | |
| 5,091,713 A | 2/1992 | Horne et al. | |
| 5,111,199 A | 5/1992 | Tomoda et al. | |
| 5,113,183 A | 5/1992 | Mizuno et al. | |
| 5,113,184 A | 5/1992 | Katayama | |
| 5,115,224 A | 5/1992 | Kostusiak et al. | |
| 5,115,433 A | 5/1992 | Baran et al. | |
| 5,117,422 A | 5/1992 | Hauptschein et al. | |
| 5,124,624 A | 6/1992 | de Vries et al. | |
| 5,128,855 A | 7/1992 | Hilber et al. | |
| 5,130,519 A | 7/1992 | Bush et al. | |
| 5,130,987 A | 7/1992 | Flammer | |
| 5,131,038 A | 7/1992 | Puhl et al. | |
| 5,134,650 A | 7/1992 | Blackmon | |
| 5,136,285 A | 8/1992 | Okuyama | |
| 5,138,615 A | 8/1992 | Lamport et al. | |
| 5,155,481 A | 10/1992 | Brennan, Jr. et al. | |
| 5,159,317 A | 10/1992 | Brav | |
| 5,159,592 A | 10/1992 | Perkins | |
| 5,162,776 A | 11/1992 | Bushnell et al. | |
| 5,170,393 A | 12/1992 | Peterson et al. | |
| 5,177,342 A | 1/1993 | Adams | |
| 5,189,287 A | 2/1993 | Parienti | |
| 5,191,192 A | 3/1993 | Takahira et al. | |
| 5,191,326 A | 3/1993 | Montgomery | |
| 5,193,111 A | 3/1993 | Matty et al. | |
| 5,195,018 A | 3/1993 | Kwon et al. | |
| 5,197,095 A | 3/1993 | Bonnet et al. | |
| 5,200,735 A | 4/1993 | Hines | |
| 5,204,670 A | 4/1993 | Stinton | |
| 5,212,645 A | 5/1993 | Wildes et al. | |
| 5,216,502 A | 6/1993 | Katz | |
| 5,221,838 A | 6/1993 | Gutman et al. | |
| 5,223,844 A | 6/1993 | Mansell et al. | |
| 5,224,648 A | 7/1993 | Simon et al. | |
| 5,231,658 A | 7/1993 | Eftechiou | |
| 5,235,630 A | 8/1993 | Moody et al. | |
| 5,239,294 A | 8/1993 | Flanders et al. | |
| 5,239,575 A | 8/1993 | White et al. | |
| 5,241,410 A | 8/1993 | Streck et al. | |
| 5,243,338 A | 9/1993 | Brennan, Jr. et al. | |
| 5,245,633 A | 9/1993 | Schwartz et al. | |
| 5,251,205 A | 10/1993 | Callon et al. | |
| 5,252,967 A | 10/1993 | Brennan et al. | |
| 5,253,167 A | 10/1993 | Yoshida et al. | |
| 5,265,150 A | 11/1993 | Helmkamp et al. | |
| 5,265,162 A | 11/1993 | Bush et al. | |
| 5,266,782 A | 11/1993 | Alanara et al. | |
| 5,272,747 A | 12/1993 | Meads | |
| 5,276,680 A | 1/1994 | Messenger | |
| 5,282,204 A | 1/1994 | Shpancer et al. | |

(56) References Cited

U.S. PATENT DOCUMENTS

| | | |
|---|---|---|
| 5,282,250 A | 1/1994 | Dent et al. |
| 5,289,165 A | 2/1994 | Belin |
| 5,289,362 A | 2/1994 | Liebl et al. |
| 5,291,516 A | 3/1994 | Dixon et al. |
| 5,295,154 A | 3/1994 | Meier et al. |
| 5,305,370 A | 4/1994 | Kearns et al. |
| 5,309,501 A | 5/1994 | Kozik et al. |
| 5,315,645 A | 5/1994 | Matheny |
| 5,317,309 A | 5/1994 | Vercellotti et al. |
| 5,319,364 A | 6/1994 | Waraksa et al. |
| 5,319,698 A * | 6/1994 | Glidewell et al. ............... 379/39 |
| 5,319,711 A | 6/1994 | Servi |
| 5,321,618 A | 6/1994 | Gessman |
| 5,323,384 A | 6/1994 | Norwood et al. |
| 5,325,429 A | 6/1994 | Kurgan |
| 5,329,394 A | 7/1994 | Calvani et al. |
| 5,331,318 A | 7/1994 | Montgomery |
| 5,334,974 A | 8/1994 | Simms et al. |
| 5,335,265 A | 8/1994 | Cooper et al. |
| 5,343,493 A | 8/1994 | Karimullah |
| 5,344,068 A | 9/1994 | Haessig |
| 5,345,231 A | 9/1994 | Koo et al. |
| 5,345,595 A | 9/1994 | Johnson et al. |
| 5,347,263 A | 9/1994 | Carroll et al. |
| 5,352,278 A | 10/1994 | Korver et al. |
| 5,354,974 A | 10/1994 | Eisenberg |
| 5,355,278 A | 10/1994 | Hosoi et al. |
| 5,355,513 A | 10/1994 | Clarke et al. |
| 5,365,217 A | 11/1994 | Toner |
| 5,371,736 A | 12/1994 | Evan |
| 5,382,778 A | 1/1995 | Takahira et al. |
| 5,383,134 A | 1/1995 | Wrzesinski |
| 5,383,187 A | 1/1995 | Vardakas et al. |
| 5,390,206 A | 2/1995 | Rein et al. |
| 5,406,619 A | 4/1995 | Akhteruzzaman et al. |
| 5,412,192 A | 5/1995 | Hoss |
| 5,412,654 A | 5/1995 | Perkins |
| 5,412,760 A | 5/1995 | Peitz |
| 5,416,475 A | 5/1995 | Tolbert et al. |
| 5,416,725 A | 5/1995 | Pacheco et al. |
| 5,418,812 A | 5/1995 | Reyes et al. |
| 5,420,910 A | 5/1995 | Rudokas et al. |
| 5,424,708 A | 6/1995 | Ballesty et al. |
| 5,430,729 A | 7/1995 | Rahnema |
| 5,432,507 A | 7/1995 | Mussino et al. |
| 5,438,329 A | 8/1995 | Gastouniotis et al. |
| 5,439,414 A | 8/1995 | Jacob |
| 5,440,545 A | 8/1995 | Buchholz et al. |
| 5,442,553 A | 8/1995 | Parrillo |
| 5,442,633 A | 8/1995 | Perkins et al. |
| 5,445,287 A | 8/1995 | Center et al. |
| 5,445,347 A | 8/1995 | Ng |
| 5,448,230 A | 9/1995 | Schanker et al. |
| 5,451,929 A | 9/1995 | Adelman et al. |
| 5,451,938 A | 9/1995 | Brennan, Jr. |
| 5,452,344 A | 9/1995 | Larson |
| 5,454,024 A | 9/1995 | Lebowitz |
| 5,455,569 A | 10/1995 | Sherman et al. |
| 5,465,401 A | 11/1995 | Thompson |
| 5,467,074 A | 11/1995 | Pedtke |
| 5,467,082 A | 11/1995 | Sanderson |
| 5,467,345 A | 11/1995 | Cutler, Jr. et al. |
| 5,468,948 A | 11/1995 | Koenck et al. |
| 5,471,201 A | 11/1995 | Cerami et al. |
| 5,473,322 A | 12/1995 | Carney |
| 5,475,689 A | 12/1995 | Kay et al. |
| 5,479,400 A | 12/1995 | Dilworth et al. |
| 5,481,259 A | 1/1996 | Bane |
| 5,481,532 A * | 1/1996 | Hassan et al. ............... 370/312 |
| 5,484,997 A | 1/1996 | Haynes |
| 5,488,608 A | 1/1996 | Flammer, III |
| 5,493,273 A | 2/1996 | Smurlo et al. |
| 5,493,287 A | 2/1996 | Bane |
| 5,502,726 A | 3/1996 | Fischer |
| 5,504,746 A | 4/1996 | Meier |
| 5,506,837 A | 4/1996 | Sollner et al. |
| 5,508,412 A | 4/1996 | Kast et al. |
| 5,509,073 A | 4/1996 | Monnin |
| 5,513,244 A | 4/1996 | Joao et al. |
| 5,515,419 A | 5/1996 | Sheffer |
| 5,517,188 A | 5/1996 | Carroll et al. |
| 5,522,089 A | 5/1996 | Kikinis et al. |
| 5,528,215 A | 6/1996 | Siu et al. |
| 5,528,507 A | 6/1996 | McNamara et al. |
| 5,539,825 A | 7/1996 | Akiyama et al. |
| 5,541,938 A | 7/1996 | Di Zenzo et al. |
| 5,542,100 A | 7/1996 | Hatakeyama |
| 5,544,036 A | 8/1996 | Brown, Jr. et al. |
| 5,544,322 A | 8/1996 | Cheng et al. |
| 5,544,784 A | 8/1996 | Malaspina |
| 5,548,632 A | 8/1996 | Walsh et al. |
| 5,550,358 A | 8/1996 | Tait et al. |
| 5,550,359 A | 8/1996 | Bennett |
| 5,550,535 A | 8/1996 | Park |
| 5,553,094 A | 9/1996 | Johnson et al. |
| 5,555,258 A | 9/1996 | Snelling et al. |
| 5,555,286 A | 9/1996 | Tendler |
| 5,557,320 A | 9/1996 | Krebs |
| 5,557,748 A | 9/1996 | Norris |
| 5,562,537 A | 10/1996 | Zver et al. |
| 5,565,857 A | 10/1996 | Lee |
| 5,568,535 A | 10/1996 | Sheffer et al. |
| 5,570,084 A | 10/1996 | Ritter et al. |
| 5,572,438 A | 11/1996 | Ehlers et al. |
| 5,572,528 A | 11/1996 | Shuen |
| 5,573,181 A | 11/1996 | Ahmed |
| 5,574,111 A | 11/1996 | Brichta et al. |
| 5,583,850 A | 12/1996 | Snodgrass et al. |
| 5,583,914 A | 12/1996 | Chang et al. |
| 5,587,705 A | 12/1996 | Morris |
| 5,588,005 A | 12/1996 | Ali et al. |
| 5,589,878 A | 12/1996 | Cortjens et al. |
| 5,590,038 A | 12/1996 | Pitroda |
| 5,590,179 A | 12/1996 | Shincovich et al. |
| 5,592,491 A | 1/1997 | Dinkins |
| 5,594,431 A | 1/1997 | Sheppard et al. |
| 5,596,719 A | 1/1997 | Ramakrishnan et al. |
| 5,596,722 A | 1/1997 | Rahnema |
| 5,602,843 A | 2/1997 | Gray |
| 5,604,414 A | 2/1997 | Milligan et al. |
| 5,604,869 A | 2/1997 | Mincher et al. |
| 5,606,361 A | 2/1997 | Davidsohn et al. |
| 5,608,721 A | 3/1997 | Natarajan et al. |
| 5,608,786 A | 3/1997 | Gordon |
| 5,613,620 A | 3/1997 | Center et al. |
| 5,615,227 A | 3/1997 | Schumacher, Jr. et al. |
| 5,615,277 A | 3/1997 | Hoffman |
| 5,617,084 A | 4/1997 | Sears |
| 5,619,192 A | 4/1997 | Ayala |
| 5,625,410 A | 4/1997 | Washino et al. |
| 5,628,050 A | 5/1997 | McGraw et al. |
| 5,629,687 A | 5/1997 | Sutton et al. |
| 5,629,875 A | 5/1997 | Adair, Jr. |
| 5,630,209 A | 5/1997 | Wizgall et al. |
| 5,631,554 A | 5/1997 | Briese et al. |
| 5,636,216 A | 6/1997 | Fox et al. |
| 5,640,002 A | 6/1997 | Ruppert et al. |
| 5,644,294 A | 7/1997 | Ness |
| 5,655,219 A | 8/1997 | Jusa et al. |
| 5,657,389 A | 8/1997 | Houvener |
| 5,659,300 A | 8/1997 | Dresselhuys et al. |
| 5,659,303 A | 8/1997 | Adair, Jr. |
| 5,668,876 A | 9/1997 | Falk et al. |
| 5,673,252 A | 9/1997 | Johnson et al. |
| 5,673,259 A | 9/1997 | Quick, Jr. |
| 5,673,304 A | 9/1997 | Connor et al. |
| 5,673,305 A | 9/1997 | Ross |
| 5,682,139 A | 10/1997 | Pradeep et al. |
| 5,682,476 A | 10/1997 | Tapperson et al. |
| 5,689,229 A | 11/1997 | Chaco et al. |
| 5,691,980 A | 11/1997 | Welles, II et al. |
| 5,696,695 A | 12/1997 | Ehlers et al. |
| 5,699,328 A | 12/1997 | Ishizaki et al. |
| 5,701,002 A | 12/1997 | Oishi et al. |

(56) References Cited

U.S. PATENT DOCUMENTS

| | | | |
|---|---|---|---|
| 5,702,059 A | 12/1997 | Chu et al. | |
| 5,704,046 A | 12/1997 | Hogan | |
| 5,704,517 A | 1/1998 | Lancaster, Jr. | |
| 5,706,191 A | 1/1998 | Bassett et al. | |
| 5,706,976 A | 1/1998 | Purkey | |
| 5,708,223 A | 1/1998 | Wyss | |
| 5,708,655 A | 1/1998 | Toth et al. | |
| 5,712,619 A | 1/1998 | Simkin | |
| 5,712,980 A | 1/1998 | Beeler et al. | |
| 5,714,931 A | 2/1998 | Petite et al. | |
| 5,717,718 A | 2/1998 | Rowsell et al. | |
| 5,719,564 A | 2/1998 | Sears | |
| 5,722,076 A | 2/1998 | Sakabe et al. | |
| 5,726,534 A | 3/1998 | Seo | |
| 5,726,544 A | 3/1998 | Lee | |
| 5,726,634 A | 3/1998 | Hess et al. | |
| 5,726,644 A | 3/1998 | Jednacz et al. | |
| 5,726,984 A | 3/1998 | Kubler et al. | |
| 5,732,074 A | 3/1998 | Spaur et al. | |
| 5,732,078 A | 3/1998 | Arango | |
| 5,736,965 A | 4/1998 | Mosebrook et al. | |
| 5,737,318 A | 4/1998 | Melnik | |
| 5,740,232 A | 4/1998 | Pailles et al. | |
| 5,740,366 A | 4/1998 | Mahany et al. | |
| 5,742,509 A | 4/1998 | Goldberg et al. | |
| 5,745,849 A | 4/1998 | Britton | |
| 5,748,104 A | 5/1998 | Argyroudis et al. | |
| 5,748,619 A | 5/1998 | Meier | |
| 5,754,111 A | 5/1998 | Garcia | |
| 5,754,227 A | 5/1998 | Fukuoka | |
| 5,757,783 A | 5/1998 | Eng et al. | |
| 5,757,788 A | 5/1998 | Tatsumi et al. | |
| 5,760,742 A | 6/1998 | Branch et al. | |
| 5,761,083 A | 6/1998 | Brown, Jr. et al. | |
| 5,764,742 A | 6/1998 | Howard et al. | |
| 5,767,791 A | 6/1998 | Stoop et al. | |
| 5,771,274 A | 6/1998 | Harris | |
| 5,774,052 A | 6/1998 | Hamm et al. | |
| 5,781,143 A | 7/1998 | Rossin | |
| 5,790,644 A | 8/1998 | Kikinis | |
| 5,790,662 A | 8/1998 | Valerij et al. | |
| 5,790,938 A | 8/1998 | Talarmo | |
| 5,796,727 A | 8/1998 | Harrison et al. | |
| 5,798,964 A | 8/1998 | Shimizu et al. | |
| 5,801,643 A | 9/1998 | Williams et al. | |
| 5,812,531 A | 9/1998 | Cheung et al. | |
| 5,815,505 A | 9/1998 | Mills | |
| 5,818,822 A | 10/1998 | Thomas et al. | |
| 5,822,273 A | 10/1998 | Bary et al. | |
| 5,822,309 A | 10/1998 | Ayanoglu et al. | |
| 5,822,544 A | 10/1998 | Chaco et al. | |
| 5,825,772 A | 10/1998 | Dobbins et al. | |
| 5,826,195 A | 10/1998 | Westerlage et al. | |
| 5,828,044 A | 10/1998 | Jun et al. | |
| 5,831,526 A * | 11/1998 | Hansler et al. | 340/539.14 |
| 5,832,057 A | 11/1998 | Furman | |
| 5,838,223 A | 11/1998 | Gallant et al. | |
| 5,838,237 A | 11/1998 | Revell et al. | |
| 5,838,812 A | 11/1998 | Pare, Jr. et al. | |
| 5,841,118 A | 11/1998 | East et al. | |
| 5,841,764 A | 11/1998 | Roderique et al. | |
| 5,842,976 A | 12/1998 | Williamson | |
| 5,844,808 A | 12/1998 | Konsmo et al. | |
| 5,845,230 A | 12/1998 | Lamberson | |
| 5,848,054 A | 12/1998 | Mosebrook et al. | |
| 5,852,658 A | 12/1998 | Knight et al. | |
| 5,854,994 A | 12/1998 | Canada et al. | |
| 5,856,974 A | 1/1999 | Gervais et al. | |
| 5,862,201 A | 1/1999 | Sands | |
| 5,864,772 A | 1/1999 | Alvarado et al. | |
| 5,867,688 A | 2/1999 | Donahue | |
| 5,870,686 A | 2/1999 | Monson | |
| 5,872,773 A | 2/1999 | Katzela et al. | |
| 5,873,043 A | 2/1999 | Comer | |
| 5,874,903 A | 2/1999 | Shuey et al. | |
| 5,875,185 A | 2/1999 | Wang et al. | |
| 5,880,677 A | 3/1999 | Lestician | |
| 5,883,884 A | 3/1999 | Atkinson | |
| 5,883,886 A | 3/1999 | Eaton et al. | |
| 5,884,184 A | 3/1999 | Sheffer | |
| 5,884,271 A | 3/1999 | Pitroda | |
| 5,886,333 A | 3/1999 | Miyake | |
| 5,889,468 A | 3/1999 | Banga | |
| 5,892,690 A | 4/1999 | Boatman et al. | |
| 5,892,758 A | 4/1999 | Argyrouis | |
| 5,892,924 A | 4/1999 | Lyon et al. | |
| 5,896,097 A | 4/1999 | Cardozo | |
| 5,897,607 A | 4/1999 | Jenney et al. | |
| 5,898,369 A | 4/1999 | Godwin | |
| 5,898,733 A | 4/1999 | Satyanarayana | |
| 5,905,438 A | 5/1999 | Weiss et al. | |
| 5,905,442 A | 5/1999 | Mosebrook et al. | |
| 5,907,291 A | 5/1999 | Chen et al. | |
| 5,907,491 A | 5/1999 | Canada et al. | |
| 5,907,540 A | 5/1999 | Hayashi | |
| 5,907,807 A | 5/1999 | Chavez, Jr. et al. | |
| 5,909,429 A | 6/1999 | Satyanarayana et al. | |
| 5,914,656 A | 6/1999 | Ojala et al. | |
| 5,914,672 A | 6/1999 | Glorioso et al. | |
| 5,914,673 A | 6/1999 | Jennings et al. | |
| 5,917,405 A | 6/1999 | Joao | |
| 5,917,629 A | 6/1999 | Hortensius et al. | |
| 5,923,269 A | 7/1999 | Shuey et al. | |
| 5,926,101 A | 7/1999 | Dasgupta | |
| 5,926,103 A | 7/1999 | Petite | |
| 5,926,529 A | 7/1999 | Hache et al. | |
| 5,926,531 A | 7/1999 | Petite | |
| 5,933,073 A | 8/1999 | Shuey | |
| 5,940,771 A | 8/1999 | Gollnick et al. | |
| 5,941,363 A | 8/1999 | Partyka et al. | |
| 5,941,955 A | 8/1999 | Wilby et al. | |
| 5,946,631 A | 8/1999 | Melnik | |
| 5,948,040 A | 9/1999 | DeLorme et al. | |
| 5,949,779 A | 9/1999 | Mostafa et al. | |
| 5,949,799 A | 9/1999 | Grivna et al. | |
| 5,953,319 A | 9/1999 | Dutta et al. | |
| 5,953,371 A | 9/1999 | Rowsell et al. | |
| 5,953,507 A | 9/1999 | Cheung et al. | |
| 5,955,718 A | 9/1999 | Levasseur et al. | |
| 5,957,718 A | 9/1999 | Cheng et al. | |
| 5,960,074 A | 9/1999 | Clark | |
| 5,963,130 A * | 10/1999 | Schlager et al. | 340/540 |
| 5,963,146 A | 10/1999 | Johnson et al. | |
| 5,963,452 A | 10/1999 | Etoh et al. | |
| 5,963,650 A | 10/1999 | Simionescu et al. | |
| 5,966,658 A | 10/1999 | Kennedy, III et al. | |
| 5,969,608 A | 10/1999 | Sojdehei et al. | |
| 5,973,756 A | 10/1999 | Erlin | |
| 5,974,236 A | 10/1999 | Sherman | |
| 5,978,364 A | 11/1999 | Melnik | |
| 5,978,371 A | 11/1999 | Mason, Jr. et al. | |
| 5,978,578 A | 11/1999 | Azarya et al. | |
| 5,986,574 A | 11/1999 | Colton | |
| 5,987,011 A | 11/1999 | Toh | |
| 5,987,331 A | 11/1999 | Grube et al. | |
| 5,987,421 A | 11/1999 | Chuang | |
| 5,991,625 A | 11/1999 | Vanderpool | |
| 5,991,639 A | 11/1999 | Rautiola et al. | |
| 5,994,892 A | 11/1999 | Turino et al. | |
| 5,995,022 A | 11/1999 | Plis et al. | |
| 5,995,592 A | 11/1999 | Shirai et al. | |
| 5,995,593 A | 11/1999 | Cho | |
| 5,997,170 A | 12/1999 | Brodbeck | |
| 5,999,094 A | 12/1999 | Nilssen | |
| 6,005,759 A | 12/1999 | Hart et al. | |
| 6,005,884 A | 12/1999 | Cook et al. | |
| 6,005,963 A | 12/1999 | Bolle et al. | |
| 6,018,659 A | 1/2000 | Ayyagari et al. | |
| 6,021,664 A | 2/2000 | Granato et al. | |
| 6,023,223 A | 2/2000 | Baxter, Jr. | |
| 6,026,095 A | 2/2000 | Sherer et al. | |
| 6,028,522 A | 2/2000 | Petite | |
| 6,028,857 A | 2/2000 | Poor | |
| 6,031,455 A | 2/2000 | Grube et al. | |

(56) References Cited

U.S. PATENT DOCUMENTS

| | | | |
|---|---|---|---|
| 6,032,197 A | 2/2000 | Birdwell et al. | |
| 6,035,213 A | 3/2000 | Tokuda et al. | |
| 6,035,266 A | 3/2000 | Williams et al. | |
| 6,036,086 A | 3/2000 | Sizer, II et al. | |
| 6,038,491 A | 3/2000 | McGarry et al. | |
| 6,044,062 A | 3/2000 | Brownrigg et al. | |
| 6,046,978 A | 4/2000 | Melnik | |
| 6,054,920 A | 4/2000 | Smith et al. | |
| 6,055,561 A | 4/2000 | Feldman et al. | |
| 6,060,994 A | 5/2000 | Chen | |
| 6,061,604 A | 5/2000 | Russ et al. | |
| 6,064,318 A | 5/2000 | Kirchner, III et al. | |
| 6,067,017 A | 5/2000 | Stewart et al. | |
| 6,067,030 A | 5/2000 | Burnett et al. | |
| 6,069,886 A | 5/2000 | Ayerst et al. | |
| 6,073,169 A | 6/2000 | Shuey et al. | |
| 6,073,266 A | 6/2000 | Ahmed et al. | |
| 6,073,840 A | 6/2000 | Marion | |
| 6,075,451 A | 6/2000 | Lebowitz et al. | |
| 6,078,251 A | 6/2000 | Landt et al. | |
| 6,084,867 A | 7/2000 | Meier | |
| 6,087,957 A | 7/2000 | Gray | |
| 6,088,659 A | 7/2000 | Kelley et al. | |
| 6,094,622 A | 7/2000 | Hubbard et al. | |
| 6,097,703 A | 8/2000 | Larsen et al. | |
| 6,100,816 A | 8/2000 | Moore | |
| 6,100,817 A | 8/2000 | Mason, Jr. et al. | |
| 6,101,427 A | 8/2000 | Yang | |
| 6,101,445 A | 8/2000 | Alvarado et al. | |
| 6,108,614 A | 8/2000 | Lincoln et al. | |
| 6,112,983 A | 9/2000 | D'Anniballe et al. | |
| 6,115,393 A | 9/2000 | Engel et al. | |
| 6,115,580 A | 9/2000 | Chuprun et al. | |
| 6,119,076 A | 9/2000 | Williams et al. | |
| 6,121,593 A | 9/2000 | Mansbery et al. | |
| 6,121,885 A | 9/2000 | Masone et al. | |
| 6,122,759 A | 9/2000 | Ayanoglu et al. | |
| 6,124,806 A | 9/2000 | Cunningham et al. | |
| 6,127,917 A | 10/2000 | Tuttle | |
| 6,128,551 A | 10/2000 | Davis et al. | |
| 6,130,622 A | 10/2000 | Hussey et al. | |
| 6,133,850 A | 10/2000 | Moore | |
| 6,137,423 A | 10/2000 | Glorioso et al. | |
| 6,140,975 A | 10/2000 | Cohen | |
| 6,141,347 A | 10/2000 | Shaughnessy et al. | |
| 6,150,936 A | 11/2000 | Addy | |
| 6,150,955 A | 11/2000 | Tracy et al. | |
| 6,157,464 A | 12/2000 | Bloomfield et al. | |
| 6,157,824 A | 12/2000 | Bailey | |
| 6,163,276 A | 12/2000 | Irving et al. | |
| 6,167,239 A | 12/2000 | Wright et al. | |
| 6,172,616 B1 | 1/2001 | Johnson et al. | |
| 6,173,159 B1 | 1/2001 | Wright et al. | |
| 6,174,205 B1 | 1/2001 | Madsen et al. | |
| 6,175,922 B1 | 1/2001 | Wang | |
| 6,177,883 B1 | 1/2001 | Jennetti et al. | |
| 6,178,173 B1 | 1/2001 | Mundwiler et al. | |
| 6,181,255 B1 | 1/2001 | Crimmins et al. | |
| 6,181,284 B1 | 1/2001 | Madsen et al. | |
| 6,181,981 B1 | 1/2001 | Varga et al. | |
| 6,185,307 B1 | 2/2001 | Johnson, Jr. | |
| 6,188,354 B1 | 2/2001 | Soliman et al. | |
| 6,188,675 B1 | 2/2001 | Casper et al. | |
| 6,192,282 B1 | 2/2001 | Smith et al. | |
| 6,192,390 B1 | 2/2001 | Berger et al. | |
| 6,195,018 B1 | 2/2001 | Ragle et al. | |
| 6,198,390 B1 | 3/2001 | Schlager et al. | |
| 6,199,068 B1 | 3/2001 | Carpenter | |
| 6,201,962 B1 | 3/2001 | Sturniolo et al. | |
| 6,205,143 B1 | 3/2001 | Lemieux | |
| 6,208,247 B1 | 3/2001 | Agre et al. | |
| 6,208,266 B1 | 3/2001 | Lyons et al. | |
| 6,212,175 B1 | 4/2001 | Harsch | |
| 6,215,404 B1 | 4/2001 | Morales | |
| 6,215,440 B1 | 4/2001 | Geldart et al. | |
| 6,218,953 B1 | 4/2001 | Petite | |
| 6,218,958 B1 | 4/2001 | Eichstaedt et al. | |
| 6,218,983 B1 | 4/2001 | Kerry et al. | |
| 6,219,409 B1 | 4/2001 | Smith et al. | |
| 6,229,439 B1 | 5/2001 | Tice | |
| 6,233,327 B1 | 5/2001 | Petite | |
| 6,234,111 B1 | 5/2001 | Ulman et al. | |
| 6,236,332 B1 | 5/2001 | Conkright et al. | |
| 6,243,010 B1 | 6/2001 | Addy et al. | |
| 6,246,676 B1 | 6/2001 | Chen et al. | |
| 6,246,677 B1 | 6/2001 | Nap et al. | |
| 6,246,886 B1 | 6/2001 | Oliva | |
| 6,249,516 B1 | 6/2001 | Brownrigg et al. | |
| 6,259,369 B1 | 7/2001 | Monico | |
| 6,271,752 B1 | 8/2001 | Vaios | |
| 6,275,166 B1 | 8/2001 | del Castillo et al. | |
| 6,275,707 B1 | 8/2001 | Reed et al. | |
| 6,286,050 B1 | 9/2001 | Pullen et al. | |
| 6,286,756 B1 | 9/2001 | Stinson et al. | |
| 6,288,634 B1 | 9/2001 | Weiss et al. | |
| 6,288,641 B1 | 9/2001 | Casais | |
| 6,288,646 B1 * | 9/2001 | Skardon | 340/627 |
| 6,295,291 B1 | 9/2001 | Larkins | |
| 6,301,514 B1 | 10/2001 | Canada et al. | |
| 6,304,556 B1 | 10/2001 | Haas | |
| 6,305,205 B1 | 10/2001 | Derks et al. | |
| 6,305,602 B1 | 10/2001 | Grabowski et al. | |
| 6,307,843 B1 | 10/2001 | Okanoue | |
| 6,308,111 B1 | 10/2001 | Koga | |
| 6,311,167 B1 | 10/2001 | Davis et al. | |
| 6,314,169 B1 | 11/2001 | Schelberg, Jr. et al. | |
| 6,317,029 B1 | 11/2001 | Fleeter | |
| 6,327,245 B1 | 12/2001 | Satyanarayana et al. | |
| 6,329,902 B1 | 12/2001 | Lee et al. | |
| 6,334,117 B1 | 12/2001 | Covert et al. | |
| 6,351,223 B1 | 2/2002 | DeWeerd et al. | |
| 6,356,205 B1 * | 3/2002 | Salvo et al. | 340/853.3 |
| 6,357,034 B1 | 3/2002 | Muller et al. | |
| 6,362,745 B1 | 3/2002 | Davis | |
| 6,363,057 B1 | 3/2002 | Ardalan et al. | |
| 6,363,422 B1 | 3/2002 | Hunter et al. | |
| 6,366,217 B1 | 4/2002 | Cunningham et al. | |
| 6,366,622 B1 | 4/2002 | Brown et al. | |
| 6,369,769 B1 | 4/2002 | Nap et al. | |
| 6,370,489 B1 | 4/2002 | Williams et al. | |
| 6,373,399 B1 | 4/2002 | Johnson et al. | |
| 6,380,851 B1 | 4/2002 | Gilbert et al. | |
| 6,384,722 B1 | 5/2002 | Williams | |
| 6,389,477 B1 | 5/2002 | Simmon et al. | |
| 6,392,692 B1 | 5/2002 | Monroe | |
| 6,393,341 B1 | 5/2002 | Lawrence et al. | |
| 6,393,381 B1 | 5/2002 | Williams et al. | |
| 6,393,382 B1 | 5/2002 | Williams et al. | |
| 6,396,839 B1 | 5/2002 | Ardalan et al. | |
| 6,400,819 B1 | 6/2002 | Nakano et al. | |
| 6,401,081 B1 | 6/2002 | Montgomery et al. | |
| 6,405,018 B1 | 6/2002 | Reudink et al. | |
| 6,405,135 B1 * | 6/2002 | Adriany et al. | 702/5 |
| 6,411,889 B1 | 6/2002 | Mizunuma et al. | |
| 6,415,155 B1 | 7/2002 | Koshima et al. | |
| 6,415,245 B2 | 7/2002 | Williams et al. | |
| 6,416,471 B1 | 7/2002 | Kumar et al. | |
| 6,421,354 B1 | 7/2002 | Godlewski | |
| 6,421,731 B1 | 7/2002 | Ciotti, Jr. et al. | |
| 6,422,464 B1 | 7/2002 | Terranova | |
| 6,424,270 B1 | 7/2002 | Ali | |
| 6,424,931 B1 | 7/2002 | Sigmar et al. | |
| 6,430,268 B1 | 8/2002 | Petite | |
| 6,431,439 B1 | 8/2002 | Suer et al. | |
| 6,437,692 B1 | 8/2002 | Petite et al. | |
| 6,438,575 B1 | 8/2002 | Khan et al. | |
| 6,441,723 B1 | 8/2002 | Mansfield, Jr. et al. | |
| 6,445,291 B2 | 9/2002 | Addy et al. | |
| 6,456,960 B1 | 9/2002 | Williams et al. | |
| 6,457,038 B1 | 9/2002 | Defosse | |
| 6,462,644 B1 | 10/2002 | Howell et al. | |
| 6,462,672 B1 | 10/2002 | Besson | |
| 6,477,558 B1 | 11/2002 | Irving et al. | |
| 6,483,290 B1 | 11/2002 | Hemminger et al. | |

(56) References Cited

U.S. PATENT DOCUMENTS

| | | |
|---|---|---|
| 6,484,939 B1 | 11/2002 | Blaeuer |
| 6,489,884 B1 | 12/2002 | Lamberson et al. |
| 6,491,828 B1 | 12/2002 | Sivavec et al. |
| 6,492,910 B1 | 12/2002 | Ragle et al. |
| 6,496,696 B1 | 12/2002 | Melnik |
| 6,504,357 B1 | 1/2003 | Hemminger et al. |
| 6,504,834 B1 | 1/2003 | Fifield |
| 6,507,794 B1 | 1/2003 | Hubbard et al. |
| 6,509,722 B2 | 1/2003 | Lopata |
| 6,513,060 B1 | 1/2003 | Nixon et al. |
| 6,515,586 B1 | 2/2003 | Wymore |
| 6,519,568 B1 | 2/2003 | Harvey et al. |
| 6,532,077 B1 | 3/2003 | Arakawa |
| 6,538,577 B1 | 3/2003 | Ehrke et al. |
| 6,542,076 B1 | 4/2003 | Joao |
| 6,542,077 B2 | 4/2003 | Joao |
| 6,543,690 B2 | 4/2003 | Leydier et al. |
| 6,560,223 B1 | 5/2003 | Egan et al. |
| 6,574,234 B1 | 6/2003 | Myer et al. |
| 6,574,603 B1 | 6/2003 | Dickson et al. |
| 6,584,080 B1 | 6/2003 | Ganz et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B2 | 11/2003 | Johnson et al. |
| 6,654,357 B1 | 11/2003 | Wiedeman |
| 6,665,278 B2 | 12/2003 | Grayson |
| 6,671,586 B2 | 12/2003 | Davis et al. |
| 6,671,819 B1 | 12/2003 | Passman et al. |
| 6,674,403 B2 | 1/2004 | Gray et al. |
| 6,678,255 B1 | 1/2004 | Kuriyan |
| 6,678,285 B1 | 1/2004 | Garg |
| 6,691,173 B2 | 2/2004 | Morris et al. |
| 6,731,201 B1 | 5/2004 | Sharood et al. |
| 6,735,630 B1 | 5/2004 | Gelvin et al. |
| 6,747,557 B1 | 6/2004 | Petite et al. |
| 6,751,196 B1 | 6/2004 | Hulyalkar et al. |
| 6,771,981 B1 | 8/2004 | Zalewski et al. |
| 6,775,258 B1 | 8/2004 | van Valkenburg et al. |
| 6,804,532 B1 | 10/2004 | Moon et al. |
| 6,816,088 B1 | 11/2004 | Knoskat et al. |
| 6,826,607 B1 | 11/2004 | Gelvin et al. |
| 6,832,251 B1 | 12/2004 | Gelvin et al. |
| 6,842,430 B1 | 1/2005 | Melnik |
| 6,858,876 B2 | 2/2005 | Gordon et al. |
| 6,859,831 B1 | 2/2005 | Gelvin et al. |
| 6,888,876 B1 | 5/2005 | Mason, Jr. et al. |
| 6,891,838 B1 | 5/2005 | Petite et al. |
| 6,900,737 B1 | 5/2005 | Ardalan et al. |
| 6,906,636 B1 | 6/2005 | Kraml |
| 6,914,533 B2 | 7/2005 | Petite |
| 6,914,893 B2 | 7/2005 | Petite |
| 6,922,558 B2 | 7/2005 | Delp et al. |
| 6,959,550 B2 | 11/2005 | Freeman et al. |
| 6,970,434 B1 | 11/2005 | Mahany et al. |
| 7,020,701 B1 | 3/2006 | Gelvin et al. |
| 7,027,416 B1 | 4/2006 | Kriz |
| 7,027,773 B1 | 4/2006 | McMillin |
| 7,053,767 B2 | 5/2006 | Petite et al. |
| 7,054,271 B2 | 5/2006 | Brownrigg et al. |
| 7,064,679 B2 | 6/2006 | Ehrke et al. |
| 7,103,511 B2 | 9/2006 | Petite |
| 7,117,239 B1 | 10/2006 | Hansen |
| 7,181,501 B2 | 2/2007 | Defosse |
| 7,254,372 B2 | 8/2007 | Janusz et al. |
| 7,304,587 B2 | 12/2007 | Boaz |
| 7,349,682 B1 | 3/2008 | Bennett, III et al. |
| 7,424,527 B2 | 9/2008 | Petite |
| 7,468,661 B2 | 12/2008 | Petite et al. |
| 7,480,501 B2 | 1/2009 | Petite |
| 7,484,008 B1 | 1/2009 | Gelvin et al. |
| 7,573,813 B2 | 8/2009 | Melnik |
| 7,653,394 B2 | 1/2010 | McMillin |
| 7,739,378 B2 | 6/2010 | Petite |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0012323 A1 | 1/2002 | Petite et al. |
| 2002/0013679 A1 | 1/2002 | Petite |
| 2002/0016829 A1 | 2/2002 | Defosse |
| 2002/0019725 A1 | 2/2002 | Petite |
| 2002/0027504 A1 | 3/2002 | Davis et al. |
| 2002/0031101 A1 | 3/2002 | Petite et al. |
| 2002/0032560 A1 | 3/2002 | Simmon et al. |
| 2002/0032746 A1 | 3/2002 | Lazaridis |
| 2002/0035637 A1 | 3/2002 | Simmon et al. |
| 2002/0036619 A1 | 3/2002 | Simmon et al. |
| 2002/0038377 A1 | 3/2002 | Simmon et al. |
| 2002/0038378 A1 | 3/2002 | Simmon et al. |
| 2002/0040406 A1 | 4/2002 | Simmon et al. |
| 2002/0061031 A1 | 5/2002 | Sugar et al. |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0097273 A1 | 7/2002 | Simmon et al. |
| 2002/0098858 A1 | 7/2002 | Struhsaker |
| 2002/0109607 A1 | 8/2002 | Cumeralto et al. |
| 2002/0136233 A1 | 9/2002 | Chen et al. |
| 2002/0158774 A1 | 10/2002 | Johnson et al. |
| 2002/0163442 A1 | 11/2002 | Fischer |
| 2002/0169643 A1 | 11/2002 | Petite et al. |
| 2002/0184384 A1 | 12/2002 | Simmon et al. |
| 2002/0193144 A1 | 12/2002 | Belski et al. |
| 2003/0001754 A1 | 1/2003 | Johnson et al. |
| 2003/0023146 A1 | 1/2003 | Shusterman |
| 2003/0028632 A1 | 2/2003 | Davis |
| 2003/0030926 A1 | 2/2003 | Aguren et al. |
| 2003/0034900 A1 | 2/2003 | Han |
| 2003/0035438 A1 | 2/2003 | Larsson |
| 2003/0036822 A1 | 2/2003 | Davis et al. |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0073406 A1 | 4/2003 | Benjamin et al. |
| 2003/0078029 A1 | 4/2003 | Petite |
| 2003/0093484 A1 | 5/2003 | Petite |
| 2003/0133473 A1 | 7/2003 | Manis et al. |
| 2003/0169710 A1 | 9/2003 | Fan et al. |
| 2003/0185204 A1 | 10/2003 | Murdock |
| 2003/0210638 A1 | 11/2003 | Yoo et al. |
| 2004/0047324 A1 | 3/2004 | Diener |
| 2004/0053639 A1 | 3/2004 | Petite et al. |
| 2004/0090950 A1 | 5/2004 | Lauber et al. |
| 2004/0113810 A1 | 6/2004 | Mason, Jr. et al. |
| 2004/0131125 A1 | 7/2004 | Sanderford, Jr. et al. |
| 2004/0133917 A1 | 7/2004 | Schilling |
| 2004/0183687 A1 | 9/2004 | Petite et al. |
| 2004/0228330 A1 | 11/2004 | Kubler et al. |
| 2005/0017068 A1 | 1/2005 | Zalewski et al. |
| 2005/0190055 A1 | 9/2005 | Petite |
| 2005/0195768 A1 | 9/2005 | Petite et al. |
| 2005/0195775 A1 | 9/2005 | Petite et al. |
| 2005/0201397 A1 | 9/2005 | Petite |
| 2005/0243867 A1 | 11/2005 | Petite |
| 2005/0270173 A1 | 12/2005 | Boaz |
| 2006/0095876 A1 | 5/2006 | Chandra |
| 2007/0112907 A1 | 5/2007 | Defosse |
| 2008/0186898 A1 | 8/2008 | Petite |
| 2009/0006617 A1 | 1/2009 | Petite |
| 2009/0068947 A1 | 3/2009 | Petite |
| 2009/0096605 A1 | 4/2009 | Petite |
| 2009/0215424 A1 | 8/2009 | Petite |

(56) References Cited

U.S. PATENT DOCUMENTS

| | | |
|---|---|---|
| 2009/0243840 A1 | 10/2009 | Petite et al. |
| 2010/0250054 A1 | 9/2010 | Petite |

FOREIGN PATENT DOCUMENTS

| | | |
|---|---|---|
| DE | 2205336 | 8/1973 |
| DE | 4401443 | 8/1994 |
| EP | 0483547 A1 | 5/1992 |
| EP | 0578041 B1 | 1/1994 |
| EP | 0663746 B1 | 7/1995 |
| EP | 0718954 A1 | 6/1996 |
| EP | 0740873 B1 | 11/1996 |
| EP | 0749259 A2 | 12/1996 |
| EP | 0749260 A2 | 12/1996 |
| EP | 0766489 A2 | 4/1997 |
| EP | 0768777 A2 | 4/1997 |
| EP | 0812502 B1 | 12/1997 |
| EP | 0825577 A1 | 2/1998 |
| EP | 0550517 | 12/1998 |
| EP | 0999717 A2 | 5/2000 |
| EP | 1096454 A2 | 5/2001 |
| FR | 2126301 | 10/1972 |
| FR | 2624749 | 6/1989 |
| FR | 2817110 A1 | 5/2002 |
| GB | 1384573 | 2/1975 |
| GB | 2229302 A | 9/1990 |
| GB | 2247761 A | 3/1992 |
| GB | 2262683 A | 6/1993 |
| GB | 2297663 A | 8/1996 |
| GB | 2310779 A | 9/1997 |
| GB | 2326002 A | 12/1998 |
| GB | 2336272 A | 10/1999 |
| GB | 2352004 A | 1/2001 |
| GB | 2352590 A | 1/2001 |
| JP | 60261288 A | 12/1985 |
| JP | 1255100 A | 10/1989 |
| JP | 11353573 A | 12/1999 |
| JP | 2000113590 A | 4/2000 |
| JP | 2001063425 A | 3/2001 |
| JP | 2001088401 A | 4/2001 |
| JP | 2001309069 A | 11/2001 |
| JP | 2001319284 A | 11/2001 |
| JP | 2001357483 A | 12/2001 |
| JP | 2002007672 A | 1/2002 |
| JP | 2002007826 A | 1/2002 |
| JP | 2002085354 A | 3/2002 |
| JP | 2002171354 A | 6/2002 |
| KR | 2001025431 A | 4/2001 |
| SE | 377048 | 6/1975 |
| WO | WO 90/13197 | 11/1990 |
| WO | WO 95/12942 | 5/1995 |
| WO | WO 95/24177 | 9/1995 |
| WO | WO 95/34177 | 12/1995 |
| WO | WO 96/10307 | 4/1996 |
| WO | WO 97/00708 | 1/1997 |
| WO | WO 98/00056 | 1/1998 |
| WO | WO 98/10393 | 3/1998 |
| WO | WO 98/37528 | 8/1998 |
| WO | WO 98/45717 | 10/1998 |
| WO | WO 99/13426 | 3/1999 |
| WO | WO 99/45510 | 9/1999 |
| WO | WO 99/48065 | 9/1999 |
| WO | WO 00/23956 | 4/2000 |
| WO | WO 00/36812 | 6/2000 |
| WO | WO 00/55825 | 9/2000 |
| WO | WO 00/58745 | 10/2000 |
| WO | WO 01/15114 | 3/2001 |
| WO | WO 01/24109 | 4/2001 |
| WO | WO 01/35190 | 5/2001 |
| WO | WO 02/08725 | 1/2002 |
| WO | WO 02/08866 | 1/2002 |
| WO | WO 02/052521 | 7/2002 |
| WO | WO 03/007264 | 1/2003 |
| WO | WO 03/021877 | 3/2003 |
| WO | WO 2004/002014 | 12/2003 |

OTHER PUBLICATIONS

Mak et al., "Design Considerations for Implementation of Large Scale Automatic Meter Reading Systems," IEEE Transactions on Power Delivery, vol. 10, No. 1, Jan. 1995, pp. 97-103.

Malkin, "RFC 2453, RIP Version 2 (Nov. 1998)," available at http://tools.ietf.org/html/rfc2453, Jun. 24, 2009, pp. 1-40.

Maltz et al., "Experiences Designing and Building a Multi-Hop Wireless Ad Hoc Network Testbed", School of Computer Science, Carnegie Mellon University, pp. 1-22, Mar. 5, 1999.

Maltz, "On-Demand Routing in Multi-Hop Wireless Mobile Ad Hoc Networks," Thesis, May 2001, pp. 1-192.

Marcy et al., "Wireless Sensor Networks for Area Monitoring and Iintegrated Vehicle Health Management Applications," Rockwell Science Center, Thousand Oaks, CA, AIAA-99/4557; Date: unknown, pp. 1-11.

Markie et al., "LonWorks and PC/104: A winning combination," PC/104 Embedded Solutions, Summer 1998, pp. 1-8.

Martel et al., "Home Automation Report: A Modular Minimum Complexity, High-Resolution and Low CostField Device Implementation for Home Automation and Healthcare," MIT; Publisher: unknown; Mar. 31, 1998; pp. 1-29.

McQuillan et al., "The ARPA Network Design Decisions," Computer Networks, vol. 1, No. 5, Aug. 1977 pp. 243-289.

McQuillan et al., "The New Routing Algorithm for the ARPANET," IEEE Transactions on Communications, vol. COM-28, No. 5, May 1980, pp. 711-719.

Mills, "Exterior Gateway Protocol Formal Specification" (Apr. 1984), RFC 904, available at http://tools.ietf.org/html/rfc904, Jun. 24, 2009, pp. 1-32.

Moorman, "Packet Radio Used in a Cost-Effective Automated Weather Meso-Net," available at http://www.wrh.noaa.gov/wrh/96TAs/TA963 1/ta96-31.html, Dec. 3, 1996 (5 pages).

Moy, "RFC 2328, OSPF Version 2 (Apr. 1998)," available at http://tools.ietf.org/html/rfc2328, Jun. 24, 2009, pp. 1-245.

Mozer et al., "The Neural Network House: an Overview," in L. Niklasson & Boden (eds.), Current trends in connectionism (pp. 371-380); Hillsdale: Erlbaun, 1995; pp. 1-9.

Murthy et al., "An Efficient Routing Protocol for Wireless Networks, Mobile Networks and Applications 1," (1996), pp. 183-197.

Natkunanathan et al. "WINS: Signal Search Engine for Signal Classification," EED, UCLA; Date: unknown; pp. 1-6.

Natkunanathan et al., "A Signal Search Engine for Wireless Integrated Network Sensors," EED, UCLA Electrical Engineering Department;; Date: unkown; pp. 1-4.

Negus et al., "HomeRF™ and SWAP: Wireless Networking for the Connected Home," ACM SIGMOBILE Mobile Computing and Communications Review, vol. 2, Issue 4, Oct. 1998, available at http://portal.acm.org/citation.cfm?id=1321400.1321401 on Mar. 29, 2009, pp. 1-2.

Negus et al., "HomeRF™ and SWAP: Wireless Networking for the Connected Home," Mobile Computing and Communications Review, vol. 2, No. 4, Date: unknown, pp. 28-37.

NEXTGEN Searches, "IPCO v. The Wireless Sensor Network Industry? Special Report on IPCO v. ONCOR et al.," Corporate Manager's Edition, 2009, pp. 1-16.

Nilsen et al., "Storage Monitoring Systems for the Year 2000," Dept. of Energy, Office of Scientific and Technical Information, Report No. SAND—97-8532C, available at http://www.osti.gov/bridge/product.biblio.jsp?query_id=3&page=0&osti_id=303988 (1997).

Ondo, "PLRS/JTIDS Hybrid," Filled Artillery Journal, Jan.-Feb. 1981, pp. 20-25.

Oran (ed.), "OSI IS-IS Intra-Domain Routing Protocol," RFC 1142 (Feb. 1990), available at http://tools.ietf.org/html/rfc1142, Jun. 24, 2009, pp. 1-665.

Park et al., "SensorSim: A Simulation Framework for Sensor Networks," ACM, 2000, pp. 104-111.

Perkins et al., "A Mobile Networking System Based on Internet Protocol," Publisher: unknown, Date: unknown, pp. 1-17.

(56) References Cited

OTHER PUBLICATIONS

Perkins et al., "Ad-Hoc On-Demand Distance Vector Routing "AODV"," http://moment.cs.ucsb.edu/AODV/aodv.html, Aug. 25, 2009, pp. 1-5.
Perkins et al., "Continuous, transparent network access for portable users, A Mobile Networking System Based on Internet Protocol," IEEE Personal Communications, First Quarter 1994, pp. 32-41.
Perkins et al., "Highly Dynamic Destination-Sequenced Distance-Vector Routing (DSDV) for Mobile Computers," SIGCOM Conference on Communications Architectures, Protocols ans Applications, London England UK (Aug. 1994); pp. 234-244.
Perkins et al., "Mobility Support in IPv6," Internet Draft (Sep. 22, 1994), available at http://www.monarch.cs.rice.edu/internet-draft/draft-perkins-ipv6-mobility-sup-oo.txt., Sep. 26, 2009, pp. 1-13.
Perkins et al., "RFC3561—Ad Hoc On-Demand Distance Vector (AODV) Routing (Jul. 2003)," available at http://tools.ietf.org/html?rfc3561, Aug. 25, 2009, pp. 1-38.
Pittway Corporation, "Company History," available at http://www.funduniverse.com/company-histories/Pittway-Corporation Mar. 6, 2009, pp. 1-5.
Plaintiffs' Opening Markman Brief in Support of Their Proposed Claim Constructions, filed by the patent owner and its co-plaintiff in *SIPCO LLC et al. v. The Toro Co. et al.*, Case No. 2:08-cv-00505-TJS (E.D. Pa.) filed on Sep. 26, 2008.
Pleading—Defendant Digi International Inc.'s First Amended Answer and Defenses of *SIPCO, LLC v. Control4 Corporation et al.*, Civil Action No. 6:10-cv-249, currently pending in the U.S. District Court for the Eastern District of Texas, Tyler Division, filed Nov. 22, 2010, pp. 1-27.
Pleading—Defendant Siemens Industry, Inc.'S First Amended Answer and Defenses of *SIPCO, LLC v. Control4 Corporation et al.*, Civil Action No. 6:10-cv-249, currently pending in the U.S. District Court for the Eastern District of Texas, Tyler Division, filed Nov. 22, 2010, pp. 1-27.
Pleading—Defendant The Toro Company, The Toro Company's Second Supplemented Objections and Answers to Plaintiffs SIPCO LLC and Advanced Sensor Technology, Inc.'s Interrogatory No. 4 to Defendant *The Toro Company of SIPCO LLC, et al. v. The Toro Company et al.*, Civil Action No. 08-CV-00505-TJS (pp. 1-9).
Pleading—Defendant The Toro Company, Third Supplemented Objections and Answers to Plaintiffs SIPCO LLC and Advanced Sensor Technology, Inc.'s Interrogatory No. 4 to Defendant *The Toro Company of SIPCO LLC, et al. v. The Toro Company et al.*, Civil Action No. 08-CV-00505-TJS (pp. 1-9).
Pleading—Expert Report of Randy H. Katz, Ph. D, of *SIPCO, LLC et al. v. The Toro Company et al.*, Case No. 2:08-cv-00505.
Poor, Robert D., "Hyphos: A Self-Organizing, Wireless Network," Massachusetts Institute of Technology (Jun. 1997).
Postel (ed.), "Transmission Control Protocol, Version 4," RFC793, available at http://www.faqs.org/rfcs/rfc793.html, Sep. 1981, pp. 1-85.
Postel (Editor), "Internet Protocol, DARPA Internet Program Protocol Specification," RFC 791 (Sep. 1981), Information Sciences Institute, University of So. Cal., pp. 1-45.
Pottie et al., "Adaptive Wireless Arrays for Interactive RSTA in SUO (AWAIRS)," UCLA, Electrical Engineering Department; Date: unknown, pp. 1-20.
Pottie et al., "Adaptive Wireless Arrays Interactive Recconaissance, Surveillance, and Target Acquisition in Small Unit Operations (AWAIRS); Lower Power Wireless Integrated Microsensors (LWIM)," Presented to Dr. E. Carapezza, Dr. D. Lao and Lt. Col. J. Hernandez, UCLA, Rockwell Science Center; Mar. 21, 1997, pp. 1-110.
Pottie et al., "WINS: Principles and Practice," EDD, UCLA; Date: unknown, pp. 1-10.
Pottie et al., "Wireless Integrated Network Sensors," Communications of the ACM, vol. 43, No. 5, May 2000, pp. 51-58.
Pottie et al., "Wireless Integrated Network Sensors: Towards Low Cost and Robust Self-Organizing Security Networks;" EED, UCLA; Rockwell Science Center; SPIE vol. 3577, Nov. 1, 1998, pp. 86-95.
Pottie, "AWAIRS: Mini-Site Review, Project Status," UCLA: Rockwell Science Center, Feb. 23, 1998, pp. 1-58.
Pottie, "Hierarchical Information Processing in Distributed Sensor Networks," ISIT, Aug. 16-21, 1998, IEEE, 1998, pp. 163.
Pottie, "R&D Quarterly and Annual Status Report," SPAWAR (contractor), Apr. 31, 1999.
Pottie, "Wireless Sensor Networks," ITW 1998, Jun. 22-26, 1998, available at http://dantzig.ee.ucla.edu/oclab/Pottie.html, 2 pages.
Printout of 47 C.F.R. 15 (131 pages).
Rabaey et al., "PicoRadio Support Ad Hoc Ultra-Low Power Wireless Networking," Computer, IEEE, Jul. 2000, pp. 42-48.
Radlherr, "Datentransfer Ohne Draht und Telefon," Funkschau, Nov. 1991, pp. 49-52.
Raji, "Control Networks and the Internet, Rev. 2.0," Echelon Corp., 1998, pp. 1-39.
Raji, "End-to-End Solutions with LonWorks® Control Technology: Any Point, Any Time, Any Where," Echelon Corp.;, 1998, pp. 1-30.
Raji, "Control Networks and the Internet," Echelon Corp., Rev. 2.0, available at http://www.echelon.com/solutions/opensystems/papers/Control_Internet.pdf (1998).
Rants and Ramblings, "Go Wireless . . . At a Payphone," May 10, 2003, http://www.morethanthis.net/blog/archives/2003/05/10/000301.html (2 pages).
Reexamination Control No. 90-008011 Request for Ex Parte Reexamination of 6,044,062.
Reexamination Control No. 90-008011 Grant of Reexamination Request.
Reexamination Control No. 90-008011 Non-Final Office Action dated Nov. 19, 2007.
Reexamination Control No. 90-008011 Final Office Action dated Aug. 13, 2008.
Reexamination Control No. 90-010301 Request for Ex Parte Reexamination of 6,891,838.
Reexamination Control No. 90-010315 Request for Ex Parte Reexamination of 7,103,511.
Reexamination Control No. 90-010301 Grant of Reexamination Request.
Reexamination Control No. 90-010315 Denial of Reexamination Request.
Reexamination Control No. 90-010315 Petition to Review Denial of Request for Reexamination.
Reexamination Control No. 90-010507 Request for Ex Parte Reexamination of 7,103,511.
Reexamination Control No. 90-010509 Request for Ex Parte Reexamination of 7,103,511.
Reexamination Control No. 90-010510 Request for Ex Parte Reexamination of 6,891,838.
Reexamination Control No. 90-010505 Substitute Request for Ex Parte Reexamination of 7,103,511.
Reexamination Control No. 90-010507 Substitute Request for Ex Parte Reexamination of 7,103,511.
Reexamination Control No. 90-010508 Substitute Request for Ex Parte Reexamination of 7,103,511.
Reexamination Control No. 90-010509 Substitute Request for Ex Parte Reexamination of 7,103,511.
Reexamination Control No. 90-010510 Substitute Request for Ex Parte Reexamination of 6,891,838.
Reexamination Control No. 90-010511 Substitute Request for Ex Parte Reexamination of 6,891,838.
Reexamination Control No. 90-010512 Substitute Request for Ex Parte Reexamination of 6,891,838.
Reexamination Control No. 90-010505 Grant of Reexamination Request.
Reexamination Control No. 90-010507 Grant of Reexamination Request.
Reexamination Control No. 90-010508 Grant of Reexamination Request.
Reexamination Control No. 90-010509 Grant of Reexamination Request.
Reexamination Control No. 90-010510 Grant of Reexamination Request.
Reexamination Control No. 90-010511 Grant of Reexamination Request.

(56) References Cited

OTHER PUBLICATIONS

Reexamination Control No. 90-010512 Grant of Reexamination Request.
Reexamination Control No. 90-010301 Non-Final Office Action dated Dec. 2, 2009.
Reexamination Control No. 90-010315 Denial of Petition to Review Denial of Request for Reexamination.
Reexamination Control No. 90-010505 Non-Final Office Action dated Mar. 3, 2010.
Reexamination Control No. 90-010507 Non-Final Office Action dated Mar. 3, 2010.
Reexamination Control No. 90-010508 Non-Final Office Action dated Mar. 3, 2010.
Reexamination Control No. 90-010509 Non-Final Office Action dated Mar. 3, 2010.
Reexamination Control No. 90-008011 Examiner Answer to Appeal Brief.
Reexamination Control No. 90-010505 Final Office Action dated Aug. 2, 2010.
Reexamination Control No. 90-010507 Final Office Action dated Aug. 2, 2010.
Reexamination Control No. 90-010508 Final Office Action dated Aug. 2, 2010.
Reexamination Control No. 90-010509 Final Office Action dated Aug. 2, 2010.
Reexamination Control No. 90-010510 Final Office Action dated Aug. 20, 2010.
Reexamination Control No. 90-010511 Final Office Action dated Aug. 20, 2010.
Reexamination Control No. 90-010512 Final Office Action dated Aug. 20, 2010.
Reexamination Control No. 90-010301 Final Office Action dated Nov. 5, 2010.
Reexamination Control No. 90-010510 Final Office Action dated Nov. 5, 2010.
Reexamination Control No. 90-010511 Final Office Action dated Nov. 5, 2010.
Reexamination Control No. 90-010512 Final Office Action dated Nov. 5, 2010.
Reexamination Control No. 90-008011 BPAI Decision.
Reexamination Control No. 90-010510 Non-Final Office Action dated Dec. 2, 2009.
Reexamination Control No. 90-010511 Non-Final Office Action dated Dec. 2, 2009.
Reexamination Control No. 90-010512 Non-Final Office Action dated Dec. 2, 2009.
Reexamination Control No. 90-010301 Notice of Intent to Issue Reexam Certificate dated Dec. 13, 2010.
"1997 Project Summary, Held Untethered Nodes, University of California at Los Angeles," available at http://web.archive.org/web/199812052324758/http://www.darpa.mil/leaving.asp?url=http://www.janet.ucla.edu/glomo, Jul. 25, 2008, pp. 1-5.
"1997 Project Summary, Mobile Versatile Radios (MoVeR), University of California at Los Angeles," available at http://web.archive.org/web/19990222140122/http://www.darpa.mil/leaving.asp?url=http://www.janet.ucla.edu/, Jul. 25, 2008, pp. 1-4.
"1997 Project Summary, Towards a Wireless Overlay Internetworking Architecture, University of California at Berkeley," available at http://web.archive.org/web/19990202065939/http://www.darpa.mil/leaving.asp?url=http://daedalus.cs.berkeley.edu, Jul. 25, 2008, pp. 1-8.
"3Com Invests in Coactive Networks," Coactive (press release), Author: unknown, Dec. 14, 1999, pp. 1-4.
"5808 Photoelectric Smoke/Heat Detector with Built0in Wireless Transmitter Installation Instructions," Ademco, 1998.
"ABB Kent-Taylor Interfacing," Author: unknown, Engineering Report, No. 93-011, Jun. 18, 1996, pp. 1-9.
"AES Central Station Installation & Operation Manual, Document No. 40-0551e," AES Intellinet, Nov. 1996.
"AlarmNet-C Service Shutdown," Honeywell, Inc., Author: unknown, Date: unknown, pp. 1.
"Allen-Bradley Interfacing," Author: unknown, Engineering Report, No. 90-023, Jul. 21, 1999, pp. 1-11.
AN/TSQ-129 Position Location Reporting System (PLRS), Author: unknown, available at http://www.fas.org/man/dod-101/sys/land/plrs.htm on Feb. 22, 2010, pp. 1-3.
"AWAIRS Adaptive Wireless Arrays Interactive Recconaissance, Surveillance, and Target Acquisition in Small Unit Operations".
"Barrington Interface," Author: unknown, Engineering Report, No. 90-013, Revised: Oct. 1994, pp. 1.
Bell Canada launches public wireless Internet hotspot pilot, Dec. 10, 2002, http://www.bell.ca/3n/about/press/release/2002/pr_20021210.asp (3 pages).
"Bristol Babcock Interfacing," Author: unknown, Engineering Report, No. 95-001, Revised: Apr. 17, 1996, pp. 1-4.
"Caddx Installation Instructions Package, document No. 466-1486," Caddx Controls, Aug. 1998.
"Caddx Installation Instructions Package, document No. 466-1786," CADDX Installation Controls, Inc., Caddx Controls; Author: unknown; Aug. 1998, pp. 1-58.
"Caddx Installation Instructions Package," document No. 466-1786, CADDX Installation Controls, Inc., Caddx Controls; Author: unknown; Jul. 15, 1999, pp. 1-116.
"CADDX NetworX NX-8 Control/Communicator Installation Manual," Caddx Controls, 1996.
"Case Study: Genentech Uses Coactive's Technology to Centralize Monitor and Control Functions in a Mixed Legacy and New Equipment Environment," Coactive, Author: unknown, 1998, pp. 1-4.
"Case Study: Ingham Regional Medical Center Uses Coactive Technology to Monitor and Control Critical Power Generations in a Multi-Campus Environment," Coactive, 1998, pp. 1-4.
"Central Station Manual Section 1 System Overview, document No. 40/0551," AES Intellinet, Dec. 1996.
"Circon Systems Partners with Coactive Networks to Deliver Circon WebControl™," Coactive (press release), Author: unknown; Feb. 7, 2000, pp. 1-4.
"Circon Technology Connects Building Management Systems to Internet Using Coactive Routers," Coactive (press release), May 20, 1997.
"Cisco's John Chambers Discusses the Internet Consumer Revolution at CES Using Demo Based on Echelon's LonWorks Technology," Home Toys (press release), Jan. 8, 1999.
Coactive Bridges Gap between Control Systems and Corporate Data Networks with New Off-the-Shelf Router Family, Coactive (press release), Jun. 8, 1998.
"Coactive Enhances Residential Gateway to Enable Multiple Home Networks," Coactive (press release), Author: unknown; Jan. 6, 2000, pp. 1-4.
"Coactive Joins 3Com to Demonstrate Convergence of Control and Enterprise Networks at Retail Systems '98," Coactive (press release), Author: unknown, Jun. 16, 1998, pp. 1-4.
"Coactive Launches First Architecture to Support the Convergence Between Contol and IP Networks," Coactive (press release), Author: unknown, May 20, 1998, pp. 1-4.
"Coactive Leads Standardization Effort for Lon/Talk Routers," Coactive (press release), Author: unknown, May 20, 1997. pp. 3.
"Coactive Networks and Diverse Networks Team to Deliver End-to-End Infrastructure for Enabling the Digital Home," Coactive (press release), Author: unknown, Aug. 28, 2000, pp. 1-4.
"Coactive Networks and Innovex Technologies Deliver Internet Access to Home Security, Lighting and Climate Control," Coactive (press release), Author: unknown, Feb. 29, 2000, pp. 1-4.
"Coactive Networks and Silicon Energy Partner to Deliever an End-to-End Solution for Internet-Based Energy Monitoring and Analysis," Coactive (press release), Author: unknown, Sep. 19, 2000, pp. 1-4.
"Coactive Networks and Vicinium Systems team to Deliver a Complete Television-Based Interface to Digital Homes and Neighborhoods," Coactive (press release), Author: unknown, Jun. 19, 2000, pp. 1-4.

(56) References Cited

OTHER PUBLICATIONS

"Coactive Networks Announces First Shipments of Internet Gateway to Home Control Systems," Coactive (press release), Author: unknown, May 3, 1999, pp. 1- 4.
"Coactive Networks Announces Formation of Technical Advisory Board," Coactive (press release), Author: unknown, Oct. 5, 1998, pp. 1-4.
"Coactive Networks Announces System Provider Partner Program," Coactive (press release), Author: unknown, Jan. 25, 1999, pp. 1-4.
"Coactive Networks Expands Support for Management and HMI Applications," Coactive (press release), Author: unknown, Nov. 2, 1998, pp. 1-4.
"Coactive Networks Names Gus Ezcurra Vice President of Sales," Coactive (press release), Author: unknown, Jul. 20, 1998, pp. 2.
"Coactive Networks Names Janice Roberts, 3Com Senior VP, to Board of Directors," Coactive (press release), Author: unknown, Jun. 2, 1998, pp. 2.
"Coactive Networks Powers Innovative Energy Management Solution," Coactive (press release), Author: unknown, Jan. 5, 2001, pp. 1-4.
"Coactive Networks President Named to LonMark Board of Directors," Coactive (press release), Jun. 14, 1998.
"Coactive Networks Shatters Price Barriers with New IP Gateway to Home Control Systems," Coactive (press release), Author: unknown, Oct. 26, 1998, pp. 1-4.
"Coactive Networks to Supply Internet-Based Home Gateways for up to 400,000 customers; First Phase of Deliveries Valued at US$2 Million," Coactive (press release), Author: unknown, Oct. 25, 1999.
"Coactive Networks Unveils the First Full-Service Residential Gateway," Coactive (press release), Author: unknown, May 3, 2000, pp. 1-4.
"Coactive Receives $2 Million in Funding," Coactive (press release), Oct. 15, 1997.
"Coactive Receives First Round of Venture Funding Investors Embrace Control Network Connectivity Technology," Coactive (press release), Author: unknown, Dec. 1, 1997, pp. 2.
"DSC-3500 Meeting the Control and Conservation Challenge," Johnson Controls, 1984, pp. 1-6.
"DTE Energy Technologies Selects Coactive Networks Internet Gateways to Roll Out New Class of E-Services to Businesses," Coactive (press release), Author: unknown, May 3, 2000, pp. 1-4.
"DTE Energy Technologies Selects Coactive Networks to Power Distributed Generation Solutions Worldwide," Coactive (press release), Author: unknown, Aug. 1, 2001, pp. 1-4.
"Echelon Corporation Demonstrates Internet Connectivity in Digital Home Applications at 1999 International Consumer Electronics Show," Home Toys (press release), Dec. 15, 1998.
"Eight Leading Controls Companies Join Coactive Partner Program," Coactive (press release), Author: unknown, Aug. 21, 2000, pp. 1-4.
"Enhanced Position Location Reporting System (EPLRS)," Author: unknown, available at http://www.globalsecurity.org/military/systems/ground/eplrs.htm on Feb. 22, 2010, pp. 1-3.
"ESTeem Engineering Report, Johnson Controls Interface No. 91-102," Author: unknown, Publisher: unknown, Nov. 1994, pp. 1-14.
"ESTeem Model 96F," Author: unknown, ESTeem Radios; Sep. 6, 1996, pp. 1-2.
"Foxboro Interfacing," Author: unknown, Engineering Report, No. 91-023, Revised: Jun. 19, 1996, pp. 1-5.
"GE Fanuc Interfacing," Author: unknown, Engineering Report, No. 91-010, Revised: Apr. 11, 1996, pp. 1-8.
"General PLC/RTU Interfacing," Author: unknown, Engineering Report, No. 92-010, Revised: Jun. 18, 1996, pp. 1-5.
Elster's Initial Disclosure of Invalidity Contentions Pursuant to LPR 4.3; *IPCO, LLC* v. *Elster Electricity, LLC*, Northern District of Georgia Case No. 1:05-cv-1138 (183 pages).
Elster's First Supplement to its Initial Disclosure of Invalidity Contentions Pursuant to LPR 4.3; *IPCO, LLC* v. *Elster Electricity, LLC*, Northern District of Georgia Case No. 1:05-cv-1138 (154 pages).

Elster's Second Supplemental to its Initial Disclosure of Invalidity Contentions Pursuant to LPR 4.3; *IPCO, LLC* v. *Elster Electricity, LLC*, Northern District of Georgia Case No. 1:05-cv-1138 (111 pages).
Defendant's Joint Preliminary Invalidity Contentions filed by Defendants Crestron Electronics, Inc. and Wayne-Dalton Corporation in *SIPCO, LLC* v. *Amazon.com, Inc. et al.*, District Court for the Eastern District of Texas Case No. 2:08-cv-359 (180 pages).
Trilliant Network, Inc.'s Invalidity Contentions Pursuant to Patent Rule 3-3, *IP Co. LLC* v. *Oncor Electric Delivery Company LLC et al.*, District Court for the Eastern District of Texas Case No. 2:09-cv-37 (112 pages).
Sensus's Invalidity Contentions filed by Defendant Sensus USA Inc. in *SIPCO, LLC* v. *Sensus USA Inc.*, District Court for the Eastern District of Texas Case No. 2:09-cv-37 (21 pages).
Defendant EKA Systems, Inc.'s Invalidity Contentions, *IP Co. LLC* v. *Oncor Electric Delivery Company LLC et al.*, District Court for the Eastern District of Texas Case No. 2:09-cv-37 (110 pages).
EKA Systems, Inc.'s Invalidity Contentions Pursuant to Patent Rule 3-3, *IP Co. LLC* v. *Oncor Electric Delivery Company LLC et al.*, District Court for the Eastern District of Texas Case No. 2:09-cv-37 (110 pages).
Sensus's Invalidity Contentions filed by Defendant Sensus USA Inc. In *SIPCO, LLC* v. *Sensus USA Inc.*, District Court for the Eastern District of Texas Case No. 6:09-cv-532 (22 pages).
Defendant Datamatic, Ltd's Invalidity Contentions to Plaintiff, *SIPCO, LLC* v. *Datamatic Ltd, et al.*, District Court for the Eastern District of Texas Case No. 6:09-cv-532 (2 pages with 7 claim chart exhibits).
Johnson Controls, Inc.'s Invalidity Contentions and Disclosures Pursuant to P.R. 3-3 and 3-4, *SIPCO, LLC* v. *Datamatic Ltd, et al.*, District Court for the Eastern District of Texas Case No. 6:09-cv-532 (59 pages).
Trilliant Networks, Inc.'s Invalidity Contentions to Plaintiff, *SIPCO, LLC* v. *Datamatic Ltd, et al.*, District Court for the Eastern District of Texas Case No. 6:09-cv-532 (418 pages).
Defendant Datamatic, Ltd's Invalidity Contentions to Plaintiff Pursuant to P.R. 3-3(a), *SIPCO, LLC* v. *Datamatic Ltd, et al.*, District Court for the Eastern District of Texas Case No. 6:09-cv-532 (2 pages with 7 claim chart exhibits).
Johnson Controls, Inc.'s Supplement Letter to the Invalidity Contentions, *SIPCO, LLC* v. *Datamatic Ltd, et al.*, District Court for the Eastern District of Texas Case No. 6:09-cv-532 (5 pages and 99 page Addendum).
Defendant's Invalidity Contentions Pursuant to P.R. 3-3 and 3-4 filed by Control4 Corporation et al., *SIPCO, LLC* v. *Control4 Corporation*, Eastern District of Texas Case No. 6:10-cv-249 (85 pages).
Johnson Controls, Inc.'s Supplemental Invalidity Contentions and Disclosures Pursuant to P.R. 3-3 and 3-4, *SIPCO, LLC* v. *Datamatic Ltd, et al.*, District Court for the Eastern District of Texas Case No. 6:09-cv-532 (89 pages).
Defendant Toro Company's Motion for Summary Judgment of Invalidity, *Sipco, LLC* v. *The Toro Company, JLH Labs, LLC and Jason Hill*, District Court for the Eastern District of Pensylvania Case No. 08-CV-00505-TJS.
Haartsen et al., "Bluetooth: Vision, Goals, and Architecture;" Mobile Computing and Communications Review; vol. 1, No. 2; pp. 1-8.
Haartsen, "Bluetooth—The Universal Radio Interface for Ad Hoc, Wireless Connectivity;" Ericsson Review No. 3, 1998; pp. 110-117.
Hahn et al., "Packet Radio Network Routing Algorithms: A Survey," IEEE Communications Magazine, vol. 22, No. 11, Nov. 1984, pp. 41-47.
HAI Omni, Features & Specifications, Home Automation, Inc., available at http://web.archive.org/web/19970216055832/www.homeauto.com/omni on Feb. 17, 2009, pp. 1-6.
Hall, "Tactical Internet System Architecture for Task Force XXI," 1996 IEEE, pp. 219-230.
Hamilton et al., "Optimal Routing in Multihop Packet Radio Networks," 1990 IEEE, pp. 389-396.
Harrington, "More Visible Vehicles," ActionLINE, Jul. 2003 (4 pages).

(56) References Cited

OTHER PUBLICATIONS

Harrison, "Microwave Radio in the British Telecom Access Network," Second IEE National Conference on Telecommunications, Conference Publication No. 300, Date: unknown, pp. 208-213.
Hedrick, "An Introduction to IGRP," Rutgers, The State University of New Jersey, Center for Computers and Information Services, Laboratory for Computer Science Research, Aug. 22, 1991 (Updated Aug. 10, 2005), pp. 1-21.
Hedrick, "Routing Information Protocol" (Jun. 1988), RFC 1058, available at Http://Tools.Ietf.Org/Html/Rfc1058, Jun. 24, 2009, pp. 1-34.
Hinden et al., "The DARPA Internet Gateway," RFC 823, Publisher: unknown, Sep. 1982, pp. 1-43.
Hogan, "Call of the Wi-Fi," Entrepeneur Magazine, Sep. 2003, pp. 39-42.
Holtsville et al., "Symbol Technologies, Telxon and Aironet Commit to Future Interoperability of Their Wireless Local Area Networks Based on the IEEE 802.11 Specification," Business Wire, Jun. 24, 1996, available at http://www.thefreelibrary.com/_/print/PrintArticle.aspx?id=18414624, pp. 1-3.
Home Automation Inc., "HAI Company Background;" Publisher: Unknown, Date: unknown, pp. 1-2.
Home Toys, Inc., "HTINews Review," available at http://www.hometoys.com/htinews/aug97/reviews/homevis/homevis1.htm on Mar. 2, 2009, pp. 1-26.
Honeywell, Inc., "Honeywell Home Control Version 2.0 Demonstratin," available at http://web.archive.org/web/19980630195929/www.hbc.honeywell.com/ on Mar. 5, 2009 (7 pages).
Hong et al., "U.S. Lightning Market Characterization, vol. II.: Energy Efficient Lighting Technology Options," Sep. 30, 2005, Reportprepared for Building Technologies Program, Office of Energy Efficiency and Renewable Energy, pp. 1-36.
Hotel Technology Next Generation, "A Guide for Understanding Wireless in Hospitality," an HTNG White Paper, Jun. 2006 (Jayne O'Neill, ed.), pp. 1-77.
Hruschka et al., "Packet Radio, Drahtlose Datenubertragung im Amateurfunk," Elektor, Jun. 1991, pp. 54-57 and 84.
Hsu et al., "Wireless Communications for Smart Dust," Berkeley: UCLA, Jan. 30, 1998, pp. 1-20.
Hubner et al., "A Distributed Multihop Protocol for Mobile Stations to Contact a Stationary Infrastructure," The Third IEE Conference on Telecommunications, Conference Publication No. 331, Date: unknown, pp. 204-207.
Internet Protocol, Version 4 (IPv4), RFC791 (Sep. 1981).
Internet Protocol, Version 6 (IPv6) Specification, RFC 2460 (Dec. 1998).
Internet Protocol; DARPA Internet Program Protocol Specification, John Postel Editor; Information Sciences Institute, University of Southern California, California; Sep. 1981; pp. 1-45.
Iwata et al., "Scalable Routing Strategies for Ad Hoc Wireless Networks," IEEE Journal on Selected Areas in Communications, vol. 17, No. 8, Aug. 1999, pp. 1369-1379.
Jacobsen, "The Building Blocks of a Smart Sensor for Distributed Control Networks," IEEE Technical Applications Conference Northcon, Nov. 4-6, 1998, pp. 285-290.
JDS Technologies, "Infrafred Xpander, IR-XP2, User Manual," Date: unknown, pp. 1-15.
JDS Technologies, "Model: 8R5PR, 8 Channel RS485 Relay Xpander, Installation Manual," pp. 1-5.
JDS Technologies, "Stargate 8 Channel RS-485 HUB," Publisher: unknown, Date: unknown, pp. 1.
JDS Technologies, "Stargate Interactive Automation System," 1998, pp. 1-2.
JDS Technologies, "Stargate, Operation Manual," Mar. 2000, pp. 1-114.
JDS Technologies, "Stargate-IP System Layout," Publisher: unknown; Date: unknown, pp. 1.
JDS Technologies, "Support: Protocol Specifications," available at http://jdstechnologies.com/protocol.htm, on Feb. 16, 2009, pp. 1-32.
JDS Technologies, "TimeCommander, TimeCommander Plus, User Guide," Jun. 1998, pp. 1-95.
JDS Technologies, "Web Xpander, Installation and Operation Manual," Feb. 2004, pp. 1-34.
Jimenez-Cedeno et al., "Centralized Packet Radio Network: A Communication Approach Suited for Data Collection in a Real-Time Flash Flood Prediction System," ACM-SAC 1993, pp. 709-713.
Johnson Controls, Inc., LonWorks® Digital Controller, 1998, pp. 1-12.
Johnson et al., "Dynamic Source Routing in Ad Hoc Wireless Networks", Computer Science Department, Carnegie Mellon University, A Chapter in Mobile Computing, vol. 353, pp. 1-18, 1996.
Johnson et al., "Dynamic Source Routing in Ad Hoc Wireless Networks," reprinted in Mobile Computing; Tomasz Imielinski and Hank Korth eds., 1996; Kluwer Academic Publishers, pp. 153-181.
Johnson et al., "Protocols for Adaptive Wireless and Mobile Networking," IEEE Personal Communications, 3(1), Feb. 1996, pp. 1-18.
Johnson et al., "Route Optimization in Mobile IP," Internet Draft (Nov. 28, 1994), available at http://www.monarch.cs.rice.edu/internet-drafts/draft-ietf-mobileip-optim-00.txt., Sep. 26, 2009, pp. 1-29.
Johnson, "Mobile Host Internetworking Using IP Loose Source Routing," Carnegie Mellon University CMU-CS-93-128, DARPA Order No. 7330, Feb. 1993, pp. 1-18.
Johnson, "Routing in Ad Hoc Networks of Mobile Hosts," 1995 IEEE, pp. 158-163.
Johnson, "Scalable and Robust Internetwork Routing for Mobile Hosts," 1994 IEEE, pp. 1-11.
Jubin et al., "The DARPA Packet Radio Network Protocols," Proceedings of the IEEE, vol. 75, No. 1, Jan. 1987, pp. 21-32.
Jubin, "Current Packet Radio Network Protocols," Proc. of the IEEE Infocom (Mar. 26-28, 1985), pp. 86-92.
Kaashoek et al., "FLIP: An Internetwork Protocol for Supporting Distributed Systems," ACM Transactions on Computer Systems, vol. 11, No. 1, Feb. 1993, pp. 73-106.
Kaiser et al., "Detailed Progress Report—LWIM Applications, Systems Verification and Field Test," UCLA.
Kaiser et al., "Low Power Wireless Integrated Microsensors (LWIM), BAA 94-15 Proposal Abstract," UCLA Electrical Engineering Department, Rockwell Science Center, Date: unknown, 15 pages.
Kaiser et al., "Low Power Wireless Integrated Microsensors (LWIM), Request for Support to Project", UCLA Electrical Engineering Department, Rockwell Science Center, Sep. 13, 1994, 71 pages.
Kaiser et al., "Low Power Wireless Integrated Microsensors (LWIM)," UCLA; Rockwell Science Center; LWIM Kickoff Meeting, Aug. 8, 1995, Presented to Dr. Ken Gabriel (ARPA), Dr. Elissa Sobolewski (ARPA), and Dr. Joseph Kielman (FBI), 62 pages.
Kaiser et al., "Program Mission: Low Power Wireless Integrated Microsensor (LWIM)," UCLA, Date: unknown.
Kaiser, "Circuits and Systems for Embedded Wireless Devices: Low Power Sensor, Interface, Signal Processing, Communication, and Network Systems," École Polytechnique Fédérale de Lausanne, pp. 1-40.
Prophet, Graham, Living in a Wireless Wonderland, available at http://www.ednmag.com/infoaccess.asp, Jun. 5, 2010, pp. 79-94.
U.S. Appl. No. 12/816,266 Non-Final Office Action dated Jun. 15, 2011.
U.S. Appl. No. 12/169,536 Non-Final Office Action dated Jun. 8, 2011.
U.S. Appl. No. 12/169,536 Non-Final Office Action dated Nov. 21, 2011.
U.S. Appl. No. 12/689,220 Final Office Action dated Oct. 5, 2011.
U.S. Appl. No. 12/482,892 Non-Final Office Action dated Jun. 28, 2011.
U.S. Appl. No. 12/482,892 Non-Final Office Action dated Nov. 25, 2011.
Defendant SmartSynch, Inc.'s Invalidity Contentions Pursuant to P.R. 3-3 and 3-4, *Sipco, LLC*, v. *Energate Inc., Ecobee Inc., Rainforest Automation, Inc., SmartSynch, Inc., AMX Corporation,*

(56) References Cited

OTHER PUBLICATIONS

*Simplehomenet, Inc., and Centralite Systems, Inc.*, District Court for the Eastern District of Texas, Case No. 6:10-cv-00533-LED.
Defendant ADT Security Services, Inc.'s Response to Plaintiff Sipco, LLC's first Interrogatories (Nos. 1-18), *Sipco, LLC, v. ADT Security Services, Inc.*, District Court for the Southern District of Florida, Case No. 11-80521-CIV-Middlebrooks/Johnson.
Defendant Control4 Corporation's Invalidity Contentions Pursuant to P.R. 4-3, *SIPCO LLC v. Control4 Corporation, et al.*, Northern District of Georgia Case No. 1:11-cv-612.
International Search Report for International Application No. PCT/US1996/10325.
International Search Report for International Application No. PCT/US2000/31166.
Supplemental European Search Report for EP 00978595.
Bigioi, "Transparent, Dynamically Configurable RF Network Suitable for Home Automation Applications," 1999.
Letter of Beatrice Thomas (ITRON) to Claude Challandes (SONTEX S.A.) dated Jul. 30, 1997 and attachment titled "ITRON Radio Technology."
"Homeserve Detail d'activites", GRIZZLI Systems, Nov. 11, 1999.
Letter of Alistair Munro (University of Bristol) to Jean-Jacques Ribot (Radian Association) dated Mar. 1, 1999 and attachment titled "Radio Application Network (RADIAN) Protocol Definition Proposal."
"Wayport's Value Proposition: To provide the industry's best high-speed Internet and business center experience for the airport passenger to stay productive," http://www.wayport.net/airportsoverview (visited Jul. 29, 2003) (2 pages).
"Welcome to UtiliNet: A Wireless Data Communications Solution from Metricom, Inc.," Author: unknown, available at http://web.archive.org/web/199806028045812/www.metricom.com/industrial/utilinet.html on May 10, 2010, pp. 1-10.
"Westinghouse Numa Logic Interface," Author: unknown, Engineering Report, No. 91-013, Date: unknown, pp. 1-7.
"What's Behind Ricochet: A Network Overview," Author: unknown, available at http://web.archive.org/web/20000815090824/www.ricochet.com/ricochet_advantage/tech_overview.html, Aug. 15, 2000, pp. 1-4.
"Wireless Access List—Atlanta Hartsfield International Airport," http://www.ezgoal.com/hotsports/wireless/f.asp?fid=63643 (visited Jul. 29, 2003) (1 pages).
"Wireless Access List—0 ATL Admirals Club," http://www.ezgoal.com/hotspots/wireless/f.asp?fid=60346 (visited Jul. 29, 2003) (1 pages).
"Wireless Accessories, catalog pages," Home Automation, Inc (archived web page), 1997.
"ESTeem Model 96C," ESTeem Radios (describing a system that was for sale at least as early as 1994).
"Site Survey Report," ESTeem Radios, Sep. 24, 1993.
"Technical Bulletin—Johnson Controls," ESTeem Radios, Jan. 29, 1998.
Abbott et al., "Wireless Product Applications for Utilities," Electric Power Research Institute, Feb. 1996, pp. 1-137.
About AES Corporation, AES IntelliNet, Author: unknown, available at http://web.archive.org/web/19990127093116/www/aes-intellinet.com/ae, on Mar. 5, 2009, pp. 1-2.
ADEMCO Group, 7720NX Network Extender,ADEMCO Group, Author: unknown, 1998; pp. 1-2.
ADEMCO Group, 4110DL Security System, Installation Instructions, Oct. 1996, ADEMCO Group, Author: unknown, pp. 1-15.
ADEMCO Group, 4110XM Security System, Installation Instructions, Jul. 1996, ADEMCO Group, Author: unknown, pp. 1-20.
ADEMCO Group, 4120EC Security System, Installation Instructions, Nov. 1990, ADEMCO Group, Author: unknown, pp. 1-17.
ADEMCO Group, 4120XM Security System, Installation Instructions, Oct. 1993, ADEMCO Group, Author: Unknown, pp. 1-80.
ADEMCO Group, 4140XMPT2 Partitioned Security System with Scheduling Users Manual, May 1993, ADEMCO Group, Author: unknown; pp. 1-54.
ADEMCO Group, 4281, 5881, and 5882 Series RF Receivers Installation Instructions, Oct. 1996, ADEMCO Group, Author: unknown; pp. 1-6.
ADEMCO Group, 5330 Alpha Console, Installation Instructions, May 90, ADEMCO Group, Author: unknown, pp. 1-24.
ADEMCO Group, 5706 Smoke Detector with Built-In Wireless Transmitter, Installation Instructions, Dec. 1991, ADEMCO Group, Author: unknown, pp. 1-8.
ADEMCO Group, 5707 Smoke Detector with Built-in Wireless transmitter, Installation Instructions, Aug. 1992, ADEMCO Group, Author: unknown, pp. 1-12.
ADEMCO Group, 5715 Universal Transmitter, Installation Instructions, Mar. 1989, ADEMCO Group; Author: unknown; pp. 1-4.
ADEMCO Group, 5775 Passive Infrared Motion Detector/Transmitter, Installation Instructions, Jul. 1991, ADEMCO Group, Author: unknown; pp. 1-4.
ADEMCO Group, 5808C Photoelectronic Smoke Detector with Built-In Wireless Transmitter Installation Instructions, 1998, ADEMCO Group, Author: unknown; pp. 1-4.
ADEMCO Group, 5800TM Transmitter Module Installation Instructions, Apr. 1994, ADEMCO Group, Author: unknown; pp. 1.
ADEMCO Group, 5801 Remote Wireless Panic Transmitter Installation Instructions, Apr. 1994, ADEMCO Group, Author: unknown; pp. 2.
ADEMCO Group, 5802CP Belt Clip Transmitter Installation Instructions, Nov. 1994, ADEMCO Group, Author: unknown; pp. 1.
ADEMCO Group, 5802MN, Supervised Miniature Transmitter Installation Instructions, Jan. 1995, ADEMCO Group, Author: unknown; pp. 1.
ADEMCO Group, 5802MN2 Supervised Miniature Transmitter Installation Instructions, Jun. 1997, ADEMCO Group, Author: unknown; pp. 1.
ADEMCO Group, 5803 Wireless Key Transmitter Installation Instructions, Nov. 1994, ADEMCO Group, Author: unknown, pp. 2.
ADEMCO Group, 5804 Wireless Key Transmitter Installation Instructions, Jul. 1995, ADEMCO Group, Author: unknown, pp. 3.
ADEMCO Group, 5804BD Bi-Directional Key Transmitter Installation Instructions, Apr. 1997, ADEMCO Group, Author: unknown, pp. 4.
ADEMCO Group, 5806 Smoke Detector with Built-In Wireless Transmitter Installation Instructions, May 1998, ADEMCO Group, Author: unknown, pp. 1-4.
ADEMCO Group, 5807 Smoke Detector with Built-In Wireless Installation Instructions, May 1998, ADEMCO Group, Author: unknown, pp. 1-6.
ADEMCO Group, 5808 Photoelectronic Smoke/Heat Detector with Built-In Wireless Transmitter Installation Instructions, 1998, ADEMCO Group, Author: unknown, pp. 1-8.
ADEMCO Group, 5808 Wireless Smoke Detector, 1999, available at http://web.archive.org/web/20000118015507/www.ademco.com/ademco on Mar. 5, 2009 pp. 1-4.
ADEMCO Group, 5809 Rate-of Rise Heat Detector/Transmitter Installation Instructions, Nov. 1994, ADEMCO Group, Author: unknown; pp. 1-2.
ADEMCO Group, 5816 Door/Window Transmitter Installation Instructions, Nov. 1994, ADEMCO Group, Author: unknown; pp. 1-2.
ADEMCO Group, 5816TEMP Low Temperature Transmitter Installation Instructions, May 1998, ADEMCO Group, Author: unknown; pp. 1-2.
ADEMCO Group, 5818 Recessed Transmitter Installation Instructions, Jan. 1994, ADEMCO Group, Author: unknown; pp. 1-2.
ADEMCO Group, 5819 Shock Processor Transmitter Installation Instructions, May 1998, ADEMCO Group, Author: unknown; pp. 1-2.
ADEMCO Group, 5819WHS Wireless Shock Sensor and Processor, 1997, available at http://web.archive.org/web/19990428164624/www.ademco.com/ademco on Mar. 5, 2009, pp. 1.
ADEMCO Group, 5819WHS/5819BRS Shock Processor Transmitter Installation Instructions, May 1998, ADEMCO Group, Author: unknown; pp. 1-2.

(56) References Cited

OTHER PUBLICATIONS

ADEMCO Group, 5827 Remote Wireless Keypad/Transmitter Installation Instructions, Apr. 1994, ADEMCO Group, Author: unknown; pp. 1.
ADEMCO Group, 5827BD and 5827BDE Wireless Bi-Directional Keypads Installation Instructions and Operating Guide, Mar. 1996, ADEMCO Group, Author: unknown; pp. 1-6.
ADEMCO Group, 5849 Glass Break Detector/Transmitter Installation Instructions, Oct. 1997, ADEMCO Group, Author: unknown; pp. 1-4.
ADEMCO Group, 5850 Glass Break Detector/Transmitter Installation Instructions, May 1998, ADEMCO Group, Author: unknown; pp. 1-4.
ADEMCO Group, 5890 Passive Infrared Motion Detector/Transmitter Installation Instructions, May 1998, ADEMCO Group, Author: unknown; pp. 1-8.
ADEMCO Group, 5890 Wireless PIR Motion Detector, 1997, available at http://web.archive.org/web/19990429054256/www.ademco.com/asc on Mar. 5, 2009, pp. 1-3.
ADEMCO Group, 5890P1 Passive Infrared Motion Detector/Transmitter Installation Instructions, Mar. 1998, ADEMCO Group, Author: unknown; pp. 1-4.
ADEMCO Group, 6128RF Keypad/Receiver—full wireless capability, 1997, ADEMCO Group, Author: unknown; pp. 1-2.
ADEMCO Group, 6128RF Keypad/Transceiver Installation Instructions, Jul. 1998, ADEMCO Group, Author: unknown; pp. 1-8.
ADEMCO Group, 6128RF Keypad/Transceiver, User Guide, May 1998, ADEMCO Group, Author: unknown; pp. 1.
ADEMCO Group, 6128WL Keypad/Receiver Installation Instructions, Oct. 1998, ADEMCO Group, Author: unknown; pp. 1-8.
ADEMCO Group, 6128WL Keypad/Receiver User Guide, Oct. 1998, ADEMCO Group, Author: unknown; pp. 1.
ADEMCO Group, 7715DF MicroFAST Installation Tool, User Manual, Feb. 1998, ADEMCO Group, Author: unknown; pp. 1-32.
ADEMCO Group, 7720 Subscriber Radio, Installation Instructions, Jan. 1992, ADEMCO Group, Author: unknown, available at http://www.guardianalarms.net, pp. 1-18.
ADEMCO Group, 7720NX Network Extender, 1997, ADEMCO Group, Author: unknown, available at http://web.archive.org/web/19990220035932/www.ademco.com/ademco on Mar. 5, 2009, pp. 1-3.
"HAI Omni: Features & Specifications," Home Automation, Inc. (archived web page), 1997.
"Home Telemetry Gateway Specifications Sheet: Connector 2000 Series," Coactive 1998.
"How Does the New Power Company Deliver on the Promise of Energy Reconstructing?" NewPower (press release), Author: unknown, May 31, 2001, pp. 1-6.
"IEEE Standards Board: Project Authorization Request (PAR) Form;" http://grouper.ieee.org/groups/802/11/PARs/par80211bapp.html, Mar. 24, 1998.
"Important Dealer Notification—Honeywell AlarmNet-M Network Alert," Source: unknown, Author: unknown, Apr. 2007, pp. 1.
"inCode Telecom Transforming Payphones into Wi-Fi Hot Spots," Jan. 14, 2003, http://www.pocketpcmag.com/news/incode.asp (2 pages).
"Industrial Communications," Author: unknown, available at http://web.archive.org/web/19990222162354/www.metricom.com/industrial/ on May 10, 2010, pp. 1-3.
"Information Technology—Telecommunications and Information Exchange Between Systems—Local and Metropolitan Area Networks—Specific Requirements—Part 11: Wireless LAN Medium Access Control (MAC) and Physical Layer (PHY) Specifications," Author: unknown, IEEE, Std. 802.11-1997, 1997, pp. 1-445.
"Integrated Communication Services" of Industrial Communications; pp. 1-3; available at web.archive.org/web/19990222162354/www.metricom.com/industrial.
"International Search Report and Written Opinion for International Application No. PCT/US2006/002342," Search Authority European Patent Office, mailed May 31, 2006.

"IOConnect Architecture™," Coactive, 2001, pp. 1-4.
"JC/83RF System: Cost-effective Multiple Facility Management by Radio Network," Johnson Controls, Date: unknown, pp. 1-6.
"JC/83RF System: Multiple Facility Management by Radio Network," Johnson Controls, Publication No. 2161, 1983, pp. 1-4.
"Keltron's Home Page with Frames, Index," available at http://web.archive.org/web/19990831161957/http://www.keltroncorp.com, on Mar. 24, 2009, pp. 1.
"Local and Metropolitan Area Networks: Wireless Medium Access Control (MAC) and Physical (PHY) Specifications, Annex A: Protocol Implementation Conformance Statement (PICS) Proforma," Author: unknown; IEEE, Nov. 1997, pp. 1-75.
"LonTalk Protocol, LonWorks™ Engineering Bulletin," Echelon Corp.; Author: unknown; Apr. 1993, pp. 1-27.
"LonWorks® Products, 1998, Version A," Echelon Corp.; Author: unknown; 1997, pp. 1-21.
"LonWorks® Router User's Guide," Echelon Corp., Author: unknown; 1995, pp. 1-136.
"Lon Works® SMT™ Transceiver," datasheet, Echelon Corp.; Author: unknown; 1997, pp. 1-18.
"M100 Series Motor Actuator," Author: unknown, Johnson Controls, Inc., Apr. 1993, pp. 1-20.
"M100C Series Actuator with Digital Control Signal Input and R81CAA-2 Interface Board," Installation Bulletin, Johnson Controls, 2000, pp. 1-12.
"Man-Portable Networked Sensor System (1997-)," Author: unknown, available at http://www.spawar.navy.mil/depts/d30/d37/d371/mpnss/mpnss.html on May 20, 2010, pp. 1-4.
"March of the Motes," Author: unknown, New Scientist, vol. 179, issue 2409, Aug. 23, 2003, pp. 1-8.
"Metasys Compatible Products," Author: unknown; Johnson Controls, Inc., 1997 (9 pages).
"Metasys Extended System Architecture, vol. II," Author: unknown, Publisher: unknown, Sep. 1999.
"Metasys N2 System Protocol Specification for Vendors," Author: unknown, Publisher: unknown, Jun. 1996.
"Modicon Interfacing," Author: unknown, Engineering Report, No. 90-022, Revised: Apr. 12, 1996, pp. 1-9.
"Moore Products—Hart Protocol Interfacing," Author: unknown, Engineering Report, No. 94-007, Revised: Mar. 1, 1996, pp. 1-3.
"MTC Teams with Coactive Networks to Deliver an Advanced Energy Communications and Management Solution," Coactive (press release), Author: unknown, Feb. 5, 2001, pp. 1-4.
"Net77 Central Station Manual Section 3," AES Intellinet, Dec. 1996.
"NewPower and Coactive Networks Announce Strategic Alliance to Deliver the Connected Home," Coactive (press release), Author: unknown, Mar. 14, 2001, pp. 1-4.
"NX-480 Wireless Motion Sensor, document No. 466-1479 Rev. D," Caddx Controls, May 1, 1998.
"Omni Automation System," Author: unknown, Home Automation, Inc., Date: unknown, pp. 1-266.
"Omni Installation Manual," Author: unknown; Home Automation, Inc., Oct. 1997, pp. 1-88.
"Omni Owner's Manual," Author: unknown; Home Automation, Inc., Date: unknown, pp. 1-136.
"Omron Interfacing," Author: unknown, Engineering Report, No. 95-003, Revised: Apr. 17, 1996, pp. 1-4.
"Opto-22 Protocol," Author: unknown, Engineering Report, No. 93-010, Revised: May 31, 1996, pp. 1-8.
"Part 15.1: Wireless Medium Access Control (MAC) and Physical Layer (PHY) Specifications for Wireless Personal Area Networks (WPANS)," www.ieee802.org/15/Bluetooth/802-15-1_Clause_05.pdf, Jun. 14, 2002.
"Phoenix Contact Interfacing, Author: unknown," Engineering Report, No. 94-001, Revised: Jun. 20, 1996, pp. 1-7.
"Phonelin / HPNA / HomePNA Networks," http://www.homenethelp.com/web/howto/HomeNet-HPNA.asp (visited Jul. 29, 2003) (3 pages).
"PLC Direct (Koyo) Interfacing, Author: unknown," Engineering Report, No. 96-001, Revised: Apr. 10, 1996, pp. 1-8.
"Power/Perfect Energy Management Systems," Author: unknown, Johnson Controls, 1983, pp. 1-4.

(56) References Cited

OTHER PUBLICATIONS

"Selected Vendor Telecommunications Products," available at http://eetd.lbl.gov/ea/ems/reports/39015a.pdf (describing public uses in 1995), pp. 1-83.

"Smart Home Technology Leader Intelli Selects Coactive Networks Internet Gateways," Coactive (press release), Author: unknown, Sep. 11, 2000, pp. 1-4.

"Special Poll Feature," Author: unknown, Engineering Report, No. 93-008, Sep. 1993, pp. 1-5.

"Square D Interfacing," Author: unknown, Engineering Report, No. 88-010, Revised: Apr. 18, 1996, pp. 1-9.

"Technology Review, Metricom's Ricochet Packet Radio Network," Ham Radio Online, 1996, Author: unknown, pp. 1-3.

"Texas Instruments Interface," Author: unknown, Engineering Report, No. 91-021, Revised: Nov. 1994, pp. 1-3.

"The New Power Company Announces Revolutionary Energy-Saving Program the Gives Consumers Remote Control of the Their Thermostats via the Internet," NewPower (press release), Author: unknown, Apr. 24, 2001.

"The SNVT Master List and Programmer's Guide," Echelon Corp., Author: unknown, Mar. 1996, pp. 1-23.

To Starbucks and beyond: 802.11 wireless Internet access takes off, CommunicationsSolutions.com, vol. 4, Issue 1, Q1 2003, pp. 8-9.

"Toshiba Interfacing," Author: unknown, Engineering Report, No. 91-011, Revised: Jun. 19, 1996, pp. 1-4.

"TranstexT® Advanced Energy Management System," Article, Author: unknown, Publisher: unknown, Date: unknown, pp. 1-2.

"TranstexT® Advanced Energy Management System," Brochure, Author: unknown, Integrated Communication Systems, Inc., 1990, pp. 1-8.

AES IntelliNet Model 7050-E & 7750-E, RF Subscriber Unit, Version 1.71, Installation & Operation Manual, AES IntelliNet, Author: unknown, Feb. 24, 1997, available at www.guardianalarms.net, pp. 1-54.

AES IntelliNet Model 7050-E Radio Subscriber Unit Installation Manual, AES IntelliNet, Author: unknown, Jul. 17, 2000, available at www.guardianalarms.net, pp. 1-4.

AES IntelliNet Model 7440 & 7440-XL RF Subscriber Unit, Addendum, AES IntelliNet, Author: unknown, Aug. 29, 2002.

AES IntelliNet Net 77 Version 1.48.30, Installation & Operation Manual, Document 40-0551u, AES Corporation, Author: unknown, Jun. 1999, pp. 1-30.

AES IntelliNet Net 77 Version 1.48.4, Installation & Operation Manual, Document 40-0551u, AES Corporation, Author: unknown, Nov. 2000, pp. 1-36.

AES IntelliNet Net 7K Version 1.48.4, Installation & Operation Manual, Document 40-0551, AES Corporation, Nov. 2000, pp. 1-36.

AES IntelliNet Net7K Version 3, Installation & Operation Manual, Document 40-0551, AES Corporation, Jun. 1999, pp. 1-30.

AES IntelliNet Radio Communication Subscriber Unit 7050, Sep. 16, 1997, available at http://web.archive.org/web/19990203061203/www.aes-intellinet.com/sp on Mar. 5, 2009, pp. 1-2.

AES IntelliNet Theory of Operation, AES IntelliNet; Author: unknown, Dec. 1996, downloaded from http://www.guardianalarms.net, pp. 1-18.

AES IntelliNet Wireless Network Glossary of Terms, document 40-0551u, AES IntelliNet, Author: unknown, Dec. 96, pp. 1-15.

AES IntelliNotes Universal Serial data Interface/USDI, Bulletin No. 55, AES Corporation, Author: unknown, Apr. 5, 2001, pp. 1-12.

AES IntelliTAP Model 7068, Version 1.08, Installation Guide, AES IntelliNet, Author: unknown, Jun. 15, 2000, pp. 1-11.

AES IntelliTRAK 7555-RT GPS Based Vehicle Tracking Unit, Version 2.0a, AES IntelliNet, Author: unknown, Feb. 20, 2001, pp. 1-16.

AES IntelliTRAK 7555-RT GPS Based Vehicle Tracking Unit, Version 2.12, AES IntelliNet, Author: unknown, Nov. 6, 2002, pp. 1-16.

AES Net7000, Installation & Operation Manual, AES Intellinet, Author: unknown, Nov. 24, 1996, pp. 1-76.

AES Net77 Wireless Network Management Software Installation & Operation ManuCentral Station Manual, Section 3, AES IntelliNet, Author: unknown, Dec. 1996, pp. 1-87.

AES UL/ULC System Configuration, AES Corporation, Author: unknown, May 1, 2003, pp. 1.

Agre et al., "Autoconfigurable Distributed Control Systems," ISADS, Apr. 27, 1995.

Agre et al., "Development Platform for Self-Organizing Wireless Sensor Networks," Rockwell Science Center and UCLA, Date:unknown, pp. 1-25.

Agre et al., "Technical and Management Proposal for Adaptive Wireless Arrays for Interactive Reconnaissance, Surveillance and Target Acquisition in Small Unit Operations (AWAIRS)," Defense Advanced Research Projects Agency Broad Agency Announcement 96-26, UCLA, Date: unknown, pp. 1-50.

Airpath Wireless, Inc., "Hot Spot Hardware," Copyright 2003, http://www.airpath.com/programs/hardward/hardware.htm (vistited Jul. 29, 2003) (2 pages).

AlarmLink, Inc. A Brief History available at http://www.alarmlink.com/Default.aspx?tabid=28, on Mar. 23, 2009, pp. 1.

Alarm Link, Inc. Alarm Over IP Products, available at http://www.alarmlink.com/Default.aspx?tabid=38 on Mar. 24, 2009, pp. 1.

Alarm Link, Inc. Central Stations, availabe at http://www.alarmlink.com/Default.aspx?tabid=35, on Mar. 24, 2009.

AlarmLink, Inc. Home Page, avaliable at http://www.alarmlink.com/ on Mar. 24, 2009, pp. 1.

Alarm Link, Inc., "MeshWorks of Los Angeles," available at http://www.alarmlink.com/Default.aspx?tabid=39 on Mar. 24, 2009, pp. 1.

Alwan et al., "Adaptive Mobile Multimedia Networks," IEEE Personal Communications, Apr. 1996, pp. 34-51.

Amir et al., "An Evaluation of the Metricom Ricochet Wireless Network," CS 294-7 Class Project, Department of Electrical Engineering and Computer Science of the University of California at Berkeley, Publisher: unknown, May 7, 1996, pp. 1-20.

Amir, "The Ricochet System Architecture," available at http://www.lariat.org/Berkeley/node2.html, on May 1996, pp. 1-5.

Asada et al., "Low Power Wireless Communication and Signal Processing Circuits for Distributed Microsensors;" Proceedings of the International Circuits and Systems Symposium, ISCAS '97; UCLA, Rockwell Science Center; Jun. 1997, pp. 1-5.

Asada et al., "Wireless Integrated Network Sensors: Low Power Systems on a Chip," UCLA, Rockwell Science Center; Date: unknown, pp. 1-24.

Asada et al., "Wireless Integrated Sensors Networks: Low Power Systems on a Chip," Publisher: unknown, Date: unknown, pp. 1-8.

Asada, "Wireless Integrated Network Sensors (WINS)," UCLA, SPIE vol. 3673, Mar. 1999, pp. 11-18.

Baba et al., "Wireless Medium Access Control Protocol for CAN," 4th Int'l CAN Conf., Berlin, Germany, available at http://www.cancia.org/fileadmin/cia/files/icc/4/baba1.pdf (1997).

Bagby, "Calypso Ventures Inc.—WLAN background," 2 pages.

Baker et al. "The Architectual Organization of a Mobile Radio Network via a Distributed Algorithm," IEEE, Nov. 1981.

Ball et al., "Reliability of Packet Switching Broadcast Radio Networks," IEEE Transactions on Circuits and Systems, vol. CAS-23, No. 12, Dec. 1976, pp. 806-813.

Bapna, et al., "Antenna Pointing for High Bandwidth Communications from Mobile Robots," Paper, Field Robotics Center, The Robotics Institute, Carnegie Mellon University, date: unknown, pp. 1-6.

Beech et al., "AX.25 Link Access Protocol for Amateur Packet Radio, Version 2.2," American Relay & Tucson Amateur Packet Radio Corporation, Jul. 1993, Revised Jul. 1998, pp. 1-143.

Bergstein, "US telco plans WiFi payphone," May 12, 2003, http://www.news.com.au/common/story_page/0,4057,6420676%5E15306,00.html (2 pages).

BGE, 5743 Wireless Dual Switch™ Glass Break Detector, Installation and Operating Instructions, BGE, Author: unknown; Date: unknown, pp. 1-2.

BGE, 5742 Wirelss Audio Switch™ Glass Break Detector, Installation and Operating Instructions, BGE, Author: unknown, Date: unknown, pp. 1-10.

Bhatnagar et al., "Layer Net: A New Self-Organizing Network Protocol," Department of Electrical Engineering, SUNY, IEEE, 1990.

Black, "Lutron RF Technology, Reliable, First, Forward Thinking," Lutron Electronics Co. Inc., Aug. 2006, pp. 1-16.

(56) References Cited

OTHER PUBLICATIONS

Blaney, "HomeRF™ Working Group, 4th Liason Report," IEEE, 802.11-98/360, Nov. 1998, Slides 1-12.
Brain, "How Motes Work," available at http://computer.howstuffworks.com/mote.htm, on Feb. 25, 2010, pp. 1-2.
Brain, "How Motes Work: Ad hoc Networks," available at http://computer.howstuffworks.com/mote3.htm on Feb. 25, 2010, pp. 1-3.
Brain, "How Motes Work: The Basic Idea," available at http://computer.howstuffworks.com/mote1.htm, on Feb. 25, 2010, pp. 1-2.
Brain, "How Motes Work: Typical Applications," available at http://computer.howstuffworks.com/mote2.htm, on Feb. 25, 2010, pp. 1-2.
Brayer, "Implementation and Performance of Survivable Computer Communication with Autonomous Decentralized Control," IEEE Communications Magazine, Jul. 1983, pp. 34-41.
Brownrigg et al., "Development of a Packet-Switching Network for Library Automation," Proceedings of the National Online Meeting Apr. 12-14, 1983, pp. 67-74.
Brownrigg et al., "Distributions, Networks, and Networking: Options for Dissemination," Workshop on Electronic Texts, Session III, available at http://palimpsest.standford.edu/byorg/lc/etextw/sess3.html, Jul. 17, 2007, pp. 1-10.
Brownrigg et al., "Electrons, Electronic Publishing, and Electronic Display," Information Technology and Libraries (Sep. 1985), pp. 201-207.
Brownrigg et al., "Implementing Library Automation Plans in a University Computing Environment, Planning for Computing in Higher Education 5," EDUCOM Series in Computing and Telecommunications in Higher Education, 1980, pp. 215-225.
Brownrigg et al., "Online Catalogues: Through a Glass Darkly," Information Technology and Libraries, Mar. 1983, pp. 104-115.
Brownrigg et al., "Packet Radio for Library Automation," Information Technology and Libraries 3 (Sep. 1984), pp. 229-244.
Brownrigg et al., "Packet Switching and Library Automation: A Management Perspective," Proceedings of the 45th ASIS Annual Meeting Oct. 17-21, 1982, vol. 19, pp. 54-57.
ADEMCO Group, Vista 4130XT Security System Installation Instructions, Oct. 1998, ADEMCO Group, Author: unknown, pp. 1-84.
ADEMCO Group, Vista 4140XMPT2 Partitioned Security System with Scheduling Installation Instructions, May 1993, ADEMCO Group, Author: unknown, pp. 1-68.
ADEMCO Group, Vista AT 4140 Security System Installation Instructions, Sep. 1998, ADEMCO Group, Author: unknown, pp. 1-68.
ADEMCO Group, Vista Series 4120EC Security System User's Manual, Sep. 1992, ADEMCO Group, Author: unknown, pp. 1-28.
ADEMCO Group, Vista Series 4130XM, 5130XM, 4140XMP Security System User's Manual, Feb. 1992, ADEMCO Group, Author: unknown, pp. 1-32.
ADEMCO Group, Vista Series 4140XMPT/4140XMPT-UIL Partitioned Security System User's Manual, Jun. 1993, ADEMCO Group, Author: unknown, pp. 1-32.
ADEMCO Group, Vista Series 4140XMP, Installation Instructions, Jan. 1992, ADEMCO Group, Author: unknown, pp. 1-52.
ADEMCO Group, Vista Series 5140XM User's Manual, Aug. 1992, ADEMCO Group, Author: unknown, pp. 1-28.
ADEMCO Group, Vista XM Series 4140XM, 5130XM, 4130XM, Installation Instructions, Jul. 1990, ADEMCO Group, Author: unknown, pp. 1-26.
ADEMCO Group, Vista XM Series, Installation Instructions, ADEMCO Group, Author: unknown, Oct. 1991, pp. 1-16.
ADEMCO Group, Vista-10 Security System, Installation Instructions, Sep. 1994, ADEMCO Group, Author: unknown, pp. 1-56.
ADEMCO Group, Vista-100 Commercial Fire & Burglary Alarm Partitioned Security System with Scheduling, Installation Instructions and Programming Guide, Jan. 1998, ADEMCO Group, Author: unknown, pp. 1-233.
ADEMCO Group, Vista-100 Commercial Fire & Burglary Alarm System User's Manual, Nov. 1995, ADEMCO Group, Author: unknown, pp. 1-66.
ADEMCO Group, Vista-100 Commercial Fire & Burglary Alarm System with Scheduling Quick Start, Apr. 1996, ADEMCO Group, Author: unknown, pp. 1-24.
ADEMCO Group, Vista-10SE Security System, Installation Instructions, May 1997, ADEMCO Group, Author: unknown, pp. 1-88.
ADEMCO Group, Vista-128B Commercial Burglary Partitioned Security System with Scheduling, Installation and Setup Guide, Jul. 1998, ADEMCO Group, Author: unknown, pp. 1-252.
ADEMCO Group, Vista-128FB Commercial Fire and Burglary Partioned Security System with Scheduling, Installation, and Setup Guide, Oct. 1998, ADEMCO Group, Author: unknown, pp. 1-220.
ADEMCO Group, Vista-128FB Commercial Fire and Burglary Partitioned Security System User Guide, Oct. 1998, ADEMCO Group, Author: unknown, pp. 1-80.
ADEMCO Group, Vista-20 2-Partitioned Security System, Installation Instructions, Nov. 1995, ADEMCO Group, Author: unknown, pp. 1-120.
ADEMCO Group, Vista-20 2-Partitioned Security System, Programming Form, Apr. 1996, ADEMCO Group, Author: unknown, pp. 1-8.
ADEMCO Group, Vista-20 Security System User's Manual, Apr. 1995, ADEMCO Group, Author: unknown, pp. 1-52.
ADEMCO Group, Vista-20HW 2-Partitioned Security System, Installation Instructions, Apr. 1996, ADEMCO Group, Author: unknown, pp. 1-100.
ADEMCO Group, Vista-20HW 2-Partitioned Security System, Programming Form, Apr. 1996, ADEMCO Group, Author: unknown, pp. 1-8.
ADEMCO Group, Vista-20HWse 2-Partitioned Security System, Installation Instructions, Aug. 1997, ADEMCO Group, Author: unknown, pp. 1-84.
ADEMCO Group, Vista-20HWse 2-Partitioned Security System, Programming Form, Aug. 1997, ADEMCO Group, Author: unknown, pp. 1-8.
ADEMCO Group, Vista-20SE 2-Partitioned Security System, Installation Instructions, Aug. 1997, ADEMCO Group, Author: unknown, pp. 1-100.
ADEMCO Group, Vista-20SE 2-Partitioned Security System, Programming Guide, Aug. 1997, ADEMCO Group, Author: unknown, pp. 1-8.
ADEMCO Group, Vista-20SE/Vista-20HWse Security System User's Manual, Jun. 1997, ADEMCO Group, Author: unknown; pp. 1-52.
ADEMCO Group, Vista-30Pse Security System, Installation Instructions, Apr. 1997, ADEMCO Group, Author: unknown; pp. 1-104.
ADEMCO Group, Vista-40 2-Partition Security System, Installation and Setup Guide, Jul. 1998, ADEMCO Group, Author: unknown; pp. 1-380.
ADEMCO Group, Vista-40 2-Partition Security System, Programming Guide, Jul. 1998, ADEMCO Group, Author: unknown; pp. 1-24.
ADEMCO Group, Vista-40 Programming Guide, Jun. 1997, ADEMCO Group, Author: unknown; available at www.guardianalarms.net pp. 1-20.
ADEMCO Group, Vista-40 Security System User's Guide, Jul. 1998, ADEMCO Group, Author: unknown; pp. 1-60.
ADEMCO Group, Vista-50, Vista 50UL Security System, Nov. 1994, ADEMCO Group, Author: unknown; pp. 1-66.
ADEMCO Group, Vista-50P, Vista-50PUL Partitioned Security System with Scheduling, Installation Instructions and Programming Guide, Oct. 1997, ADEMCO Group, Author: unknown; pp. 1-199.
ADEMCO Group, Vista-50P, Vista-50PUL Security System User's Manual, Jul. 1995, ADEMCO Group, Author: unknown; pp. 1-66.
ADEMCO Group, Vista-50P, Vista-50PUL, Partitioned Security System with Scheduling, Quick Start, Aug. 1995, ADEMCO Group, Author: unknown; pp. 1-28.
ADEMCO Group, Vista5140XM Commercial Fire and Burglary Alarm System Installation Instructions, Jun. 1993, ADEMCO Group, Author: unknown, pp. 1-74.
ADEMCO Group, Vista-AT Security System User's Manual, Sep. 1998, ADEMCO Group, Author: unknown; pp. 1-56.
ADEMCO Group, V-Link Downloading Software User's Guide, Jun. 1994, ADEMCO Group, Author: unknown; available at http://www.guardianalarms.net, pp. 1-126.

(56) References Cited

OTHER PUBLICATIONS

ADEMCO Group, V-Plex Security Technology, 1997, ADEMCO Group, Author: unknown, available at http://web.archive.org/web/19990421110527/www.ademco.com/ademco on Mar. 5, 2009, pp. 1-6.
ADEMCO Group, Wireless Transmitters/Receivers: 5700 Wireless Transmitters, 1997, ADEMCO Group, Author: unknown, available at http://web.archive.org/web/19990127120423/www.ademco.com/ademco on Mar. 5, 2009, pp. 1-2.
ADEMCO Group, Wireless Transmitters/Receivers: 5800 Wireless Transmitters, 1997, ADEMCO Group, Author: unknown, available at http://web.archive.org/web/19990218181254/www.ademco/com/ademco on Mar. 5, 2009, pp. 1-2.
ADEMCO Group, Wirelss User Interface Devices, 1997, ADEMCO Group, Author: unknown, available at http://web.archive.org/web/19990421190353/www.ademco.com/ademco on Mar. 5, 2009, pp. 1-4.
ADEMCO Group,Vista Series Partitioned Security Systems Model 4140XMPT Installation Instructions, Feb. 1992, ADEMCO Group, Author: unknown, pp. 1-60.
AES—7700 Central Station, Installation & Operation Manual, Document 40-0551u, AES Corporation, Author: unknown, Nov. 2003, pp. 1-40.
AES—IntelliGuard 7470, AES IntelliNet, Author: unknown, Nov. 2003, pp. 1-15.
AES 7000 Smart Central Station InstaCentral Station Installation & Operation Manual, Document No. 40-551, AES IntelliNet, Author: unknown; Nov. 20, 1996, pp. 1-48.
AES 7067 IntelliTap-II Digital Dialer Interface: A Supplemental Alarm Supporting Device, AES IntelliNet, Author: unknown, Aug. 5, 2004, pp. 1-4.
AES 7099 Central Station Installation & Operation Manual, Document No. 40-0050, AES IntelliNet, Author: unknown; 1998, pp. 1-20.
AES 7450 RF Subscriber Unit Installation Manual, AES IntelliNet, Author: unknown, 1998, pp. 1-8.
AES 7750-F RF SMART Subscriber Unit Version 2, Including 7750-F-4x4 and 7750-F-8, Installation & Operation Manual, AES IntelliNet, Author: unknown, Apr. 2001 (Updated Nov. 2003), pp. 1-60.
AES 7750-F RF SMART Subscriber Unit Version 2, Installation & Operation Manual, AES IntelliNet, Author: unknown, Aug. 2000, pp. 1-30.
AES Central Alarm Monitoring, Author: unknown, available at http://web.archive.org/web/19990225163745/www.aes-intellinet.com/ae, on Mar. 5, 2009, pp. 1-3.
AES IntelliNet 7450 Addendum, AES Corporation, Author: unknown, Jul. 9, 2002, pp. 1-2.
AES IntelliNet Dealer's List by State, Author: unknown, available at http://web.archive.org/web/200102162324026/www.aes-intellinet.com/list on Mar. 5, 2009, pp. 1-13.
AES IntelliNet Model 7003 Central Station, Installation & Operation Manual, AES IntelliNet, Author: unknown, Jan. 9, 2001, available at http://www.guardianalarms.net, pp. 1-25.
AES IntelliNet Model 7050, 7750, Subscriber Unit, Version 1.62, Installation & Operation Manual, AES IntelliNet, Author: unknown, Dec. 1996, available at www.guardianalarms.net, pp. 1-110.
Rehkter et al., "A Border Gateway Protocol 4 (BGP-4)," RFC 1771, (Mar. 1995), available at http://tools.ietf.org/html.rfc1771, Jun. 24, 2009, pp. 1-58.
Reuters, "Verizon Launches Wi-Fi Hot Spots," May 18, 2003, http://www.wired.com/news/wireless/0,1382,58830,00.html (2 pages).
Ritter et al., The Architecture of Metricom's Microcellular Data Network™ (MCDN) and Details of its Implementation as the Second and Third Generation Ricochet™ Wide-Area Mobile Data Service, IEEE, 2001, pp. 143-152.
Ross et al., "PNC/DOE Remote Monitoring Project at Japan's Joyo Facility," Office of Scientific and Technical Information, Report No. SAND—96-1937C, available at http://www.osti.gov/bridge/product.bib lio.jsp?query_id=0&pa ge=0&osti_id=270680 (1996).

Saffo, Paul, "Sensors: The Next Wave of Infotech Innovation," Institute for the Future (1997).
Salkintzisa et al., "Design and implementation of a low-cost wireless network for remote control and monitoring applications," Elservier, Microprocessors and Microsystems, 1997, pp. 79-88.
Saltzer et al., "Source Routing for Campus-wide Internet Transport (Sep. 15, 1980)," available at http://groups.csail.mit.edu/ana/publications/pubPDFs/Sourcerouting.html, Sep. 21, 2009, pp. 1-14.
Schneider et al., "International Remote Monitoring Project Argentina Nuclear Power Station Spent Fuel Transfer Remote Monitoring System," Dept. of Energy, Office of Scientific and Technical Information, Report No. SAND—97-1784C, available at http://www.osti.gov/bridge/product.bibli o.jsp?query_id=1&page=0&osti_id=505674 (1997).
Schulman et al., "SINCGARS Internet Controller—Heart of the Digitized Battlefield," Proceedings of the 1996 Tactical Communications Conference, Apr. 30-May 2, 1996, pp. 417-421.
Shacham et al., "A Packet Radio Network for Library Automation," 1987 IEEE Military Communications Conference, vol. 2, at 21.3.1 (Oct. 1987); pp. 456-462.
Shacham et al., "Dynamic Routing for Real-Time Data Transport in Packet Radio Networks," IEEE Proceedings of INFOCOM '82, pp. 152-159.
Shacham et al., "Future Directions in Packet Radio Architectures and Protocols," Proceedings of the IEEE, vol. 75, No. 1, Jan. 1987, pp. 83-99.
Shacham et al., "Future Directions in Packet Radio Technology," Proceedings of IEEE Infocom 85, Mar. 26-28, 1985, pp, 93-98.
Shacham et al., "Packet Radio Networking," Telecommunications vol. 20, No. 9, Sep. 1986, pp. 42,43,46,48,64 and 82.
Shoch, "Inter-Network Naming, Addressing and Routing, Internet Experiment Note # 19, Notebook section 2.3.3.5," Xerox Palo Alto Research Center, Jan. 29, 1978, Publisher: unknown, pp. 1-9.
Sohrabi et al., Protocols for Self-Organization of a Wireless Sensor Network, IEEE Personal Communications, Oct. 2000, pp. 16-27.
Stern, "Verizon to Offer Wireless Web Link Via Pay Phones," May 10, 2003, http://www.washingtonpopst.com/ac2/wp-dyn?pagename=article&node=&contentID=A367 . . . (3 pages).
Subramanian et al., An Architectural for Building Self-Configurable Systems, IEEE, 2000, pp. 63-73.
Sunshine, "Addressing Problems in Multi-Network Systems," (Apr. 1981), available at ftp://ftp.isi.edu/in-notes/ien/ien178.txt, Sep. 14, 2009, pp. 1-26.
Sunshine, "Addressing Problems in Multi-Network Systems," Proceedings INFOCOM '82, 1982 IEEE, pp. 12-19.
Sunshine, "Network Interconnection and Gateways," IEEE Journal on Selected Areas in Communications, vol. 8, No. 1, Jan. 1990, pp. 4-11.
Sunshine, "Source Routing in Computer Networks," Information Sciences Department of The Rand Corporation (1977), Publisher: unknown, pp. 29-33.
Sutherland, Ed, "Payphones: The Next Hotspot Wave?," Jan. 28 2003, http://www.isp-planet.com/fixed_wireless/news/2003/bellcanada_030128.html (3 pages).
Tanenbaum, "Computer Networks," 4th Int'l CAN Conf., Berlin, Germany, 1997.
Thodorides, "Wireless Integrated Network Sensors," Power Point Presentation, Publisher: unknown, Apr. 15, 2003, pp. 1-19.
Thomas, "Extending CAN Networks by Incorporating Remote Bridging," ESTeem Radios, Nov. 1994.
Thomas, "Extending CAN Networks by Incorporating Remote Bridging," 4th Int'l CAN Conf., Berlin, Germany, available at http://www.can-cia.org/fileadmin/cia/files/icc/4/thom as.pdf (1997).
Tobagi et al, "Packet Radio and Satellite Networks," IEEE Communications Magazine, vol. 22, No. 11, Nov. 1984, pp. 24-40.
TOH, "A Novel Distributed Routing Protocol to Support Ad-Hoc Mobile Computing," Conference Proceedings of the 1996 IEEE Fifteenth Annual International Phoenix Conference on Computers and Communications, Mar. 27-29, 1996, pp. 480-486.
TOTOLO, Home RF, A New Protocol on the Horizon, Feb. 1999, available at www.hometoys.com/htinews/feb99/articles/totolo/totolo.htm on Mar. 2, 2009.

(56) References Cited

OTHER PUBLICATIONS

Transmission Control Protocol; "DARPA Internet Program Protocol Specification," John Postel Editor; Information Sciences Institute, University of Southern California, California; Sep. 1981; pp. 1-85.
Varadhan et al., "SDRP Route Construction," Internet Draft, available at draft-ietf-sdr-route-construction-01.{ps,txt}, Feb. 27, 2005, pp. 1-12.
Vardhan, "Wireless Integrated Network Sensors (WINS): Distributed in Situ Sensing for Mission and Flight Systems," 2000 IEEE Aerospace Conference Proceedings, (2000).
Verizon, "Verizon Broadband Anytime," Copyright 2003, https://www33.verizon.com/wifi/login/loacations/locations-remote.jsp (2 pages).
Wang et al., "Energy-Scalable Protocols for Battery Operated MicroSensor Networks," Department of Electrical Engineering Massachusetts Institute of Technology, 1999.
Warrock, "School Give Report on Radio-Based FMS," Energy User News, Nov. 7, 1983, pp. 1.
Weiser, "Some Computer Science Issues in Ubiquitous Computing," Communications of the ACM, Jul. 1993.
Weiser, "The Computer for the 21st Century," Scientific American, Sep. 1991.
Westcott et al., "A Distributed Routing Design for a Broadcast Environment," 1982 IEEE Military Communications Conference on Progress in Spread Spectrum Communications, vol. 3, Oct. 17-20, 1982, pp. 10.4.1-10.4.5.
Westcott et al., "Hierarchical Routing for Very Large Networks," IEEE Military Communications Conference, Oct. 21-24, 1984, Conference Record vol. 2, pp. 214-218.
Westcott, "Issues in Distributed Routing for Mobile Packet Radio Networks," Proceedings of Computer Networks Compcon '82, Sep. 20-23, 1982, pp. 233-238.
Wey, Jyhi-Kong et al., "Clone Terminator: An Authentication Service for Advanced Mobile Phone System", 1995 IEEE 45th Vehicular Technology Conference, Chicago, IL, pp. 175-179 + Cover Page, Jun. 25-28, 1995.
Wikipedia, "Ad Hoc On-Demand Distance Vector Routing," available at http://en.wikipedia.org/wiki/Ad_Hoc_On-Demand_Distance_Vector_Routing on Aug. 25, 2009, pp. 1-3.
Wikipedia, "Bellman-Ford Algorithm," available at http://en.wikipedia.org/wiki/Bellman-Ford.
Wikipedia, "Border Gateway Protocol," available at http://en.wikipedia.org/wiki/Border_Gateway_Protocol, Jun. 24, 2009, pp. 1-13.
Wikipedia, "Distance-Vector Routing Protocol," available at http://en.wikipedia.org/wiki/Distance-Vector_Routing_Protocol, Jun. 24, 2009, pp. 1-4.
Wikipedia, "Enhanced Interior Gateway Routing Protocol," available at http://en.wikipedia.org/wiki/EIGRP, Jun. 24, 2009, pp. 1-7.
Wikipedia, "Exterior Gateway Protocol," available at http://en.wikipedia.org/wiki/Exterior_Gateway_Protocol, Jun. 24, 2009, pp. 1.
Wikipedia, "Interior Gateway Routing Protocol," available at http://en.wikipedia.org/wiki/Interior_Gateway_Routing_Protocol, Jun. 24, 2009, pp. 1-2.
Wikipedia, "IS-IS," available at http://en.wikipedia.org/wiki/IS-IS, Jun. 24, 2009, pp. 1-3.
Wikipedia, "L. R. Ford, Jr.," available at http://en.wikipedia.org/wiki/L._R._Ford,_Jr, Jun. 24, 2009, pp. 1.
Wikipedia, "Open Shortest Path First," available at http://en.wikipedia.org/wiki/open_shortest_path_first.
Wikipedia, "Richard E. Bellman," available at http://en.wikipedia.org/wiki/Richard_Bellman, Jun. 24, 2009, pp. 1-3.
Wikipedia, "Routing Information Protocol," available at http://en.wikipedia.org/wiki/Routing_Information_Protocol, Jun. 24, 2009, pp. 1-4.
Will et al., "Wireless Networking for Control and Automation of Off-road Equipment," ASAE, Jul. 18-21, 1999, pp. 1-10.
Wilson, Lexicon 700t Touchscreen Remote, Jan. 1, 1999, available at http://avrev.com/home-theater-remotes-system-control/remotes-system on Mar. 2, 2009, pp. 1-3.
Wright (ed.), Home-automation networks mature with the PC industry chases a new home LAN, EDN Design Feature, date: unknown, pp. 1-9.
Wu, Jie, "Distributed System Design", Department of Computer Science and Engineering, Florida Atlantic University, CRC Press, pp. 177-180, 204 + Cover Pages, 1999.
Kaiser, "Embedded Wireless Devices: Sensors," Outline, École Polytechnique Fédérale de Lausanne, pp. 1-53.
Kaiser, "Embedded Wireless Devices: Signal Processing," Outline, École Polytechnique Fédérale de Lausanne, pp. 1-19.
Kaiser, "Embedded Wireless Devices: Wireless Networking," Outline, École Polytechnique Fédérale de Lausanne, pp. 1-16.
Kaiser, "Embedded Wireless Devices: Wireless Physical Layer," Outline, École Polytechnique Fédérale de Lausanne, pp. 1-29.
Karn et al., "Packet Radio in the Amateur Service," IEEE Journal on Selected Areas in Communications, vol. SAC-3, No. 3, May 1985, pp. 431-439.
Katz et al., "The Bay Area Research Wireless Access Network (BARWAN)" (Jun. 1996) (presentation paper), http://daedalus.cs.berkeley.edu/talks/retreat.6.97/BARWAN.597.ppt, pp. 1-66.
Katz et al., "The Bay Area Research Wireless Access Network (BARWAN)," University of California at Berkeley, available at http://www.cs.berkeley.edu-randy/Daedalus/BARWAN/BARWAN_index.html, 6 pages.
Katz et al., "Towards a Wireless Overlay Internetworking Architecture", DARPA ITO Sponsored Research, 1997 Project Summary, University of California, Berkeley, pp. 1-8, Including a Slide Show Presentation of 56 Pages at http://daedalus.cs.berkeley.edu/talks/retreat.6.96/overview.pdf.
Kemp, "Home Automation Application Guide," Applications for Home Automation in Any Home, vol. 1, 2000, pp. 1-106.
Kleinrock et al., "Hierarchical Routing for Large Networks, Performance Evaluation, and Optimization," Computer Networks 1 (1977), pp. 155-174.
Kocom, "Digital Home Network, Kitchen TV Phone KTD-505, User's Manual," pp. 1-7.
Kohno et al., "An Adaptive Sensor Network System for Complex Environments in Intelligent Autonomous Systems (Kakazu et al., eds.)," IOS Press, 1998, pp. 21-28.
Kooser et al., "Testing 1-2-3," Entrepreneur Magazine, Sep. 2003, pp. 27-30.
Krishnamachari, "Networking Wireless Sensors," Cambridge University Press, Date: unknown, pp. 1-10.
Krishnamachari, "Wireless Sensor Networks: the Vision;" Cambridge University Press; pp. 1-10.
Lacoss, "Distributed Sensor Networks, Final Report," Lincoln Laboratory at Massachusetts Institute of Technology, Sep. 30, 1986, pp. 1-225.
Lauer et al., "Survivable Protocols for Large Scale Packet Radio Networks," IEEE Global Telecommunications Conference, Nov. 26-29, 1984, vol. 1 of 3, pp. 468-471.
Lauer, "Packet-Radio Routing, Routing in Communications Networks," Ch. 11 (1995) pp. 351-396.
Lee et al., "Distributed Measurement and Control Based on the IEEE 1451 Smart Transducer Interface Standards," Proceedings of the 16th IEEE Instrumentation and Measurement Technology Conference, vol. 1, May 24-26, 1999, IEEE, pp. 608-613.
Leiner et al., "Goals and Challenges of the DARPA GloMo Program;" IEEE Personal Communications; Dec. 1996, vol. 3, No. 6; pp. 34-45.
Leviton Manufacturing Co., Inc., "The DECORA® Collection of Designer Devices," 2006, pp. 1-85.
Lewis et al., "Packet-Switching Applique for Tactical VHF Radios," 1987 IEEE Military Communications Conference, Oct. 19-22, 1987, Conference Record vol. 2 of 3, pp. 449-455.
Lin et al., "Adaptive Clustering for Mobile Wireless Networks;" Publisher: unknown; Date: unknown; pp. 1-21.
Lin et al., "CMOS Front End Components for Micropower RF Wireless Systems;" EED, UCLA Electrical Engineering Department; 1998, pp. 1-5.

(56) References Cited

OTHER PUBLICATIONS

Lin et al., "Wireless Integrated Network Sensors (WINS) for Tactical Information Systems," UCLA, Rockwell Science Center; Date: unknown; pp. 1-5.
Linear Corporation, "Supervised Digital Security Transmitter t-90, Installation Instructions," 2006, pp. 1-2.
Linear Corporation, "Supervised Digital Security Transmitters TX-91, TX-92, TX-94, Operation Instructions," 1993, pp. 1.
Linear Corporation, "Supervised Wireless Receiver and Zone Expander SRX-64A, Installation Instructions," 2003, pp. 1-2.
Local and Metropolitan Area Networks: Wireless Medium Access Control (MAC) and Physical (PHY) Specifications, Author: unknown; IEEE, Nov. 1997, pp. 1-98.
Clare et al., "Self-Organizing Distributed Sensor Networks," UCLA, Rockwell Science Center.
Clare, "AWAIRS Progress Review: Planned Milestones," UCLA Rockwell Science Center, Nov. 20, 1998.
Lougheed et al., "A Border Gateway Protocol 3 (BGP-3)," RFC 1267, (Oct. 1991), available at http://tools.ietf.org/html/rfc1267, Jun. 24, 2009, pp. 1-36.
Lowe et al., "Publishing Bibliographic Data on Optical Disks: A Prototypical Application and Its Implications," Third International Conference on Optical Mass Data Storage, Proceedings of SPIE, vol. 529, pp. 227-236.
Lutron Electronics Co. Inc., Connecting to a RadioRA System via a Local Area Network, Application Note #127, Date: unknown, pp. 1-16.
Lutron Electronics Co. Inc., Homeowner's Guide for the RadioRA® Quick Start Package, 2004, pp. 1-8.
Lutron Electronics Co. Inc., How to Retrofit RadioRA® Wall-Mounted Master Control into an existing home, Application #41, 2004, pp. 1-2.
Lutron Electronics Co. Inc., Interfacing RadioRA® to Security and Fire Alarm Systems, Application Note #59, pp. 1-4.
Lutron Electronics Co. Inc., IR/RS232 Interface for Bang & Olufsen® Remote Control and RadioRA®, Application Note #119, 2004, pp. 1-3.
Lutron Electronics Co. Inc., Level Capture with a RadioRA® Master Control, Application Note #73, 2003, pp. 1-3.
Lutron Electronics Co. Inc., Modem Installation for HomeWorks®, Application Note #9, 1998, pp. 1-4.
Lutron Electronics Co. Inc., RadioRA® RA-IR-KIT Installation Instructions, Application Note #61, 2000, pp. 1-4.
Lutron Electronics Co. Inc., RadioRA® RF Signal Repeater, 1998, pp. 1-2.
Lutron Electronics Co. Inc., RadioRA® Single-Location Switch, Controls for Permanently Installed Lighting Loads, 1998, pp. 1-2.
Lutron Electronics Co. Inc., RadioRA® Table Lamp Controls, Dimming and Switching Controls for Table and Floor Lamps, 1999, pp. 1-2.
Lutron Electronics Co. Inc., Using a Photocell with the RadioRA® System, Application Note #45, 1998, pp. 1-4.
Lutron Electronics Co. Inc., Using an Astronomic Timeclock with the RadioRA® System, Application Note #42, 1998, pp. 1-2.
Lutron Electronics Co. Inc., Using the RadioRA® System to Activate Scenes 5-16 on a Grafik Eye® Control Unit, Application Note #48, 1998, pp. 1-4.
Lutron Electronics Co. Inc., Using the RadioRA® Telephone Interface, Application Note #46, 1998, pp. 1-2.
Lynch et al., "Application of Data Compression Techniques to a Large Bibliographic Database," Proceeding of the Seventh International Conference on Very Large Databases, Cannes, France, Sep. 9-11, 1981 (Washington, DC: IEEE Computer Society Press, 1981), pp. 435-447.
Lynch et al., "Beyond the Integrated Library System Concept: Bibliographic Networking at the University of California," Proceedings of the Second National Conference on Integrated Online Library Systems Proceedings, Sep. 1984, pp. 243-252.
Lynch et al., "Conservation, Preservation and Digitization, Energies for Transition," Proceedings of the Fourth National Conference of the Association of College and Research Libraries, Baltimore, MD, Apr. 9-12, 1986 (Chicago, IL: Association of College and Research Libraries, 1986), pp. 225-228.
Lynch et al., "Document Delivery and Packet Facsimile," Proceedings of the 48th ASIS Annual Meeting, vol. 22, Oct. 20-24, 1985, pp. 11-14.
Lynch et al., "Electronic Publishing, Electronic Imaging, and Document Delivery, Electronic Imaging '86," (Boston, MA: Institute for Graphic Communication, Inc., 1986), pp. 662-667.
Lynch et al., "Library Applications of Electronic Imaging Technology," Information Technology and Libraries, Jun. 1986, pp. 100-105.
Lynch et al., "Packet Radio Networks: Architectures, Protocols, Technologies and Applications," Pergamon Press, led., 1987, pp. 1-275.
Lynch et al., "Public Access Bibliographic Databases in a Multicampus University Environment, Databases in the Humanities and Social Sciences—4," Proceedings of the International Conference on Databases in the Humanities and Social Sciences, Jul. 1987, Learned Information, Inc., 1989, pp. 411-419.
Lynch et al., "The Telecommunications Landscape: 1986," Library Journal, Oct. 1, 1986, pp. 40-46.
U.S. Appl. No. 12/477,329 Non-Final Office Action dated Aug. 19, 2010.
U.S. Appl. No. 12/477,329 Non-Final Office Action dated Dec. 28, 2009.
U.S. Appl. No. 12/356,358 Final Office Action dated Sep. 15, 2010.
U.S. Appl. No. 12/356,358 Non-Final Office Action dated Jan. 21, 2010.
U.S. Appl. No. 10/792,608 Non-Final Office Action dated Jan. 22, 2010.
U.S. Appl. No. 10/792,608 Final Office Action dated Sep. 2, 2009.
U.S. Appl. No. 10/792,608 Non-Final Office Action dated Feb. 3, 2009.
U.S. Appl. No. 10/792,608 Final Office Action dated Aug. 19, 2008.
U.S. Appl. No. 12/792,608 Restriction Requirement dated Dec. 21, 2007.
U.S. Appl. No. 10/792,608 Non-Final Office Action dated Mar. 21, 2007.
U.S. Appl. No. 12/816,266 Non-Final Office Action dated Oct. 12, 2010.
U.S. Appl. No. 11/814,632 Final Office Action dated Dec. 7, 2010.
U.S. Appl. No. 11/814,632 Non-Final Office Action dated Jul. 13, 2010.
U.S. Appl. No. 11/125,009 Non-Final Office Action dated Dec. 9, 2010.
U.S. Appl. No. 11/125,009 Non-Final Office Action dated Mar. 1, 2010.
U.S. Appl. No. 11/125,009 Non-Final Office Action dated Apr. 6, 2009.
U.S. Appl. No. 11/125,009 Non-Final Office Action dated Oct. 1, 2008.
U.S. Appl. No. 11/125,009 Notice of Allowance dated Sep. 21, 2009.
U.S. Appl. No. 12/169,536 Non-Final Office Action dated Oct. 20, 2010.
U.S. Appl. No. 12/689,220 Non-Final Office Action dated Dec. 15, 2010.
U.S. Appl. No. 11/300,902 Non-Final Office Action dated Aug. 6, 2010.
U.S. Appl. No. 11/300,902 Non-Final Office Action dated Nov. 17, 2009.
U.S. Appl. No. 11/300,902 Non-Final Office Action dated Oct. 7, 2008.
U.S. Appl. No. 11/300,902 Final Office Action dated Jun. 4, 2008.
U.S. Appl. No. 11/300,902 Non-Final Office Action dated Oct. 11, 2007.
U.S. Appl. No. 11/300,902 Advisory Action dated Aug. 11, 2008.
U.S. Appl. No. 12/482,892 Non-Final Office Action dated Dec. 13, 2010.
Custom Solutions, Inc., HomeVision—PC Version 2.62, Owner's Manual (1997), pp. 1-234.
Custom Solutions, Inc., Media Information, Feb. 16, 1999, available at http://web.archive.org/web/19990502073249/www.csi3.com/hv_media.htm on Feb. 27, 2009, pp. 1-2.

(56) References Cited

OTHER PUBLICATIONS

Custom Solutions, Inc., Using Enerzone StatNet Thermostats with HomeVision (1998) pp. 1-16.
Davies et al., "Internetworking in the Military Environment," Proceedings of IEEE Infocom '82 (1982) pp. 19-29.
Davies et al., "The Application of Packet Switching Techniques to Combat Net Radio," Proceedings of the IEEE, vol. 75, No. 1, Jan. 1987, pp. 43-55.
Davis et al., "Knowledge-Based Management of Cellular Clone Fraud," IEEE (1992), pp. 230-234.
Deering et al., "Internet Protocol, Version 6 (IPv6)," RFC1883, Publisher: unknown, Dec. 1995, pp. 1-37.
Deering et al., "Internet Protocol, Version 6 (IPv6)," RFC2460, The Internet Society, Dec. 1998, pp. 1-39.
Diaz, "Intervehicular Information System (IVIS): the Basis for a Tactical Information System," SAE International, Mar. 1994, pp. 1-14.
Dixon et al., "Addressing, Bridging and Source Routing," IEEE Network, Jan. 1988, vol. 2, No. 1, pp. 25-32.
Dong et al., "Low Power Signal Processing Architectures for Network Microsensors," ACM, 1997, pp. 173-177.
Echelon Corp., "LonTalk® Protocol Specification," Doc. No. 19550, available at http://www.enerlon.com/JobAids/Lontalk%20Protocol%20Spec.pdf (1994).
Echelon Corp., "Series 90™-30 PLC LonWorks® Bus Interface Module User's Manual," Doc. No. GFK-1322A, available at http://www.pdfsupply.com/pdfs/gfk1322a.pdf (1997).
Elson et al., "Fine-Grained Network Time Synchronization Using Reference Broadcasts," UCLA Computer Science Department, May 17, 2002, pp. 1-14.
Eng et al., "BAHAMA: A Broadband Ad-Hoc Wireless ATM Local-Area Network," 1995 IEEE International Conference on Communications, Jun. 18-22, 1995, pp. 1216-1223.
Ephremides et al., "A Design Concept for Reliable Mobile Radio Networks with a Frequency Hopping Signaling," IEEE 1987, pp. 1-18.
ESTeem Application Paper—AgriNorthwest Employee's Provide Wireless Control System (describing a system that was in use prior to Mar. 1999).
ESTeem Application Paper—Allen-Bradley Goes Wireless on Alaska's North Slope (describing a system that was in use prior to Mar. 1999).
ESTeem Application Paper—Build Your Own Wireless Power Distribution System (describing a system that was in use prior to Mar. 1999).
ESTeem Application Paper—Lost Cabin Gas Plant Uses Wireless Control to Enhance Production & Safety (describing a system that was in use prior to Mar. 1999).
ESTeem Application Paper—Northwest Farm Applies Wireless Solution (describing a system that was in use prior to Mar. 1999).
ESTeem Application Paper—Wireless Control of Polluted Water (describing a system that was in use prior to Mar. 1999).
ESTeem Application Paper—Wireless Mobile Mapping System (describing a system that was in use prior to Mar. 1999).
ESTeem Application Paper—Wireless Networking for Kodiak's Coast Guard Station (describing a system that was in use prior to Mar. 1999).
ESTeem Application Paper—Wireless Networking for Natural Gas Extraction (describing a system that was in use prior to Mar. 1999).
ESTeem Models 85, 95, 96, & 98 User's Manual (describing the ESTeem 96C and 96F radios used prior to 1999).
Estrin et al., "Next Century Challenges: Scallable Coordination in Sensor Networks," ACM, 1999, pp. 263-270.
Estrin et al., "RFC1940—Source Demand Routing: Packet Format and Forwarding Specification (Version 1)," Network Working Group, May 1996, available at http://www.faqs.org/rfcs/rfc1940.html, Sep. 14, 2009, pp. 1-20.
Estrin et al., "Source Demand Routing: Packet Format and Forwarding Specification (Version 1)", Network Working Group, Internet Draft, Jan. 19, 1995, pp. 1-28.
Federal Communications Commission, "Notice of Proposed Rule Making and Order," Adopted Dec. 17, 2003, Released Dec. 30, 2003 (54 pages).
Frank, "Transmission of IP Datagrams Over NET/ROM Networks, ARRL Amateur Radio 7th Computer Networking Conference," Oct. 1988, pp. 65-70.
Frank, "Understanding Smart Sensors," Artech House (1996).
Frankel, "Packet Radios Provide Link for Distributed Survivable Command Control Communications in Post-Attack Scenarios," Microwave System News, Jun. 1983, Circle Reader Service No. 77, pp. 80-108.
Franz, "HiperLAN—Der ETSI-Standard fur locale Funknetze," NTZ, Sep. 1995, 10 pages.
Fullmer, "Collision Avoidance Techniques for Packet-Radio Networks," Dissertation, University of California at Santa Cruz, Jun. 1998, pp. 1-162.
Gale et al., "The Impact of Optical Media on Information Publishing," Bulletin of the American Society for Information Science, vol. 12, No. 6, Aug./Sep. 1986, pp. 12-14.
Garbee, "Thoughts on the Issues of Address Resolution and Routing in Amateur Packet Radio TCP/IP Networks," ARRL Amateur Radio 6th Computer Networking Conference, Aug. 1987, p. 56-58.
Garcia-Luna-Aceves, "A Fail-Safe Routing Algorithm for Multishop Packet-Radio Networks," IEEE Infocom '86, Technical Sessions: Apr. 8-10, 1986, pp. 434-442.
Garcia-Luna-Aceves, "A Minimum-hop Routing Algorithm Based on Distributed Information," Elsevier Science Publishers, B.V. (North Holland), 1989, pp. 367-382.
Garcia-Luna-Aceves, "Routing Management in Very Large Scale Networks," Elsevier Science Publishers, B.V. (North Holland), 1988, pp. 81-93.
Garcia-Luna-Aceves, J.J et al., "Wireless Internet Gateways (WINGS)", 1997 IEEE, pp. 1271-1276, 1997.
Nunavut et al., Web Based Remote Security System (WRSS) Model Development, IEEE, Apr. 7-9, 2000, pp. 379-382.
X10, "CK11A ActiveHome, Home Automation System, Owner's Manual," Oct. 23, 1997, pp. 1-56.
X10.com: The Supersite for Home Automation, "What's in the Kit," available at http://web.archive.org/web/19991111133453/www.com/products/x, on Mar. 2, 2009, pp. 1-2.
X10.com: The Supersite for Home Automation, "Wireless Remote Control System (RC5000)," available at http://web.archive.org/web/1999111453227/www.x10.com/products/x1 on Mar. 2, 2009, pp. 1.
X10: The Supersite for Home Automation, "Transceiver Module," available at http://web.archive.org/web/20000229141517/www.x10.com/products/x on Mar. 2, 2009, pp. 1.
Xecom Incorporated, "EX900S Smart Spread Spectrum Transceiver," Nov. 2003 (13 pages).
Yadav, "Border Security Using Wireless Integrated Network Sensors (WINS)"; ECE 7th SEM, UE6551.
Young, "USAP: A Unifying Dynamic Distributed Mulitchannel TDMA Slot Assignment Protocol," Rockwell International Communication Systems Division, IEEE (1996).
Yu, "Target Identification Processor for Wireless Sensor Network," Dissertation, Los Angeles: University of California, 1999, pp. 1-110.
Zander et al., "The SOFTNET Project: A Retrospect," 1988 IEEE, pp. 343-345.
Zich et al., "Distribution, Networks, and Networking: Options for Dissemination", Workshop on Electronic Texts Session III, http://palimpsets.stanford.edu/byorg/lc/etextw/sess3.html, pp. 1-10, Accessed Jul. 17, 2007.
Zimmermann et al., "Daten Funken, Modacom-Telekom-Datenfunkdienst;" Bates SENSUS15305-15309, Publisher: unknown; Date: unknown, pp. 1-6.
Kahn et al., Advances in Packet Radio Technology, Proceedings of the IEEE, vol. 66, No. 11, pp. 1468-1496 (Nov. 1978).
Agre et al., "Development Platform for Self-Organizing Wireless Sensor Networks," Rockwell Science Center and UCLA, date: Apr. 1999, pp. 257-268.
Kahn, "The Organization of Computer Resources into a Packet Radio Network," IEEE, Jan. 1977, vol. Com-25 No. 1, pp. 169-178.
GE Security, "NetworkX NX-4," 2004, pp. 1-2.
GE Security, "NetworkX NX-548E," 2006, pp. 1-2.

(56) References Cited

OTHER PUBLICATIONS

Geier et al., "Networking Routing Techniques and their Relevance to Packet Radio Networks," ARRL/CRRL Amateur Radio 6th Computer Networking Conference, London, Ontario, Canada, Sep. 1990, pp. 105-117.

Gerla et al., "Multicluster, Mobile, Multimedia Radio Network," UCLA Computer Science Department; Baltzer Journals; Wireless Networks; Jul. 12, 1995, pp. 255-265.

Golden Power Manufacturing, "6030 PCT Programmable Communicating Thermostat," Author: unknown, 2007, pp. 1-3.

Golden Power Manufacturing, "Ritetemp Universal Wireless Thermostat," Author: unknown, 2007, pp. 1-2.

Goldman et al., "Impact of Information and Communications Technologies on Residential Customer Energy Services," Paper, Berkeley: UCLA, Oct. 1996, pp. 1-89.

Gower et al., "Congestion Control Using Pacing in a Packet Radio Network", Rockwell International, Collins Communications Systems Division, Richardson, TX, IEEE 1982, pp. 23.1-1-23.1-6, 1982.

Grady et al., "Telemetry Options for Small Water Systems," Special Report SR14-1999, Publisher: unknown, Sep. 1999, pp. 1-23.

Guardian Alarms, Inc., "Home Security System—Model 7068 Digital Dialer Interface," Author: unknown, available at www.guardianalarms.net, 2007, pp. 1.

Guardian Alarms, Inc., "Security Company—Home Alarm System Monitoring—AES 7067 IntelliTap-II Digital Dialer Interface," Author: unknown, available at www.guardianalarms.net, 2007, pp. 1.

Guardian Alarms, Inc., "Security System—Alarm System Monitoring—7160 EZ Router," Author: unknown, available at www.guardianalarms.net, 2007, pp. 1.

Guardian Alarms, Inc., "Security System—Alarm System Monitoring—NET 7000," Author: unknown, available at www.guardianalarms.net, 2007, pp. 1.

Guardian Alarms, Inc., "Security System—Alarm System Monitoring—Radionics FDX," Author: unknown, available at www.guardianalarms.net, 2007, pp. 1.

Rosen, "Exterior Gateway Protocol (EGP)," Bolt Beranek and Newman Inc., Oct. 1982, pp. 1-48.

ADEMCO Group, Control/Communicator 5110XM Installation Instructions, Apr. 1996, ADEMCO Group, Author: unknown, pp. 1-76.

ADEMCO Group, Vista-128FB Commercial Fire and Burglary Partitioned Security System Quick Start Guide, Oct. 1998, ADEMCO Group, Author: unknown, pp. 1-68.

Brain, "How Motes Work: A Typical Mote," available at http://computer.howstuffworks.com/mote4.htm, on Feb. 25, 2010, pp. 1-2.

Cook et al., Water Distribution and Control by Wireless Networking, Electronic Systems Technology; date: unknown, pp. 1-3.

ADEMCO Group, 7720P Programming Tool, User Guide, Mar. 1992, ADEMCO Group, Author: unknown, available at http://www.guardianalarms.net; pp. 1-8.

ADEMCO Group, 7720Plus Subscriber Radio Installation Instructions, Oct. 1996, ADEMCO Group, Author: unknown, available at http://www.guardianalarms.net; pp. 1-30.

ADEMCO Group, 7720ULF Combination Fire Control and Long Range Radio Transmitter, 1997, ADEMCO Group, Author: unknown, available at http://web.archive.org/web/19990501210612/www.ademco.com/ademco on Mar. 5, 2009, pp. 1-3.

ADEMCO Group, 7720ULF Subscriber Radio, Installation Instructions, Mar. 1995, ADEMCO Group, Author: unknown, available at http://www.guardianalarms.net, pp. 1-20.

ADEMCO Group, 7720V2 Self-Contained Long Range Radio Transmitter, 1997, ADEMCO Group, Author: unknown, available at http://web.archive.org/web/19990501212349/www.ademco.com/ademco on Mar. 5, 2009 pp. 1-4.

ADEMCO Group, 7720V2 Subscriber Radio, Installation Instructions, Jun. 1996, ADEMCO Group, Author: unknown, available at http://www.guardianalarms.net, pp. 1-24.

ADEMCO Group, 7810iR Internet Receiver, Installation and Setup Guide, May 2002, ADEMCO Group, Author: unknown, available at http://www.guardianalarms.net, pp. 1-58.

ADEMCO Group, 7820 Appendicies, Mar. 1995, ADEMCO Group, Author: unknown, available at http://www.guardianalarms.net, pp. 1-2.

ADEMCO Group, 7820 Integrated Radio Transmitter, Installation Instructions, Aug. 1995, ADEMCO Group, Author: unknown, available at http://www.guardianalarms.net, pp. 1-52.

ADEMCO Group, 7825 Outdoor Antenna with Bracket, Installation Instructions, Feb. 1995, ADEMCO Group, Author: unknown, available at http://www.guardianalarms.net, pp. 1-2.

ADEMCO Group, 7830R SafetyNet Subscriber Radio, Installation Instructions, Jun. 1996, ADEMCO Group, Author: unknown, available at http://www.guardianalarms.net, pp. 1-32.

ADEMCO Group, 7830R Subscriber Transmitter, 1997, available at http://web.archive.org/web/19990501215427/www.ademco.com.ademco on Mar. 5, 2009, pp. 1-3.

ADEMCO Group, 7835C Cellular Control Channel Transceiver, Installation and Setup Guide, Sep. 1998, ADEMCO Group, Author: unknown, available at http://www.guardianalarms.net, pp. 1-32.

ADEMCO Group, 7835C Cellular SafetyNet Subscriber Radio Transceiver, 1997ADEMCO Group, Author: unknown, available at http://web.archive.org/web/19990801221202/www.ademco.com/on Mar. 5, 2009, pp. 1-3.

ADEMCO Group, 7845C Cellular Control Channel Transceiver, Installation and Setup Guide, Sep. 1990, ADEMCO Group, Author: unknown, available at http://www.guardianalarms.net, pp. 1-104.

ADEMCO Group, 7845CZ Seven Zone Cellular Control Channel Transceiver, Installation and Setup Guide, Sep. 2001, ADEMCO Group, Author: unknown, available at http://www.guardianalarms.net, pp. 1-64.

ADEMCO Group, 7845i Internet Communications Module, Installation and Setup Guide, Mar. 2002, ADEMCO Group, Author: unknown, available at http://www.guardianalarms.net, pp. 1-42.

ADEMCO Group, 7920SE 900MHz Fully Synthesized Transceiver, 1997, ADEMCO Group, Author: unknown, available at http://web.archive.org/web/19990501222639/www.ademco.com/ on Mar. 5, 2009, pp. 1-3.

ADEMCO Group, 7920SE Transceiver, Installation Instructions, Apr. 1995, ADEMCO Group, Author: unknown, available at http://www.guardianalarms.net, pp. 1-80.

ADEMCO Group, ADEMCO World Leader in Home Security Products, 1997, ADEMCO Group, Author: unknown, available at http://web.archive.org/web/19990428164624/www.ademco.com/ademco on Mar. 5, 2009, pp. 1-2.

ADEMCO Group, AlarmNet Introduces Control Channel Cellular for Commercial Fire/Burglary Applications, ADEMCO Group (press release), Aug. 31, 1999, available at http://web.archive.org/web/19990420234120/www.ademco.com/pr0831 on Mar. 31, 2009.

ADEMCO Group, AlarmNet, 1997, ADEMCO Group, Author: unknown, available at http://web.archive.org/web/199904240234130/www.ademco.com/ademco on Mar. 5, 2009, pp. 1-3.

ADEMCO Group, Alpha Vista No. 5130XT Security System, Installation Instructions, Mar. 1989, ADEMCO Group, Author: unknown, pp. 96.

ADEMCO Group, Compass Network Downloader, ADEMCO Group, Author: unknown, Date: unknown, available at http://www.guardianalarms.net pp. 1-109.

ADEMCO Group, Compass, 1997, ADEMCO Group, Author: unknown, available at http://web.archive.org/web/19990209094401/www.ademco.com/ademco on Mar. 5, 2009.

ADEMCO Group, Control/Communicator 5110XM User's Manual, Apr. 1996, ADEMCO Group, Author: unknown, pp. 1-30.

ADEMCO Group, Fire and Burglary System Model 5120XM User's Manual, Apr. 1996, ADEMCO Group, Author: unknown, pp. 1-40.

ADEMCO Group, Home Page, ADEMCO Group, Author: unknown, available at http://web.archive.org/web/19961023204954/http://ademco.com/ on Mar. 5, 2009, pp. 1.

ADEMCO Group, LYNX—Quick Install Security System, 1997, ADEMCO Group, Author: unknown, available at http://web.archive.org/web/19990116225005 pp. 1-3.

ADEMCO Group, Lynx Quick Start Guide, Oct. 1998, ADEMCO Group, Author: unknown, pp. 1-4.

(56) References Cited

OTHER PUBLICATIONS

ADEMCO Group, Lynx Security System Installation and Setup Guide, Oct. 1998, ADEMCO Group, Author: unknown, pp. 1-48.
ADEMCO Group, Lynx Security System Programming Form & Summary of Connections, Oct. 1998, ADEMCO Group, Author: unknown, pp. 1-16.
ADEMCO Group, Lynx Security System User Guide, Oct. 1998, ADEMCO Group, Author: unknown, pp. 1-40.
ADEMCO Group, Powerline Carrier Device Modules, 1997 ADEMCO Group, Author: unknown, available at http://web.archive.org/web/19990218035115/www.ademco.com/ademco on Mar. 5, 2009, pp. 1-2.
ADEMCO Group, Remote Keypads 6128, 6137, 6137R, 6138, 6139 & 6139R, Installation Guide, Aug. 1998, ADEMCO Group, Author: unknown, pp. 1-2.
ADEMCO Group, Security System Model 4110DL Programming Form, Oct. 1996, ADEMCO Group, Author: unknown, pp. 1-8.
ADEMCO Group, Security System Model 4110XM Programming Form, Jul. 1996, ADEMCO Group, Author: unknown, pp. 1-4.
ADEMCO Group, Security System Model 4120EC Programming Form, Sep. 1993, ADEMCO Group, Author: unknown, pp. 1-2.
ADEMCO Group, Security System Model 4120XM Programming Form, Sep. 1992, ADEMCO Group, Author: unknown, pp. 1-4.
ADEMCO Group, Security System Model 4130XM, 4140XM, 5130XM Programming Form, Date: unknown, ADEMCO Group, Author: unknown, pp. 1-4.
ADEMCO Group, Security System Model 4130XT/4140/5130XT Programming Form, Jul. 1989, ADEMCO Group, Author: unknown, pp. 1-2.
ADEMCO Group, Security System Model 4140XMP Programming Form, Jan. 1992, ADEMCO Group, Author: unknown, pp. 1-2.
ADEMCO Group, Security System Model 4140XMPT Programming Form, ADEMCO Group, Author: unknown, Date: unknown, pp. 1-2.
ADEMCO Group, Security System Model 4140XMPT2 Programming Form, Apr. 1996, ADEMCO Group, Author: unknown, pp. 1-4.
ADEMCO Group, Security System Model 5110XM Programming Form, Apr. 1996, ADEMCO Group, Author: unknown, pp. 1-4.
ADEMCO Group, Security System Model 5120XM Programming Form, Jun. 1996, ADEMCO Group, Author: unknown, pp. 1-4.
ADEMCO Group, Security System Model 5140XM Programming Form, Jun. 1993, ADEMCO Group, Author: unknown, pp. 1-4.
ADEMCO Group, Security System Model Vista-10 Programming Form, Sep. 1994, ADEMCO Group, Author: unknown, pp. 1-4.
ADEMCO Group, Security System Model Vista-10SE Programming Form, Apr. 1997, ADEMCO Group, Author: unknown, pp. 1-24.
ADEMCO Group, Security System Model Vista-128B Commercial Burglary Partitioned Security System with Scheduling, Quick Start Guide, Jun. 1998, ADEMCO Group, Author: unknown, pp. 1-39.
ADEMCO Group, Security System User's Manual, Sep. 1996, ADEMCO Group, Author: unknown, pp. 1-88.
ADEMCO Group, The Vista-100 Series, 1997, ADEMCO Group, Author: unknown, available at http://web.archive.org/web19970620010543/www.ademco.com/ademco on Mar. 5, 2009.
ADEMCO Group, The Vista-10SE, 1997, ADEMCO Group, Author: unknown, available at http://web.archive.org/web/19990502214402/www.ademco/com/ademco on Mar. 5, 2009, pp. 1-4.
ADEMCO Group, via16 Programming Form, Jul. 1993, ADEMCO Group, Author: unknown, pp. 1-2.
ADEMCO Group, via16 Security System, Installation Instructions, Jan. 1992, ADEMCO Group, Author: unknown, pp. 1-24.
ADEMCO Group, via-30+, Vista 10, 4111XM Security System User's Manual, Jul. 1994, ADEMCO Group, Author: unknown, pp. 1-44.
ADEMCO Group, via-30Pse Security System Programming Guide, Apr. 1997, ADEMCO Group, Author: unknown, pp. 1-24.
ADEMCO Group, via-30PSE, VISTA-1SE Security System User's Manual, Jan. 1997, ADEMCO Group, Author: unknown, pp. 1-88.
ADEMCO Group, Vista 4120XM and 4140XMP Security System User's Manual, Jan. 1994, ADEMCO Group, Author: unknown, pp. 1-60.
Chen et al., "Route Optimization and Location Updates for Mobile Hosts," 1996 IEEE, Proceedings of the 16th ICDCS, pp. 319-326.
Chen, Emerging Home Digital Networking Needs, Paper, DSP Solutions R & D Center, Texas Instruments, Inc., pp. 1-6.
Cisco Systems, Inc., Enhanced Interior Gateway Routing Protocol, Cisco Systems, Inc., Updated Sep. 9, 2005, pp. 1-44.
Cisco Systems, RFC1812—Requirements for IP Version 4 Routers, Fred Baker ed. (Jun. 1995), available at http://www.faqs.org/rfcs/rfc1812.html, Sep. 14, 2009, pp. 1-129.
Clement, "SCADA System Using Packet Radios Helps to Lower Cincinnati's Telemetry Costs," Water/Engineering & Management, Aug. 1996, pp. 18-20.
Cleveland, "Performance and Design Considerations for Mobile Mesh Networks," Milcom '96 Conference Proceedings, vol. 1 of 3, Oct. 22-24, 1996, pp. 245-249.
Clever Solutions—Metricom offers wireless data networks—includes related articles on Metricom's technology and the SONeTech company—Company Profile, available at http://findarticles.com/p/articles/mi_m0REL/is_n 11_v93/ai_147 70465/?tag=content;col1, on Nov. 22, 1993 (3 pages).
Coactive Networks, Inc., A New Solution for Offering Multive Telemetry Services to the Home, Coactive, 1999, pp. 1-8.
Coactive Networks, Inc. Coactive Connector® 1000 Series, Coactive, 2000, pp. 1-4.
Coactive Networks, Inc. Coactive Connector® 2000 Series, Coactive, Date: unknown, pp. 1-8.
Coactive Networks, Inc. Connecting Networks to the Real World™ Coactive, Date: unknown, pp. 1-4.
Coactive Networks, Inc. Corporate Backgrounder, Coactive, 2001, pp. 1-6.
Coactive Networks, Inc. Corporate Fact Sheet, Coactive, 2001, pp. 2.
Coactive Networks, Inc. Router-LE: Remote Access to LonWorks Over Ethernet, Coactive, 1998, pp. 1-4.
Coactive Networks, Inc., Router-LL: Connect LonWorks Networks Across Internet Protocol, Coactive, 1998, pp. 1-4.
Brownrigg et al., "Technical Services in the Age of Electronic Publishing," Library Resource & Technical Services, Jan./Mar. 1984, pp. 59-67.
Brownrigg et al., "User Provided Access to the Internet," available at http://web.simmons.edu/~chen/nit/NIT'92/033-bro.htm, Jun. 9, 2005, pp. 1-6.
Brownrigg, "Continuing Development of California State Radio Packet Project," Proceedings of the ASIS 1992 Mid-Year Meeting (Silver Spring, MD: American Society for Information Science, 1992), pp. 97-100.
Brunninga, "A Worldwide Packet Radio Network," Signal, vol. 42, No. 10, Jun. 1988, pp. 221-230.
Bryan et al., "Man-Portable Networked Sensor System," Publisher: unknown, Date: unknown, pp. 1-10.
Bult et al. Low Power Systems for Wireless Microsensors, UCLA Electrical Engineering Department, 1996 ISLPED, pp. 1-5.
Bult et al., "A Distributed, Wireless MEMS Technology for Condition Based Maintenance," EED, Defense Technical Information Center, UCLA, Electrical Engineering Department, Rockwell Science Center; Apr. 22-26, 1996.
Bult et al., "A Distributed, Wireless MEMS Technology for Condition Based Maintenance," Publisher: unknown; Nov. 1997, pp. 1-8.
Bult et al., "Low Power Systems for Wireless Microsensors," EED, UCLA; ILSPED; 1996, pp. 1-15.
Bult et al., "Low Power Systems for Wireless Microsensors," UCLA Electrical Engineering Department, Los Anegeles, CA and Rockwell Science Center, Thousand Oaks, CA; Aug. 14, 1996, pp. 25-29.
Bult et al., "Low Power Wireless Integrated Microsensors (LWIM)," EED, UCLA; ARPA—LPE PI Meeting, Apr. 27-28, 1995, pp. 1-30.
Bult et al., "Wireless Integrated Microsensors," EED, UCLA Electrical Engineering Department, Rockwell Science Center, TRF; Jun. 6, 1996, pp. 205-210.
CADDX-CADDI Controls, Inc., Ranger 9000E, User's Manual, downloaded from http://www.guardianalarms.net, May 17, 1996, pp. 1-9.

(56) References Cited

OTHER PUBLICATIONS

Carlisle, "Edison's NetComm Project," Proceedings of the 33rd Annual Rural Electric Power Conference, IEEE, Apr. 1989, pp. B5/1-B5/4.

Cohen et al., "IP Addressing and Routing in a Local Wireless Network," 1992 IEEE, 1992, pp. 626-632.

Cook et al., "Water Distribution and Control by Wireless Networking," Electronic Systems Technology, Date: unknown, pp. 1-3.

Corbell et al., "Technical Implementation in Support of the IAEA's Remote Monitoring Field Trial at the Oak Ridge Y-12 Plant," Dept. of Energy, Office of Scientific and Technical Information, Report No. SAND-—096-1934C, available at http://www.osti.gov/bridge/product.biblio.jsp?qu ery_id=1&page=0&osti_id=270678 (1996).

Corbell et al., "Technical Results of Y-12/IAEA Field Trial of Remote Monitoring System," Dept. of Energy, Office of Scientific and Technical Information, Report No. SAND—97-1781C, available at http://www.osti.gov/bridge/product.biblio.jsp?query_id=0&page=0&osti_id=505711 (1997).

Corcoran et al., "Browser-Style Interfaces to a Home Automation Network," IEEE Transactions on Consumer Electronics, vol. 43, No. 4, Nov. 1997, pp. 1063-1069.

Corcoran et al., "CEBus Network Access via the World-Wide-Web," available at http://ieeexplore.ieee.org/xpl/freeabs_all.jsp?arnumber= 517285, on Mar. 29, 2009, Paper published on Consumer Electronics, 1996, Digest of Technical Papers, pp. 236-237.

Corcoran et al., "CEBus Network Access via the World-Wide-Web," IEEE, 1996.

Corson et al., "Architectural Considerations for Mobile Mesh Networking," Milcom '96 Conference Proceedings vol. 1 of 3, Oct. 22-24, 1996, pp. 225-229.

Corson et al., "Internet-Based Mobile Ad Hoc Networking," IEEE Internet Computing, Jul.-Aug. 1999, pp. 63-70.

Court's claim construction Order dated Feb. 10, 2009, in *SIPCO LLC et al.* v. *The Toro Co. et al.*, Case No. 2:08-cv-00505-TJS (E.D. Pa.).

Custom Solutions, Inc. Acessories, available at http://web.archive.org/web/19981206221844/www.csi3.com/hv_pv4.htm on Feb. 27, 2009, pp. 1-3.

Custom Solutions, Inc., HomAtion 2000 for HomeVision, Press Release, available at http://web.archive.org/web/19981207075734/www.csi3.com/HV_PR_0 on Feb. 27, 2009, pp. 1-2.

Custom Solutions, Inc., HomeVision 2.7 "How to" Information, Date: unknown; pp. 1-146.

Custom Solutions, Inc., HomeVision 2.7 Auto Report Feature, Date: unknown, pp. 1-10.

Custom Solutions, Inc., HomeVision 2.7 Interface Command Protocol, Date: unknown, pp. 1-40.

Custom Solutions, Inc., HomeVision 2.7 Interface Command Protocol, Date: unknown, pp. 1-80.

Custom Solutions, Inc. HomeVision 2.7, Date: unknown, pp. 1-42.

Custom Solutions, Inc. HomeVision 2.7, Document Purpose, Date: unknown, pp. 1-28.

Custom Solutions, Inc. HomeVision 2.7, Summary of Changes—2.7, Date: unknown, pp. 1-26.

Custom Solutions, Inc. HomeVision 2.7, Welcome to HomeVision, Date: unknown, pp. 1-18.

Custom Solutions, Inc. HomeVision 2.7e, Owner's Manual (1999); pp. 1-596.

Custom Solutions, Inc. HomeVision 2.7e, Version History Overview, Date: unknown, pp. 1-38.

Custom Solutions, Inc. HomeVision Description, available at http://web.archive.org/web/19981206004955/http://www.csi3.com/HV.htm on Mar. 2, 2009, pp. 1-14.

Custom Solutions, Inc. HomeVision PC 2.62 Interface Command Protocol, date: unknown, pp. 1-36.

Custom Solutions, Inc. HomeVision PC 2.62, Welcome to HomeVision PC, Date: unknown; pp. 1-16.

Custom Solutions, Inc. HomeVision PC 2.62, Document Purpose, Date: unknown, pp. 1-24.

Custom Solutions, Inc. HomeVision PC 2.62, Summary of Changes-2.62, date: unknown, pp. 1-8.

Custom Solutions, Inc. HomeVision PC 2.62, Version History Overview, Date:unknown, pp. 1-6.

Custom Solutions, Inc., HomeVision-PC Description, available at http://web.archive.org/web/19981205094024/http://www.csi3.com/hv_pc.htm on Mar. 2, 2009, pp. 1-6.

Custom Solutions, Inc., HomeVision-PC Software, available at http://web.archive.org/web/19990224053817/http://www.csi3.com/hvp3pc.htm on Feb. 27, 2009, pp. 1-2.

\* cited by examiner

SYSTEM AND METHOD FOR TRANSMITTING POLLUTION INFORMATION OVER AN INTEGRATED WIRELESS NETWORK

CROSS REFERENCE TO RELATED APPLICATION & PRIORITY CLAIM

This application is a continuation of U.S. patent application Ser. No. 12/816,266, filed 15 Jun. 2010, now U.S. Pat. No. 8,171,136, entitled "System And Method For Transmitting Pollution Information Over An Integrated Wireless Network," which is a continuation of U.S. patent application Ser. No. 12/206,106, filed 8 Sep. 2008, now U.S. Pat. No. 7,739,378, which is a continuation of U.S. patent application Ser. No. 10/021,100, filed 30 Oct. 2001, now U.S. Pat. No. 7,424,527; all said patent applications are hereby incorporated by reference in their entireties as if fully set forth below.

TECHNICAL FIELD

The present invention generally relates to communicating pollution information and, in particular, to a system and method for generating and transmitting pollution information through an integrated wireless communication network.

BACKGROUND

Regulation of allowable pollution discharges into the environment from pollution sources are governed by federal, state and/or local laws. Generally, the least strict pollution criteria are defined by federal law. Federal agencies typically enforce various federal pollution laws by requiring timely reporting of pollution discharges and violations of criteria, by requiring clean-up of the pollution discharges, and by requiring termination of the discharges from the pollution sources. Furthermore, state laws, local laws and/or company policies may set stricter criteria at specific locations. Such pollution criteria define limits of pollution sources that may, or are, polluting air, water and/or soil. Pollution discharges can include materials, chemicals, or even noise.

Detectors are used to detect the presence of pollution. Such detectors, placed in suitable locations, provide information that may be used to detect a violation of an applicable pollution criteria and provide data to ascertain the extent of the discharge. Or, detectors may be used to demonstrate compliance with applicable pollution criteria (in that failure to detect pollution discharges implies that the pollution source is operating in compliance with applicable pollution discharge regulations).

A threshold is defined in a pollution detector such that when pollution is detected at a level at least equal to the threshold, the pollution detector generates a signal and/or data indicating that pollution levels are exceeding the threshold. Data may include, but is not limited to, the level of pollution, times of detection and/or type of pollution detected.

However, such pollution detectors are often monitored on a periodic basis. Thus, data provided by such pollution detectors would indicate a pollution discharge after the initial discharge event. If the discharge is ongoing, serious pollution criteria violations may occur. If the discharge is ongoing and not reported in a timely manner, even from a low rate discharge that would not otherwise cause a criteria violation had the discharge been detected and remedied in a timely manner, very serious pollution violations may result. Regulatory agencies may impose expensive fines, require expensive clean-up measures, may require monitoring and/or may shut down the polluting facility.

Pollution detectors may be located in difficult to access locations. For example, pollution detectors configured to monitor water conditions may be submerged. Or, pollution detectors configured to monitor ground water conditions may be located deep inside a well. Or, pollution detectors configured to monitor air pollution may be located on high structures or seasonally inaccessible locations such as mountain tops. Or, pollution detectors configured to monitor air pollution may be placed on mobile equipment such as large earth movers at an ore mine. Such difficult to access pollution detectors may result in the untimely reporting of discharges and/or may result in increased monitoring expenses.

Also, if the data from the pollution detectors are manually collected, the data collection process may be labor intensive and expensive. Furthermore, data entry may also be time consuming and expensive. Accordingly, many hours of data collection and entry time may be required for even a relatively simple pollution detection system.

Thus, a heretofore unaddressed need exists in the industry for providing a pollution information communication system that more timely indicates the nature, location and/or other pertinent information associated with a pollution discharge. Also, there is a heretofore unaddressed need to provide a less expensive to monitor and a more conveniently accessed pollution information communication system.

BRIEF SUMMARY OF EXEMPLARY EMBODIMENTS

Embodiments of the present invention overcomes the inadequacies and deficiencies of the prior art as discussed hereinabove. One embodiment of the present invention, a pollution message communication system, provides a system and method for communicating pollution information messages corresponding to detected pollution discharges and/or the presence of pollution by pollution detectors. The pollution message communication system employs a transceiver network with a plurality transceivers residing in a network. A plurality of transceivers are coupled to one of a plurality of pollution detectors each located at one of a plurality of locations. The transceivers each have unique identification codes. In one embodiment, transceivers broadcast and receive radio frequency (RF) signals. A site controller provides communications between the plurality of transceiver units and a pollution monitoring management controller residing in a pollution message system control center.

One embodiment of the present invention can also be viewed as providing a method for communicating pollution information messages. In this regard, the method can be broadly summarized by the following steps. Generating a pollution information message with a transceiver having at least an identification code uniquely assigned to the transceiver, and communicating the pollution information message from the transceiver to a network transceiver such that the pollution information message is communicated over an intermediate communication system to a pollution monitoring management controller.

Another embodiment of the present invention can be broadly summarized by the following steps. Receiving a pollution information message broadcasted from a transceiver having at least an identification code uniquely assigned to the transceiver, determining information relevant to the received pollution information message by associating the information with the identification code of the transceiver, and communicating the pollution information message and the relevant information, such as to a person.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF EXEMPLARY & ALTERNATIVE EMBODIMENTS

Overview of the Pollution Information Message System

In general, the present invention relates to a system and method for communicating pollution information messages that are transmitted from a transceiver, through a transceiver network, to a pollution monitoring management controller so that a discharge of pollution and/or the presence of pollution is detected and reported in a timely manner, as described in greater detail below. The pollution information message, in one embodiment, is generated in response to a detector that detects the presence of pollution.

Figure 1:
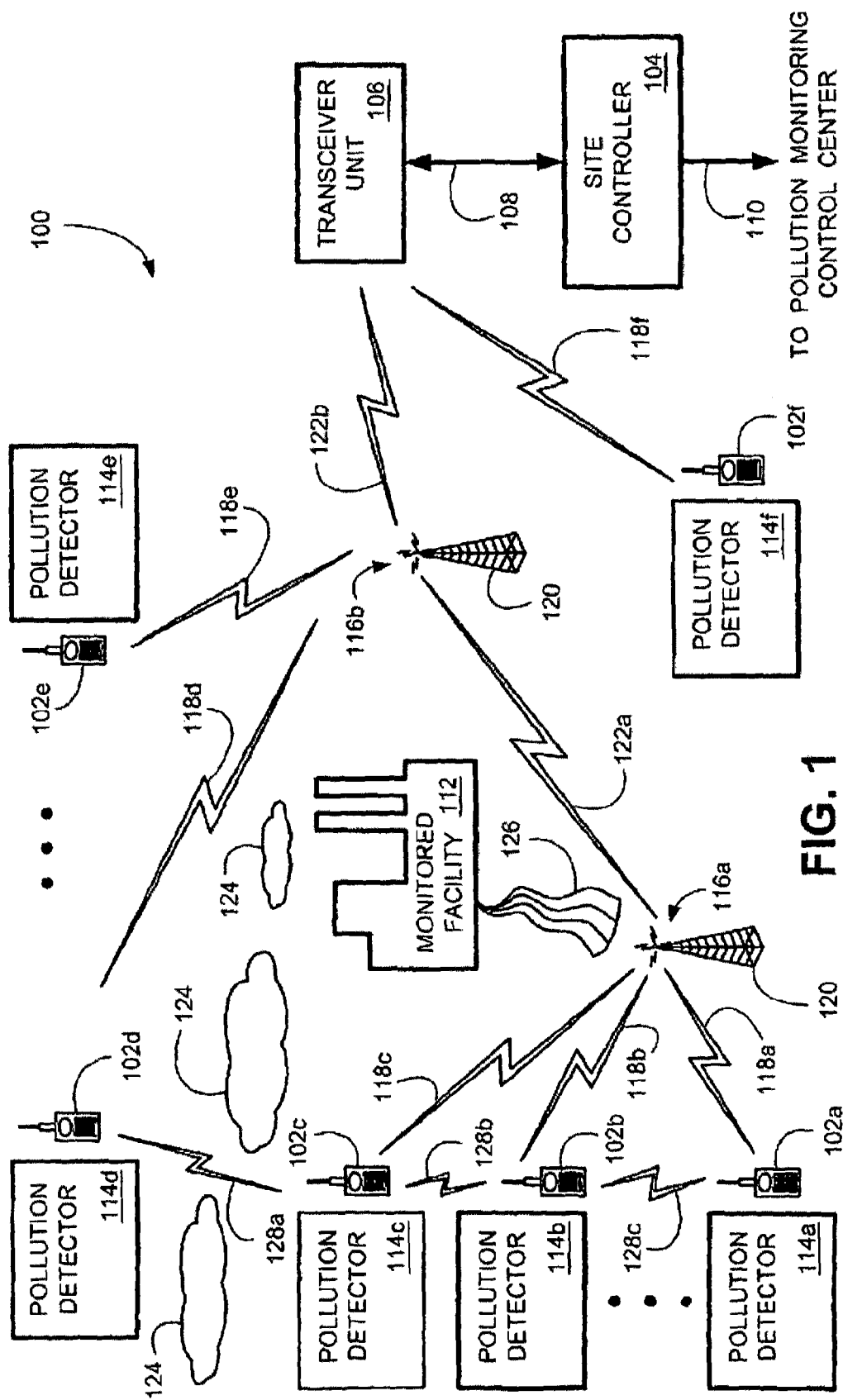
FIG. 1 is a block diagram illustrating a portion of a plurality of transceivers residing in a transceiver network configured to communicate pollution information.

FIG. 1 is a block diagram illustrating a portion of a transceiver network 100 having a plurality transceivers 102a-102f. Preferably, in one embodiment, transceivers 102a-102f are configured to selectively broadcast and/or receive pollution information messages using radio frequency (RF) signals. A site controller 104 provides communications between a transceiver unit 106, via connection 108, and a pollution monitoring management controller 302 residing in a pollution monitoring control center 300 (FIG. 3), via connection 110.

Figure 2:
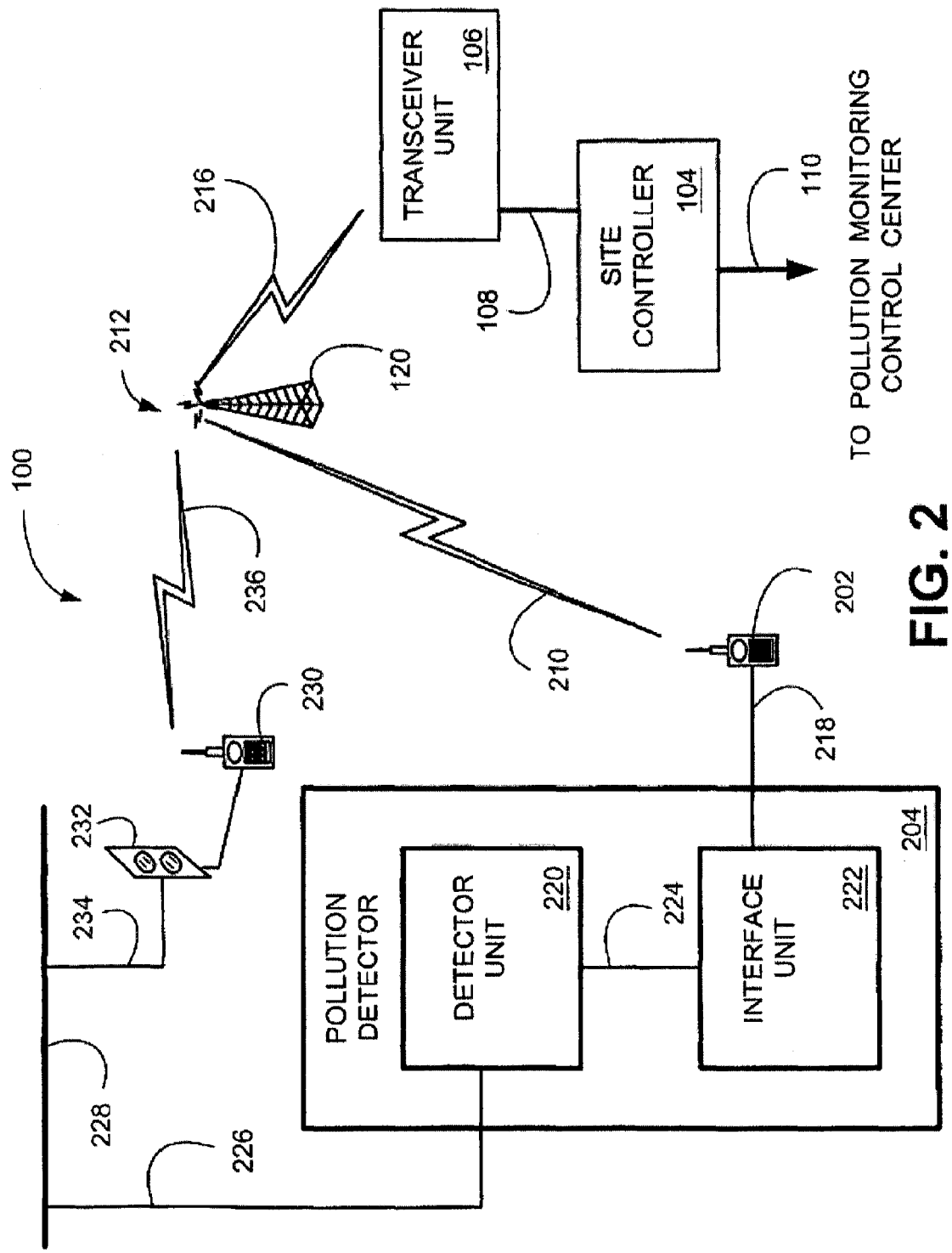
FIG. 2 is a block diagram illustrating an embodiment of a transceiver of FIG. 1 coupled to a pollution detection device.

FIG. 2 is a block diagram illustrating one embodiment of a pollution information communication system with a transceiver 202 coupled to a pollution detector 204. In one embodiment, if a pollution level exceeding a predefined threshold is detected, the pollution detector 204 generates a signal having pollution information, described in greater detail below, that is communicated to the transceiver 202. That is, when the presence of pollution is detected, thereby indicating a pollution discharge, the pollution detector begins communication with the transceiver 202.

In another embodiment, the pollution detector 204 is in continues communication with the transceiver 202 so that pollution information is provided on a real-time basis. Here, if no pollution is detected, or pollution levels are detected below a threshold, the information may demonstrate compliance with applicable pollution discharge regulations.

In one embodiment, in response to receiving a signal and/or data from the pollution detector 204, the transceiver 202 transmits a pollution information message via an RF signal 210 that is detected by transmitter station 212. Transmitter station 212, located on a suitable high point, such as a tower 120 (see also FIG. 1) or the like, transmits an RF signal 216 to the transceiver unit 106. The transceiver unit 106 communicates the pollution information message to the site controller 104. Eventually, the pollution information message is received by the pollution monitoring control center 300 (FIG. 3), in a manner described in greater detail below.

Figure 3:
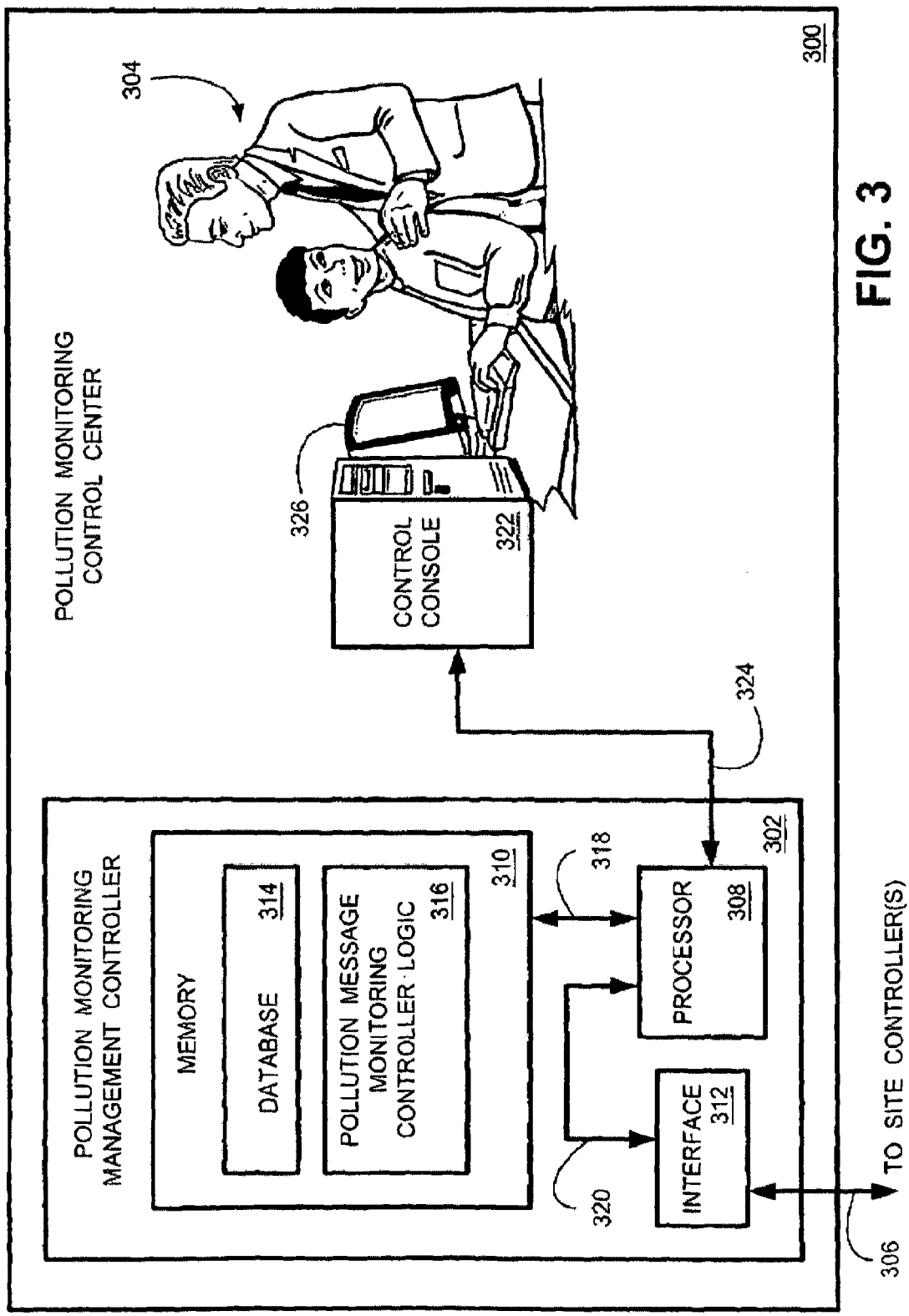
FIG. 3 is a block diagram illustrating selected components of an embodiment of a pollution monitoring control center in communication with the transceiver network of FIG. 1.

FIG. 3 is a block diagram illustrating selected components of a pollution monitoring control center 300 in communication with the transceiver network 100 (FIG. 1). The received pollution information messages are received by a pollution monitoring management controller 302, described in greater detail below. In one embodiment, the control room operators 304 receive a processed pollution information message from the pollution monitoring management controller 302 and initiate appropriate actions in response to the received pollution information message. In another embodiment, the pollution information is communicated to an automatic system.

Pollution Information Message Transceiver System Environment

FIG. 1 is a block diagram illustrating a portion of a transceiver network 100 in communication with a plurality of transceivers 102a-102f residing in proximity to a monitored facility 112. At least one transceiver is coupled to each one of the pollution detectors 114a-114f, as will be described in greater detail below.

For convenience of illustration, and for convenience of explaining the operation and functionality of the pollution information message system, only a single monitored facility 112 is illustrated on FIG. 1. A monitored facility 112 may be a factory, a business or other location where a plurality of pollution detectors 114a-114f are located. Furthermore, the term "monitored facility" as used herein may also be any location where pollution detectors are located to detect the presence of pollution. For example, but not limited to, the pollution detectors may be located in proximity to a lake, reservoir, mountain, canyon or other location of interest.

A pollution information message system is configured to receive pollution information messages, in a manner described below, from hundreds, even thousands, of transceivers, depending upon the particular architecture in which the pollution information message system is implemented. Therefore, the explanation of the operation and functionality of the pollution information message system described below is limited to a small segment of the transceiver network 100 for convenience.

A pollution information message transmitted from any one of the transceivers 102a-102f is relayed to the pollution monitoring management controller 302 (FIG. 3) via one or more of the transceiver stations 116a and 116b. Preferably, in one embodiment, the transceivers broadcast the pollution information message using a suitable radio frequency (RF) signal. The pollution information message includes at least the identification code of the transceiver generating the pollution information message.

For example, transceivers 102a, 102b and 102c are illustrated as transmitting pollution information messages to transceiver station 116a via RF signals 118a, 118b and 118c, respectively. Similarly, transceivers 102d and 102e broadcast pollution information messages to transceiver station 116b via RF signals 118*d* and 118*e*, respectively. Thus, pollution detectors 114*c* and/or 114*d* may detect a presence of air pollution emissions 124 from the monitored facility 112. Accordingly, transceivers 102*c* and 102*d*, respectively, would then communicate pollution information messages to their respective receiving transceiver stations 116*a* and 116*b*.

A transceiver (not shown) in transceiver station 116*a* is illustrated as communicating a pollution information message to transceiver station 116*b* via signal 122*a*. The transceivers 102*a*-102*e*, and/or transceivers residing in the transceiver stations, may be identical to each other or may be configured to have different characteristics, such as different bandwidths, frequencies and/or signal broadcast strengths.

Each of the transceiver stations 116*a* and 116*b* detect broadcasted pollution information messages from a broadcasting transceiver 102*a*-102*e*, depending upon the strength of the broadcasted pollution information message and the distance of the transceiver stations 116*a* and 116*b* from the broadcasting transceiver. That is, a transceiver stations 116*a* and 116*b* detect broadcasted pollution information messages from any transceivers and/or any transceiver stations in its reception range. Preferably, transceiver stations 116*a* and 116*b* reside at a suitably elevated location, such as on a tower 120, high building, mountain top or the like to facilitate reception and transmission of pollution information messages. Pollution information messages from the transceivers 102*a*-102*e* are relayed by the transceiver stations 116*a* and 116*b* to the transceiver unit 106 via RF signals 122*a*-122*b*. Each transceiver station has a transceiver (network transceiver) configured to communicate pollution information messages with the transceivers 102*a*-102*e*, transceiver stations, and/or at least one transceiver unit 106.

In one embodiment, transceivers are configured to communicate directly with transceiver unit 106, assuming the broadcasting transceivers are within broadcasting range of the transceiver unit 106. For example, pollution detector 114*f* may detect a fluid discharge 126 from the monitored facility 122. Accordingly, transceiver 102*f* would broadcast a pollution information message, via signal 118*f*, directly to the transceiver unit 106.

The transceivers residing in the transceiver station may be the same as one of the transceivers 102*a*-102*f*, or be configured to have different characteristics such as different bandwidths, frequencies and/or signal broadcast strengths. In some applications, a unique identification code associated with the broadcasting transceiver station is added to the pollution information message.

For example, a pollution information message detected by the transceiver station 116*a* is relayed to the transceiver station 116*b* via RF signal 122*a*. The pollution information message is then relayed by the transceiver station 116*b* to the transceiver unit 106 via RF signal 122*b*. Similarly, a pollution information message detected by the transceiver station 116*b* is relayed to the transceiver unit 106 via RF signal 122*b*.

One embodiment of the pollution information message system employs transceivers that use standardized digital communication formats such that the information is communicated as packetized units of digital data. Other embodiments employ other suitable communication formats. Other suitable communication formats may be either digital or analog signals.

The transceiver unit 106 converts received pollution information messages into a suitable communication signal formatted for communication over a hardware connection 108. In one embodiment, the transceiver unit 106 formats the received broadcasted RF pollution information messages into a standardized RS 232 signal. Another embodiment converts the received pollution information messages into a standardized RS 485 signal. The transceiver unit 106 may be configured to convert the received pollution information messages from the transceivers 102*a*-102*f* and/or transceiver stations 116*a* and 116*b* of the transceiver network 100 into any suitable signal for transmission over a hardwire interconnection, such as, but not limited to, a metallic conductor, a coaxial cable, an optical fiber cable or the like. In some applications, a unique identification code associated with the transceiver unit 106 is added to the pollution information message.

When transceivers (not shown) at other monitored facilities (not shown) are integrated into the transceiver network 100, a large network of transceivers will be able to communicate pollution information messages to the pollution monitoring management controller 302. For convenience of illustration, only one monitored facility 112 is illustrated in FIG. 1. Many other monitored facilities and/or locations may be incorporated into the transceiver network 100 such that all of the transceivers are communicating to the pollution monitoring management controller 302 via the transceiver network 100.

A portion of the transceiver network 100 illustrated in FIG. 1 is configured according to the strength of the broadcasted RF signals 118*a*-118*f* from the plurality of transceivers 102*a*-102*f*, and the strength of the broadcasted signals 122*a* and 122*b* from the plurality of transceiver stations 116*a* and 116*b*. Thus, many more transceiver units coupled to pollution monitors may be located out in a monitored area. Additional transceiver stations are deployed as necessary.

Site controller 104 is configured to communicate with any desired number of transceiver units. Furthermore, a plurality of site controllers can be deployed within a monitored area, thereby increasing the area of coverage of the transceiver network 100. There are no known limitations that would limit the number of transceivers in communication with the pollution monitoring control center 300 (FIG. 3) when a suitable number of transceiver units and site controllers are implemented with a plurality of transceivers to form a transceiver network 100.

Site controller 104, in another embodiment, is configured to include other functionalities. Such functionalities may be implemented in a site controller without departing substantially from the operation and functionality of the invention. For example, a site controller 104 may be configured to transmit acknowledgment signals back to the transceiver initiating the pollution information message or another designated transceiver. Such an embodiment is particularly advantageous in indicating that a pollution information message has been received from a location of interest. In some applications, a unique identification code associated with the site controller 104 is added to the pollution information message.

Furthermore, for convenience of illustration, the site controller 104 and the transceiver unit 106 are illustrated as separate components coupled together via connection 108. In another embodiment, the transceiver unit 106 and the site controller 104 are incorporated into a single unit that performs substantially the same functionality of the transceiver unit 106 and the site controller 104. Alternatively, the transceiver unit 106 and site controller 104 may be conveniently included in the same housing. Such an alternative embodiment is particularly advantageous when it is desirable to centrally locate components to provide easy access and/or when it is desirable to enclose the devices in a single environmentally protective enclosure.

Each one of the transceivers, transceiver stations and transceiver units, have a unique identification code, such as a unique alpha-numeric identification code, a hexa-decimal code, or a like identification code. For example, transceiver 102b may have the unique identification code "102b". When a pollution information message is relayed by the transceiver 102b to the pollution monitoring management controller 302 (FIG. 3), the pollution information message is tagged or otherwise identified with the unique identity code "102b". Thus, the pollution monitoring management controller 302 knows where the transceiver 102b is located since location information for the transceiver 102b is retained in a database 314 (FIG. 3), described in greater detail below. To determine the location of the transceiver generating a pollution information message, the pollution monitoring management controller 302 need only associate the location information in the database 314 with the unique identification code of the transceiver since the pollution information message contains the identification code of the transceiver. Also, in one embodiment, the nature of the pollution information can be determined if the type of pollution monitor coupled to the transceiver 102b is described in the database 314.

Furthermore, the pollution monitoring management controller 302 may specifically poll the transceiver 102b to provide information by broadcasting a signal, using the unique identification code "102b", such that the transceiver 102b recognizes that it is instructed to broadcast the status information back to the pollution monitoring management controller 302. The pollution information message management controller 302, via site controller 104, instructs transceiver 106 to broadcast an information request signal to the transceiver 102b. Thus, transceiver unit 106 broadcasts an information request signal to transceiver station 116b. Transceiver station 116b broadcasts the information request signal to transceiver station 116a, which then broadcasts the information request signal to the transceiver 102b. Status information may include information of interest such as, but not limited to, the operational condition of the transceiver, the pollution detector, and/or their components. Furthermore, status information may include information regarding pollution detected by the pollution detector, such as but not limited to, current levels of detected pollution, type of detected pollution, nature of the detected pollution or other measured pollution related parameters. Such an embodiment is particularly advantageous in providing pollution information at desired intervals to, for example, but not limited to, form databases to perform scientific studies and/or to demonstrate compliance with relevant pollution regulations.

Similarly, the pollution monitoring management controller 302 is in communication with all of the individual transceivers of FIG. 1 such that a pollution information message is associated with specific transceivers. Furthermore, the pollution monitoring management controller 302 may request information from any desired transceiver integrated into the transceiver network 100.

For convenience of illustration, and for convenience of describing the operation and functionality of transceiver 202, the transceiver 202 is illustrated as coupled to a simplified pollution detector 204, via connection 218. Pollution detector 204 includes at least a detector unit 220 and interface unit 222. Detector unit 220 is configured to detect the presence of pollution. Such a detector unit 220, in one embodiment, is configured to detect particular types of pollution and/or to detect the level, quantity, magnitude or the like of the pollution.

For example, such a pollution detector unit 220 may be configured to detect nitrogen oxide (NOX) pollution in the air from a nearby power plant. Another embodiment of the detector unit 220 is configured to generate signals indicating detection of the specified pollutants when the level of the pollutant exceeds a predefined threshold. Other known pollution detectors known in the art of detecting pollution may be similarly coupled to a transceiver for integration into a pollution information message system. Detailed operations of these pollution detectors, and the associated components residing in the pollution detectors, are not described in detail herein other than to the extent necessary to understand the operation and functioning of these detectors when employed as part of a pollution information message system. Accordingly, any such pollution detector, when integrated into a pollution information message system, is intended to be disclosed herein and to be protected by the accompanying claims.

Pollution detector 204 includes an interface unit 222 coupled to the detector unit 220, via connection 224, and coupled to transceiver 202, via connection 218. Interface unit 222 receives pollution information from the detector unit 220 and processes the received information into a signal suitable for the transceiver 202. Thus, the detector unit 220 detects the presence of pollutants and the interface unit 222 configures the information from the detector unit 220 into a signal suitable for the transceiver 202. Then, the pollution information message is generated and transmitted by the transceiver 202. The interface unit 222 may be implemented using any suitable known interface device configured to receive information from a pollution detector and configured to generate a signal suitable for a transceiver employed in a pollution information message system. Other embodiments of the interface unit 222 may be specially fabricated and specially designed interface units manufactured specifically for integration into a pollution information message system. Detailed operation of the interface unit 222, and the associated components residing in the interface unit 222, is not described in detail herein other than to the extent necessary to understand the operation and functioning of the interface unit 222 and its components when employed as part of a pollution information message system. Accordingly, any such interface unit 222 is intended to be disclosed herein and to be protected by the accompanying claims.

Integrating the Pollution Information Message Transceiver System into a Pollution Information Message System Control Center FIG. 3 is a block diagram illustrating selected components of one embodiment of a pollution monitoring control center 300 in communication with the transceiver network 100. Included as an integral component of the pollution information message system is the pollution monitoring management controller 302. The pollution monitoring management controller 302 is coupled to at least one of the previously described site controllers 104 via connection 306. Connection 306 is coupled to connection 110 (FIGS. 1 and 2) through an intermediary communication system, described in greater detail below.

The pollution monitoring management controller 302 includes at least a processor 308, a memory 310 and an interface 312. Memory 310 includes at least a database 314 and the pollution message monitoring controller logic 316. Processor 308 is coupled to the memory 310 via connection 318 and is coupled to the interface 312 via connection 320.

When one of the plurality of transceivers residing in the transceiver network 100 transmits a pollution information message, the pollution monitoring management controller 302 receives the pollution information message and stores the received pollution information message into database 314 or in another suitable location in a memory. Processor 308 executes the pollution message monitoring controller logic 316 to appropriately store the received pollution information message into the database 314 or in another suitable location in a memory. In one embodiment, database 314 employs a look-up table.

The database 314 includes information of interest such as, but not limited to, the identification code of each the transceivers, the location of the transceiver, and the nature of the pollution information message. The nature of the pollution information message in some applications is determined by the type of pollution detection to which the transceiver is coupled to. For example, if the transceiver is coupled to a pollution detector configured to detect chemical "abc," the database 314 would include information indicating that a pollution detector is coupled to the transceiver such that a pollution information message received from that transceiver would indicate the possible presence of a chemical "abc" detected by the pollution detector.

Other information of interest may also be included in the database 314. For example, but not limited to, information identifying the specific customer, customer's address and/or attributes of the customer's facility may be included within database 314. Also, individuals that should be contacted when a pollution information message is received may also be included in the database 314. The nature of the pollution detector that is monitored by the transceiver may also be included within the database 314. Such information pertaining to the nature of the detector includes, but is not limited to, make, model, manufacturer, manufacture date and/or components. Accordingly, any type of information of interest may be included within the database 314. Furthermore, information regarding attributes of the transceivers, the transceiver stations, the transceiver units and the site controllers, such as, but not limited to, make, model, manufacturer, manufacture date, components, identification codes and/or locations, may be included in database 314.

The pollution monitoring management controller 302 is illustrated as being coupled to the control console 322, via connection 324. Typically, the control room operators 304 interface with the various components residing in the pollution monitoring control center 300 via one or more control consoles 322. Information is displayed on a suitable interface device, such as a display screen 326. Thus, a control room operator 304, after determining a valid pollution information message is received, may take appropriate actions.

In another embodiment, the pollution monitoring management controller 302 is coupled to an automatic system, such as but not limited to, a system control and data acquisition (SCADA) system. Such an embodiment is advantageous in automatically monitoring and controlling a facility. For example, but not limited to, pollution may be monitored such that a value or gate in a piping system is operated upon detection of pollution.

Figure 4:
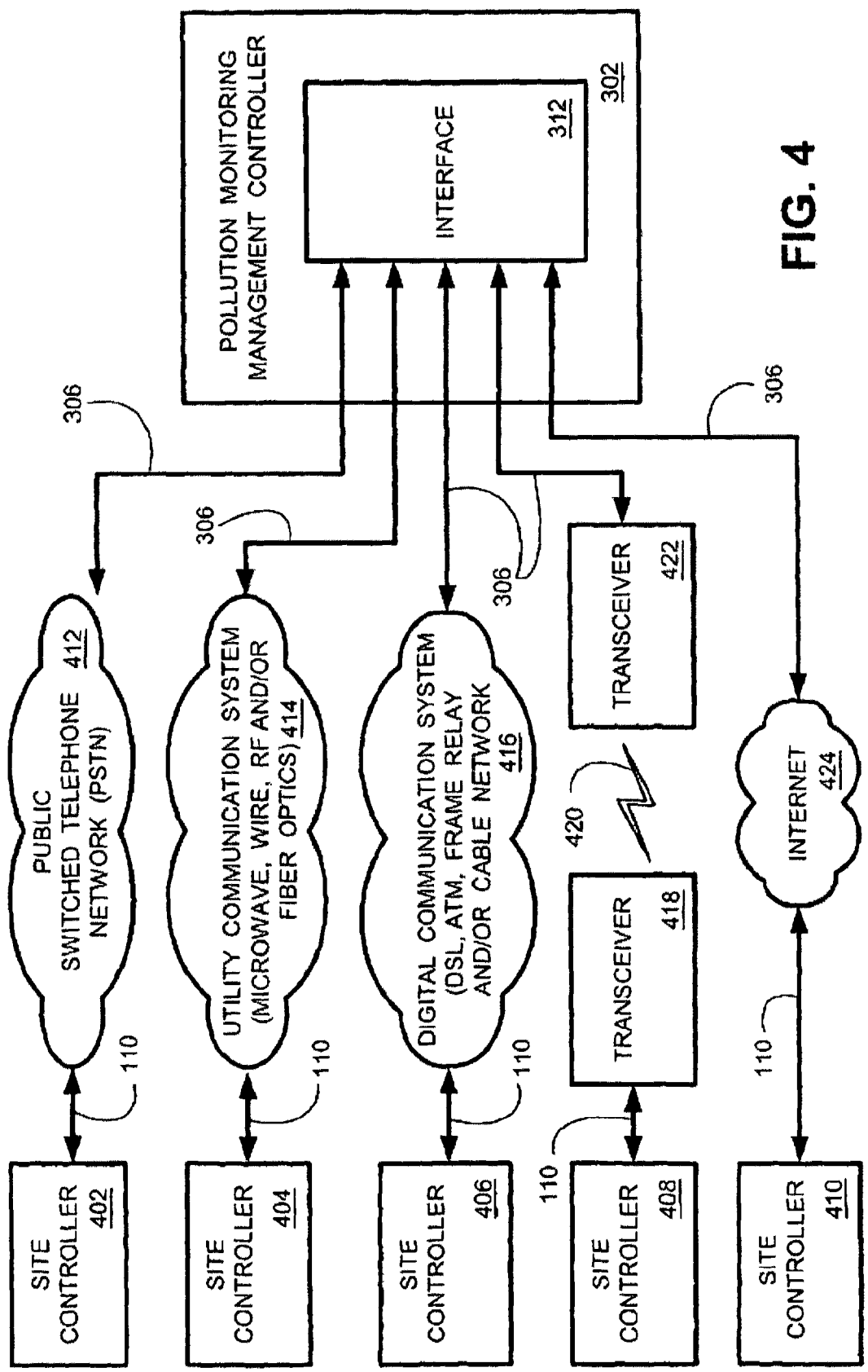
FIG. 4 is a block diagram illustrating alternative intermediate communication systems employed by the pollution information communication system of FIGS. 1-3.

Communication Between Site Controllers and the Pollution Monitoring Management Controller As described above with reference to FIGS. 1-3, a site controller 104 (FIGS. 1 and 2) is in communication with the interface 312 residing in the pollution monitoring management controller 302 (FIGS. 3 and 4). FIG. 4 is a block diagram illustrating alternative intermediate communication systems employed by the pollution information message system. Five exemplary site controllers 402, 404, 406, 408 and 410 are illustrated as being coupled to the interface 312 residing in the pollution monitoring management controller 302, via five communication systems. These exemplary intermediate communication systems are intended to illustrate some, but not all, of the possible communication systems through which the connections 110 (FIGS. 1-2) and 306 (FIG. 3) may coupled to such that the pollution information message system enables communication between the site controllers and the pollution monitoring management controller 302.

Site controller 402 is communicating to interface 312 via a public switched telephone network (PSTN) 412, via connections 110 and 306. Thus, site controller 402 is configured to provide a suitable signal having pollution information that is provided to the PSTN 412. PSTN 412 receives the suitably configured pollution information from the site controller 402 and relays the information to the interface 312. Interface 312 converts the received pollution information from the PSTN 412 and reformats the pollution information into a suitable communication signal that is provided to processor 308 (FIG. 3) such that the pollution information is stored in the database 314 (FIG. 3) in a manner described above.

In one embodiment, when the pollution monitoring management controller 302 issues an acknowledgment signal, the interface 312 converts the acknowledgment signal into a suitable signal formatted for communication over the PSTN 412. The suitably formatted acknowledgment signal is then communicated through the PSTN 412 and is transmitted to the site controller 402 via connections 306 and 110. The site controller 402 then converts the received acknowledgment signal from the PSTN 412 into a suitably formatted signal for transmission out to the selected transceiver(s) as described above.

The components (not shown) residing in the interface 312 and the site controller 402 that are configured to transmit, receive and convert signals from the PSTN 412 are known in the art and, therefore, are not described in detail herein other than to the extent necessary to understand the operation and functioning of these components when employed as part of the interface 312 and the site controller 402. Such known components are too numerous to describe in detail herein, and that any configuration of such known components having the above-described functionality may be implemented in the interface 312 and the site controller 402 without departing substantially from the pollution information message system. Any such implementation of components configured to receive and convert communication signals from PSTN 412 are intended to be within the scope of this disclosure and to be protected by the accompanying claims.

Site controller 404 is communicating to interface 312 via a legacy utility communication system 414, via connections 110 and 306. Thus, site controller 404 is configured to provide a suitable signal having pollution information that is provided to the legacy utility communication system 414. The legacy utility communication system 414 is a known communication system employed by the electric utility or other responsible organization for the monitoring and/or control of an electric energy distribution system or transmission system.

The legacy utility communication system 414 is an integrated network of communication technologies that may include, but is not limited to, microwave communication systems, wire based communication systems, RF communications or fiber optics networks. Furthermore, these various communication systems are integrated into a composite communication system. Thus site controller 404 is configured to interface at convenient location on the legacy utility communication system 414 such that the site controller 404 provides the appropriately formatted information to the legacy utility communication system.

For example, site controller 404 may integrate into an existing fiber optics portion of the legacy utility communication system 414. In one embodiment, site controller 404 is configured to interface with a suitably configured fiber optics connector to provide interconnectivity directly to the fiber optics networks, or alternatively, is configured to communicate with various communication components that are associated with the communication of optical signals over the fiber optics network. Another embodiment of site controller 404 is configured to communicate with the microwave portions, the wire portions, or the RF portions of the legacy utility communication system 414.

The legacy utility communication system 414 receives the suitably configured pollution information from the site controller 410 and relays the information to the interface 312. Interface 312 converts the received pollution information from the legacy utility communication system 414 and reformats the pollution information into a suitable communication signal that is provided to processor 308 (FIG. 3) such that the pollution information is stored in the data base 314 (FIG. 3) in a manner described above.

In one embodiment, when the pollution monitoring management controller 302 issues an acknowledgment signal, the interface 312 converts the acknowledgment signal into a suitable signal formatted for communication over the legacy utility communication system 414. The suitably formatted acknowledgment signal is then communicated through the legacy utility communication system 414 and is transmitted to the site controller 404, via connections 306 and 110. The site controller 404 then converts the received acknowledgment signal from the legacy utility communication system 414 into a suitably formatted signal for transmission out to the selected transceiver(s) as described above.

The components (not shown) residing in the interface 312 and the site controller 404 that are configured to transmit, receive and convert signals from the legacy utility communication system 414 are known in the art and, therefore, are not described in detail herein other than to the extent necessary to understand the operation and functioning of these components when employed as part of the interface 312 and the site controller 404. Such known components are too numerous to describe in detail herein and that any configuration of such known components having the above-described functionality may be implemented in the interface 312 and the site controller 404 without departing substantially from the pollution information message system. Any such implementation of the components configured to receive and convert communication signals from the legacy utility communication system 414 are intended to be within the scope of this disclosure and to be protected by the accompanying claims.

Site controller 406 is communicating to interface 312 via a digital communication system 416, via connections 110 and 306. Thus, site controller 406 is configured to provide a suitable signal having pollution information that is provided to the digital communication system 416. The digital communication system 416 is a based communication system configured to communication information in a digital format. Non-limiting examples of such digitally based communications systems include digital subscriber loops (DSL), X.25, Internet protocol, (IP), Ethernet, Integrated services digital network (ISDN) and asynchronous transfer mode (ATM). Such digital communication systems may employ a PSTN, a frame relay based network and/or cable network. Furthermore, such digital communication systems may employ combinations of the above-described systems having a plurality of segments employing different technologies on each segment.

The digital communication system 416 receives the suitably configured pollution information from the site controller 406 and relays the information to the interface 312. Interface 312 converts the received pollution information from the digital communication system 416 and reformats the pollution information into a suitable communication signal that is provided to processor 308 (FIG. 3) such that the pollution information is stored in the data base 314 (FIG. 3) in a manner described above.

In one embodiment, when the pollution monitoring management controller 302 issues an acknowledgment signal, the interface 312 converts the acknowledgment signal into a suitable signal formatted for communication over the digital communication system 416. The suitably formatted acknowledgment signal is then communicated through the digital communication system 416 and is transmitted to the site controller 406, via connections 306 and 110. The site controller 406 then converts the received acknowledgment signal from the digital communication system 416 into a suitably formatted signal for transmission out to the selected transceiver(s) as described above.

The components (not shown) residing in the interface 312 and site controller 406 that are configured to received and convert signals from the digital communication system 416 are known in the art and, therefore, are not described in detail herein other than to the extent necessary to understand the operation and functioning of these components when employed as part of the interface 312 and the site controller 406. Such well known components are too numerous to describe in detail herein, and that any configuration of such known components having the above-described functionality may be implemented in the interface 312 and the site controller 406 without departing substantially from the pollution information message system. Any such implementation of the components configured to receive and convert communication signals from the digital communication system are intended to be within the scope of this disclosure and to be protected by the accompanying claims.

Site controller 408 is communicating to interface 312 via a radio frequency (RF) communication system having at least a first transceiver 418 configured to broadcast RF signals 420 to transceiver 422. An alternative embodiment employs other mediums of broadcast signals, such as, but not limited to, microwave. Thus, site controller 408 is configured to provide a suitable signal having pollution information that is provided to the transceiver 418. The transceiver 418 receives the suitably configured pollution information from the site controller 408 and relays the information to transceiver 422. The transceiver 422 relays the information to the interface 312. Interface 312 converts the received pollution information from the transceiver 422 and reformats the pollution information into a suitable communication signal that is provided to processor 308 (FIG. 3) such that the pollution information is stored in the data base 314 in a manner described above.

In one embodiment, when the pollution monitoring management controller 302 issues an acknowledgment signal, the interface 312 converts the acknowledgment signal into a suitable signal formatted for communication between transceivers 422 and 418. The suitably formatted acknowledgment signal is then communicated through the transceivers 422 and 418 and is transmitted to the site controller 408 via connections 306 and 110. The site controller 408 then converts the received acknowledgment signal from the transceivers 422 and 418 into a suitably formatted signal for transmission out to the selected transceiver(s) as described above.

The components (not shown) residing in the interface 312 and the site controller 408 that are configured to transmit, receive and convert signals from the transceivers 418 and 422 are known in the art and, therefore, are not described in detail herein other than to the extent necessary to understand the operation and functioning of these components when employed as part of the interface 312 and the site controller 408. Such known components are too numerous to describe in detail herein, and that any configuration of such known components having the above-described functionality may be implemented in the interface 312 and the site controller 408 without departing substantially from the pollution information message system. Any such implementation of the components configured to receive and convert communication signals from the transceivers 418 and 422 are intended to be within the scope of this disclosure and to be protected by the accompanying claims.

Site controller 410 is communicating to interface 312 via an Internet system 424, via connections 110 and 306. Thus, site controller 410 is configured to provide a suitable signal having pollution information that is provided to the Internet system 424. Internet system 424 receives the suitably configured pollution information from the site controller 410 and relays the information to the interface 312. Interface 312 converts the received pollution information from the Internet system 424 and reformats the pollution information into a suitable communication signal that is provided to processor 308 (FIG. 3) such that the pollution information is stored in the database 314 (FIG. 3) in a manner described above.

In one embodiment, when the pollution monitoring management controller 302 issues an acknowledgment signal, the interface 312 converts the acknowledgment signal into a suitable signal formatted for communication over the Internet system 424. The suitably formatted acknowledgment signal is then communicated through the Internet system 424 and is transmitted to the site controller 410 via connections 306 and 110. The site controller 410 then converts the received acknowledgment signal from the Internet system 424 into a suitably formatted signal for transmission out to the selected transceiver(s) as described above.

The components (not shown) residing in the interface 312 and the site controller 410 that are configured to transmit, receive and convert signals from the Internet system 424 are known in the art and, therefore, are not described in detail herein other than to the extent necessary to understand the operation and functioning of those components when employed as part of the interface 312 and the site controller 410. Such well known components are too numerous to describe in detail herein, and that any configuration of such known components having the above-described functionality may be implemented in the interface 312 and the site controller 410 without departing substantially from the pollution information message system. Any such implementation of components configured to receive and convert communication signals from the Internet system 424 are intended to be within the scope of this disclosure and to be protected by the accompanying claims.

Other embodiments of the site controllers and the interface 312 are configured to communicate with other communication networks or combination networks having a plurality of segments employing different communication technologies on each segment. For example, a site controller and a interface could be configured to communicate over satellite based communication systems. Another example includes a combination system that employs the PSTN 408 and the Internet system 412. Such a combination system would include an interface device to interface the PSTN 408 with the Internet system 412. There are no intended limitations with respect to the interfacing communication technology through which a site controller and an interface 312 (FIG. 3) communicate. Any such implementation of a site controller and an interface 312 configured to communicate through another communication technology in accordance with the operation and functionality of the pollution information message system described herein is intended to be within the scope of this disclosure and to be protected by the accompanying claims.

One embodiment of the site controller and/or interface 312 employs a plurality of standardized components, and is configured to receive an interface card. The interface card is configured to provide connectivity to the communication system that is used by the pollution information message system to communicate over. Such an embodiment is particularly suited to implementing a mass produced pollution information message system.

Operation of the Pollution Monitoring Management Controller

Figure 5:
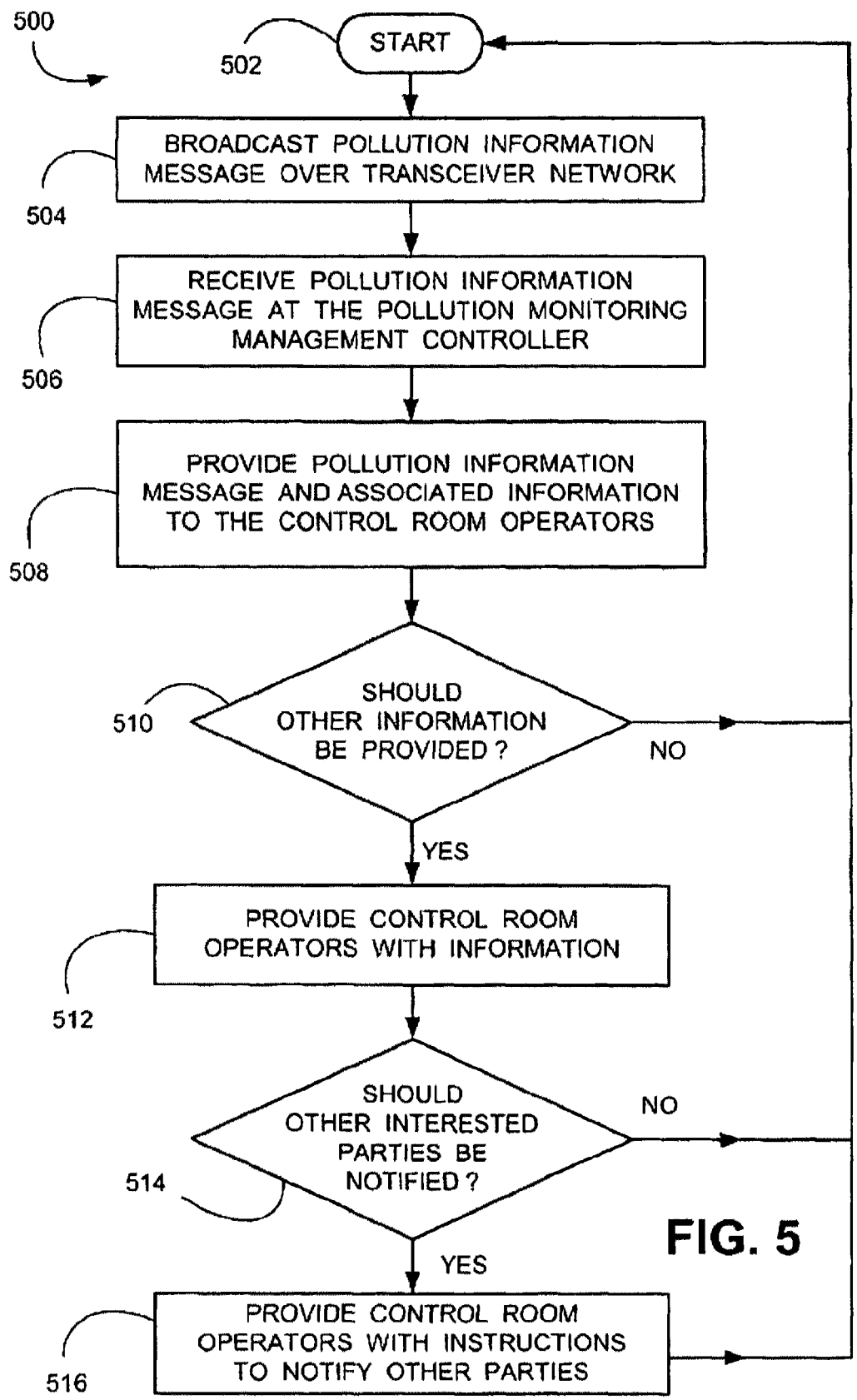
FIG. 5 is a flow chart illustrating a process for communicating a pollution information message generated by one of the transceivers of FIGS. 1-2.

FIG. 5 is a flow chart 500 illustrating a process for communicating a pollution information message generated by one of the transceivers of FIGS. 1-2. The flow chart 500 shows the architecture, functionality, and operation of a possible implementation of the software associated with the pollution message monitoring controller logic 316 (FIG. 3). In this regard, each block may represent a module, segment, or portion of code, which comprises one or more executable instructions for implementing the specified logical function(s). It should also be noted that in some alternative implementations, the functions noted in the blocks may occur out of the order noted in FIG. 5, or may include additional functions, without departing significantly from the functionality of the process of the pollution monitoring management controller. For example, two blocks shown in succession in FIG. 5 may in fact be executed substantially concurrently, the blocks may sometimes be executed in the reverse order, or some of the blocks may not be executed in all instances, depending upon the functionality involved, as will be further clarified herein below. All such modifications and variations are intended to be included herein within the scope of this disclosure and to be protected by the accompanying claims.

When the pollution message monitoring controller logic 316 is implemented as software and stored in memory 310 (FIG. 3), the pollution message monitoring controller logic 316 can be stored on any computer readable medium for use by or in connection with any computer and/or processor related system or method. In the context of this document, a memory 310 is a computer readable medium that is an electronic, magnetic, optical, or other another physical device or means that contains or stores a computer and/or processor program. The pollution message monitoring controller logic 316 can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with the pollution message monitoring controller logic 316. In the context of this specification, a "computer readable medium" can be any means that can store, communicate, propagate, or transport the program associated with the pollution message monitoring controller logic 316 for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with the pollution message monitoring controller logic 316 is printed, as the program can be electronically captured, via for instance optical scanning of the paper or other medium, then compiled, interpreted or otherwise processed in a suitable manner if necessary, and then stored in memory 310 or in another suitable memory.

The process starts at block 502 when the presence of pollution is detected by a pollution detector, as described above. At block 504, a transceiver is actuated in response to receiving a signal from the pollution detector such that a pollution information message is broadcasted over the transceiver network 100 (FIG. 1). At block 506, the pollution information message is received at the pollution monitoring management controller 302 (FIG. 3) in a manner described above. At block 508, the pollution monitoring management controller 302 executes the pollution message monitoring controller logic 316. Accordingly, in one embodiment, a suitably formatted pollution information message is provided to the control room operators 304 (FIG. 3).

At block 510, a determination is made whether or not other information should be provided. If no other information is provided at block 510 (the NO condition), the process returns to block 502. If other information should be provided to the control room operators 304 (the YES condition), the other information is provided to the control room operators 304 at block 512. As described above, such information may include, but is not limited to, the identification code of each the transceivers, the location of the transceiver, and the nature of the detected pollution.

At block 514, a determination is made whether or not other interested parties should be notified. If no other interested parties are to be notified at block 510 (the NO condition), the process returns to block 502. If other information should be provided to the control room operators 304 (the YES condition), the other information is provided to the control room operators 304 at block 516. For example, the pollution message monitoring controller logic 316 may determine that a company representative associated with a monitored facility, government regulatory authorities, or other individual(s) identified in the database 314 should be notified of the received >pollution information message. The process then returns to block 502 to await the next pollution event.

Transceiver Maintenance Feature

One embodiment described above employs transceivers configured to transmit pollution information messages back to the pollution monitoring management controller 302 (FIG. 3). Each transceiver includes its unique identification code as part of the broadcasted pollution information message. Location information for each transceiver, identified in database 314 (FIG. 3), is determined by associating the identification code in the received pollution information message with the corresponding location information (identified by the corresponding identification code). Transceivers transmitting information back to the pollution monitoring management controller 302, in one embodiment, are configured to include logic that indicates the operational status of the pollution detecting device and/or its associated components back to the pollution monitoring management controller 302. The pollution message monitoring controller logic 316 (FIG. 3) includes a transceiver maintenance function that evaluates received status and information from the signals transmitted by the transceivers such that the operational integrity of the pollution detector is accessed. That is, if a component in the pollution detector fails, the status information indicates failure of that component. The pollution message monitoring controller logic 316 provides the appropriate indication to the control room operators 304 such that maintenance personnel are dispatched out to the pollution detecting device and/or the transceiver to effect a repair of the nonfunctioning or improperly functioning component.

One embodiment employing the above-described maintenance feature employs transceivers configured to periodically transmit status information to the pollution monitoring management controller 302 at predefined time intervals. Another embodiment employs transceivers configured to respond to a status information request generated by the pollution monitoring management controller 302. Here, logic residing in the pollution message monitoring controller logic 316 would perform a maintenance function wherein pre-selected transceivers are requested to provide status information. Another embodiment employs transceivers configured to generate periodic status reports to the pollution monitoring management controller 302 and are configured to respond to requests for status information from the pollution monitoring management controller 302. In yet another embodiment, all three types of the above-described transceivers are employed to communicate status information to the pollution monitoring management controller 302.

When a transceiver component that broadcast the status information fails, such as, but not limited to, the transceiver itself, the failure is detected by a loss of signal. Thus, in an embodiment employing a transceiver that is to provide an acknowledgment signal, or provide a status signal in response to a status information request, or is to provide periodic status information reports, the failure of the transceiver to respond or provide information at scheduled times and/or in response to a status inquiry, indicates a component failure.

Summarizing, the above-described embodiment includes a maintenance functionality such that the operational status of the transceivers residing in the transceiver network 100 (FIG. 1) and/or pollution detectors are monitored to ensure continuous operational functionality. Other components of the above-described communication network, such as the detectors and/or their components, may be also monitored. Thus, a detected failure in a transceiver, transceiver component, detector and/or a detector component may be quickly detected such that maintenance personnel are dispatched to repair the failed transceiver, detector or components. This embodiment is particularly advantageous in providing a pollution information message system having a high degree of operational reliability and integrity.

Defining Transceiver Communication Paths

For convenience describing the operation and functionality of the transceiver network 100 (FIG. 1), a simplified description of the communication paths employed by the plurality of transceivers is described above. In one embodiment, all transceivers employed in the transceiver network have both the capability to receive broadcasted signals and to broadcast signals. However, many of the transceivers have a limited transmit signal range as the strength of the broadcasted signal is relatively low. This embodiment is particularly suited in transceiver network 100 configurations employing a large number of transceivers located in close proximity to other transceivers.

In one embodiment, the communication path that a transceiver employs for broadcasting signals is predefined. For example, transceiver 102a in FIG. 1 was described above as transmitting pollution information messages to transceiver unit 106 over the path defined by signals 118a, 122a and 122b. That is, when the transceiver unit 106 receives a pollution information message from transceiver 102a, transceiver stations 116a and 116b are configured to relay the signal to the transceiver unit 106. Here, if another transceiver station (not shown) detects the pollution information message from transceiver 102a, that transceiver station simply ignores the detected pollution information message and does not relay the pollution information message.

In one embodiment, transmission paths for all transceivers are predetermined by the pollution monitoring management controller 302 (FIG. 3). Path information is broadcasted out to all components of the transceiver network 100, transceiver stations, transceiver units and site controllers. This information is stored in a memory residing in or coupled to each of the components of the transceiver network 100, transceiver stations, transceiver units and site controllers. Each component then configures itself to react only to those signals for which it is part of the predefined path. Thus, when the transceiver unit 102b detects a pollution information message from transceiver 102a, transceiver units 102b recognizes that it is not part of the path to transceiver 102a, and simply takes no action.

In one embodiment, the communication paths are defined by using the identification codes associated with each transceiver, and identification codes assigned to the transceiver stations, transceiver units and site controllers. For example, if site controller 104 is defined by the identification code "104", transceiver unit 106 is defined by the identification code "106", transceiver station 116b is defined by the identification code "116b", transceiver station 116a is defined by the identification code "116a", and transceiver 102a is defined by the identification code "102a", the path between the site controller 104 and transceiver 102a is simply defined by a code such as 104.106.116b.116a.102a (where each number corresponds to the component identification code). Other suitable codes are easily defined.

Such a system is described in detail in the commonly assigned patent entitled "MULTI-FUNCTION GENERAL PURPOSE TRANSCEIVER," filed Mar. 18, 1999, and accorded U.S. Pat. No. 6,233,327B1, issued on May 15, 2001 and incorporated herein by reference in its entirety.

In one embodiment of the pollution information message system, failure of a transceiver or a transceiver component is detected in a manner described above. When such a failure is detected, communications with other transceivers may be disrupted if the failed transceiver or transceiver component is in the communication path of other transceivers. In such a situation, upon the detection of the failed transceiver or transceiver component, the pollution monitoring management controller 302 (FIG. 3) redefines communication paths for affected transceivers, and transmits the redefined paths out to the transceivers, transceiver stations, transceiver units and site controllers such that the paths are redefined. For example, transceiver station 116a (FIG. 1) may fail. Thus, transceivers 102a, 102b and 102c (FIG. 1) will not be in communication with the pollution monitoring management controller 302 (FIG. 3). The communication path for transceiver 102c would then be redefined such that transceiver 102c is communicating with transceiver 102d (assuming that transceiver 102d is sufficiently close to transceiver 102c to detect signals broadcasted from transceiver 102c). Thus, transceiver 102c would be in communication with the transceiver unit 106 (FIG. 1) through a newly defined path indicated by the signals 128a, 118d and 122b (FIG. 1). Here, transceiver 102d is operating as both a transceiver (when communicating information from the pollution detector 114d) and a network transceiver (when communicating information from other transceivers).

Similarly, the communication path for transceiver 102b would then be redefined such that transceiver 102b is communicating with transceiver 102c (assuming that transceiver 102c is sufficiently close to transceiver 102b to detect signals broadcasted from transceiver 102b). Thus, transceiver 102b would be in communication with the transceiver unit 106 through a newly defined path indicated by the signals 128b, 128a, 1118d and 122b (FIG. 1). Here, transceivers 102c and 102d are operating as both a transceiver (when communicating information from the pollution detectors 114c and 114d, respectively) and a network transceiver (when communicating information from other transceivers).

Similarly, the communication path for transceiver 102a would then be redefined such that transceiver 102a is communicating with transceiver 102b (assuming that transceiver 102b is sufficiently close to transceiver 102a to detect signals broadcasted from transceiver 102a). Thus, transceiver 102a would be in communication with the transceiver unit 106 through a newly defined path indicated by the signals 128c, 128b, 128a, 118d and 122b (FIG. 1). Here, transceivers 102b, 102c and 102d are operating as both a transceiver (when communicating information from the pollution detectors 114b, 114c and 114d, respectively) and a network transceiver (when communicating information from other transceivers).

One skilled in the art will appreciate that the possible communication paths in a transceiver network 100 are nearly limitless, and that such communication paths are easily redefined by the pollution monitoring management controller 302. The above described examples are intended to illustrate some of the alternative redefined communication paths to explain the operation and functionality of the maintenance feature of one embodiment of the pollution information message system.

Alternative Embodiments of the Pollution Information Message System

For convenience of describing the operation and functionality of the pollution monitoring management controller 302 (FIG. 3), an integral part of the pollution information message system, the pollution monitoring management controller 302 was illustrated as a stand-alone unit. The pollution monitoring management controller 302, in an alternative embodiment, is implemented as an integral component of another system, such as, but not limited to, a facility monitoring system, without departing substantially from the operation and functionality of the pollution information message system.

Furthermore, the components illustrated as residing in the pollution monitoring management controller 302 may reside in alternative convenient locations outside of the pollution monitoring management controller 302 without adversely affecting the operation and functionality of the pollution information message system. Such components may even be integrated with other existing components residing in the pollution monitoring control center, thereby minimizing the cost of implementing a pollution information message system.

For example, the database 314 residing in the memory 310 (FIG. 3) may be implemented in a memory unit residing in an alternative location, such as the control console 322. Thus, information provided used the pollution information message system could simply be transferred to a database residing in the alternative location.

Similarly, the pollution message monitoring controller logic 316 (FIG. 3) could reside in a convenient alternative location and be executed by a different processor that resides in a convenient alternative location. Also, the interface 312 may be implemented as a stand-alone interface unit residing in a convenient location. For example, interface 312 may be implemented as a stand-alone PC, a network PC, a dedicated intra-network interface or the like that performs the functionality of receiving information through a communication network from the site controller 104 (FIGS. 1 and 2).

For convenience of describing the operation and functionality of the pollution monitoring management controller 302 (FIG. 3), the pollution monitoring management controller 302 is illustrated as a stand-alone unit residing within the pollution monitoring control center 300. Another embodiment of the pollution monitoring management controller resides in an alternative convenient location outside of the pollution monitoring control center 300. In such an embodiment, connection 324 may be a connection of suitable length to provide connectivity between processor 308 and the control console 322. In other embodiments, connection 324 may include a plurality of components that provides connectivity over a special purpose network or an existing, general purpose network. For example the pollution monitoring management controller 302 could be in communication with the pollution information message system over any one of the communication systems described above and illustrated in FIG. 4. Such a configuration is easily implemented using appropriate interface components. Such interface components residing in a pollution monitoring management controller that are configured to transmit, receive and convert signals are known in the art and, therefore, are not described in detail herein other than to the extent necessary to understand the operation and functioning of these components when employed as part of the pollution information message system that is remote from the pollution monitoring control center 300. One skilled in the art will realize that such known components are too numerous to describe in detail herein, and that any configuration of such known components having the above-described functionality may be implemented without departing substantially from the pollution information message system.

One embodiment of the pollution information message system is configured to couple a plurality of transceivers to a plurality of mobile air pollution detectors. A detector is used to monitor each one of a fleet of vehicles such that total pollution of the entire fleet is monitored or pollution from an individual unit of the fleet is monitored. Another embodiment is configured to monitor individual vehicles and/or various components of the vehicle to detect pollution. Such an embodiment is desirable in applications where, for example, but not limited to, exhaust emission and fluid leakages are monitored on the vehicle.

Another embodiment employs a power line carrier (PLC) signal to communicate signals from pollution detectors such that a receiving transceiver generates a pollution information message. For example, but not limited to, detector unit 220 (FIG. 2), in one embodiment, is supplied power via wire 226 which is coupled to the electric distribution network 228. Rather than being coupled to the transceiver 202, the detector unit 220 is configured to generate a suitable PLC signal and to communicate pollution information to the transceiver 230 using PLC signals.

Transceiver 230 is coupled to the electric distribution network 228 at a suitable location. For convenience of illustration, transceiver 230 is illustrated as being coupled to an electrical outlet 232. Electrical outlet 232 is coupled to the electric distribution network 228 via wire 234. One embodiment employs a standard outlet spade-type connector (not shown) to couple the transceiver 230 to the electrical outlet 232. Another embodiment of the transceiver 230 is coupled to the outlet 232 with wire connections coupled at suitable connection points. Another embodiment of the transceiver 230 is coupled to another suitable location on the electric distribution network 234 such that the transceiver 230 is able to reliably receive signals from the detector unit 220.

Thus, when the detector unit 220 detects pollution, a PLC signal is communicated from the detector unit 220 to the transceiver 230 over the electric distribution network 228. Upon receiving a PLC signal having pollution information, the transceiver 226 generates and communicates a pollution information signal 236 in any one of the previously described manners. The communication of PLC signals, and the equipment that generates PLC signals, is known in the art, and is therefore not described in further detail other than to the extent necessary to understand the communication of PLC signals to a transceiver employed as part of a pollution monitoring management system.

Other detectors coupled to the electric distribution network may also be configured to generate PLC signals that are communicated to transceiver 226. Such an embodiment of pollution detection system employing detector units communicating to transceiver 230 with PLC signals is particularly advantageous when it is desirable to employ a pollution detection system within a facility having a distribution network 228 that can be conveniently accessed.

The embodiment of the pollution information message system was described herein to include a plurality of transceiver units configured to communicate based upon a predefined communication path specified by the pollution monitoring management controller 302. An alternative embodiment is configured to communicate with other special purpose systems that employ compatible transceivers. For example, a system for monitoring emergency, alarm, climate, or other conditions in a defined territory is disclosed in the co-pending commonly assigned non-provisional application entitled "SYSTEM FOR MONITORING CONDITIONS IN A RESIDENTIAL LIVING COMMUNITY," filed Mar. 18, 1999, and accorded Ser. No. 09/271,517, incorporated herein by reference in its entirety. Another system for controlling electricity demand in a defined territory is disclosed in the co-pending commonly assigned non-provisional application entitled "SYSTEM AND METHOD FOR CONTROLLING POWER DEMAND OVER AN INTEGRATED WIRELESS NETWORK," filed Aug. 15, 2001, and accorded Ser. No. 09/929,926, incorporated herein by reference in its entirety. The above applications describe a computerized system for monitoring power and/or other conditions in a defined territory using a network of transceivers communicating back to a remote facility via a plurality of repeaters and a central system (such as a site controller). The plurality of transceivers configured for monitoring power and/or other conditions in a defined territory are integrated with a plurality of transceivers for controlling customer premises appliances, thereby reducing overall facility, maintenance and installation costs by employing common units. For example, a transceiver controlling an air conditioning unit or a transceiver monitoring pollution (in accordance with the application Ser. No. 09/929,926) may be integrated to communicate through same transceiver stations, transceiver units and/or site controllers communication pollution information messages. The integrated system would simply recognize the transceiver communicating a pollution information message and appropriately route communications to and/or from that transceiver to the appropriate remote facility. One skilled in the art will appreciate that a pollution information message system described herein is interpretable into any other special purpose system or a multipurpose system based upon a network of similarly configured transceivers that communicate through common components.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

I claim:

1. In a system that communicates a pollution information message in a wireless network that comprises wireless pollution communication devices, a wireless pollution detector device comprising:
   a pollution detector configured to monitor and detect pollution events, the pollution detector further configured to generate pollution information signals containing information relating to detected pollution events;
   a wireless transceiver having a unique identification code and being electrically interfaced with the pollution detector, wherein the wireless transceiver is configured to wirelessly transmit a data message comprising the unique identification code and information related to the pollution information signals, and wherein the wireless transceiver is further configured to receive a pollution information message transmitted from a second wireless transceiver, the pollution information message comprising a second unique identification code associated with the second wireless transceiver, and wherein the wireless transceiver is further configured to wirelessly transmit a repeated data message comprising the pollution information message and the unique identification code; and
   a memory electrically coupled to the wireless transceiver and storing a communication path and wherein the wireless transceiver transmits the data message and repeated data message in accordance with the stored communication path.

2. The wireless pollution detector device of claim 1, wherein the communication path comprises one or more predefined communication paths that comprise a series of transceivers.

3. The wireless pollution detector device of claim 1, wherein the data message includes one or more of operational conditions of the wireless transceiver and the pollution detector, pollution levels, pollution type, nature of detected pollution, and pollution parameters.

4. The wireless pollution detector device of claim 1, wherein the wireless transceiver is configured to receive a control signal from a site controller, and in response to the control signal, wirelessly transmit status information for receipt at the site controller.

5. The wireless pollution detector device of claim 1, wherein the wireless transceiver is configured to receive a second pollution information message transmitted from a third wireless transceiver, the second pollution information message comprising a third unique identification code associated with the third wireless transceiver, and wherein the wireless transceiver is further configured to wirelessly transmit a second repeated data message comprising the second pollution information message and the unique identification code.

6. In a wireless communication system that communicates one or more pollution information messages via a wireless network that comprises a plurality of wireless pollution communication devices, a wireless pollution communication device comprising:
   a wireless transceiver configured to receive a signal from a pollution detector configured to detect pollution, the transceiver configured to transmit a pollution information message that is communicated through a transceiver network, wherein the pollution information message comprises information including pollution detector type, detected pollution levels, and pollution detector operational status, the wireless transceiver further being configured to receive one or more pollution information messages from one or more remote wireless transceivers, and forward said received pollution information messages along to a recipient device in accordance with a predetermined communication path, the wireless transceiver associated with a unique identification code such that a location of the detector is determined by associating the identification code with information residing in a database that includes at least the location of the transceiver; and
   a memory for storing the predetermined communication path that includes one or more wireless transceivers in the wireless network.

7. The wireless pollution communication device of claim 6, wherein the wireless communication device is in communication with at least one site controller via the transceiver network.

8. The wireless pollution communication device of claim 7, wherein the site controller is configured to receive the pollution information message and configure the pollution information message for transmission via a second network to a pollution monitoring management controller.

9. The wireless pollution communication device of claim 7, wherein the wireless transceiver is configured to receive a control signal from the site controller, and in response to the control signal, wirelessly transmit status information for receipt at the site controller.

10. The wireless pollution communication device of claim 7, wherein the wireless transceiver is configured to receive a revised communication path from the site controller for storage in the memory enabling the wireless transceiver to send data messages with the revised communication path.

11. The wireless pollution communication device of claim 10, wherein the revised communication path is based on traffic in the wireless network monitored by the site controller.

12. The wireless pollution communication device of claim 6, wherein the wireless transceiver is configured as a mobile wireless transceiver enabling the wireless pollution communication device to be a mobile wireless pollution communication device.

13. The wireless pollution communication device of claim 12, wherein the mobile wireless pollution detector is disposed in a vehicle to monitor pollution events related to said vehicle.

* * * * *